United States Patent
Park et al.

(10) Patent No.: US 12,278,951 B2
(45) Date of Patent: *Apr. 15, 2025

(54) IMAGE DECODING METHOD FOR DERIVING PREDICTED SAMPLE BY USING MERGE CANDIDATE AND DEVICE THEREFOR

(71) Applicant: LG ELECTRONICS INC., Seoul (KR)

(72) Inventors: Naeri Park, Seoul (KR); Junghak Nam, Seoul (KR); Hyeongmoon Jang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/389,064

(22) Filed: Nov. 13, 2023

(65) Prior Publication Data

US 2024/0080438 A1 Mar. 7, 2024

Related U.S. Application Data

(63) Continuation of application No. 17/979,403, filed on Nov. 2, 2022, now Pat. No. 11,856,187, which is a
(Continued)

(51) Int. Cl.
*H04N 19/105* (2014.01)
*H04N 19/132* (2014.01)
(Continued)

(52) U.S. Cl.
CPC ......... *H04N 19/105* (2014.11); *H04N 19/132* (2014.11); *H04N 19/137* (2014.11); *H04N 19/159* (2014.11); *H04N 19/176* (2014.11)

(58) Field of Classification Search
CPC .. H04N 19/105; H04N 19/132; H04N 19/137; H04N 19/159; H04N 19/176
See application file for complete search history.

(56) References Cited

U.S. PATENT DOCUMENTS

2019/0158870 A1 5/2019 Xu et al.
2019/0230350 A1* 7/2019 Chen .................... H04N 19/105

FOREIGN PATENT DOCUMENTS

CN 108293111 A 7/2018
CN 108605137 A 9/2018
(Continued)

OTHER PUBLICATIONS

Bross et al., "Joint Video Experts Team (JVET) of ITU-T SG 16 WP 3 and ISO/IEC JTC 1/SC 29/WG 11", JVET-N1001-v10, 14th Meeting: Geneva, CH, Mar. 19-27, 2019.
(Continued)

*Primary Examiner* — Hesham K Abouzahra
(74) *Attorney, Agent, or Firm* — Bryan Cave Leighton Paisner LLP

(57) ABSTRACT

The present invention relates to a method for encoding and decoding images, wherein, if bi-prediction is applied, a weight for a merge candidate is derived, thereby improving the image compression efficiency, and making it possible to efficiently configure a motion vector candidate. A merge candidate list of the current block is produced on the basis of inter-prediction information, and the candidate includes a configured affine merge candidate. If the configured affine merge candidate is produced on the basis of a combination of control points including CP0, weight index information regarding the configured affine merge candidate is produced on the basis of weight index information regarding CP0. If the configured affine merge candidate is produced on the basis of a combination of control points excluding CP0,
(Continued)

weight index information regarding the configured affine merge candidate is derived on the basis of weight index information regarding CP1.

12 Claims, 18 Drawing Sheets

Related U.S. Application Data continuation of application No. 17/561,642, filed on Dec. 23, 2021, now Pat. No. 11,539,941, which is a continuation of application No. PCT/KR2020/008106, filed on Jun. 24, 2020.

(60) Provisional application No. 62/865,957, filed on Jun. 24, 2019.

(51) Int. Cl.
*H04N 19/137* (2014.01)
*H04N 19/159* (2014.01)
*H04N 19/176* (2014.01)

(56) References Cited

FOREIGN PATENT DOCUMENTS

| CN | 109496430 A | 3/2019 |
|---|---|---|
| CN | 109804626 A | 5/2019 |
| EP | 3422720 A1 | 2/2019 |
| KR | 10-2018-0037583 A | 4/2018 |
| WO | 2017/148345 A1 | 9/2017 |
| WO | 2018/226066 A1 | 12/2018 |
| WO | 2019/027145 A1 | 2/2019 |

OTHER PUBLICATIONS

Park et al., "Non-CE4: Simplifications on BCW index derivation process", Joint Video Experts Team (JVET) of ITU-T SG 16 WP 3 and ISO/IEC JTC 1/SC 29/WG 11, JVET-O0366-v1, 15th Meeting: Gothenburg, SE, Jul. 3-12, 2019.

Tokumichi et al., "High Efficiency Video Coding", HEVC/H.265, Reference No. B214918-1, Issuance No. 173064, Issue Date: Apr. 9, Reiwa 6 (2024).

* cited by examiner

Translate

Scale

Rotate

Shear

IMAGE DECODING METHOD FOR DERIVING PREDICTED SAMPLE BY USING MERGE CANDIDATE AND DEVICE THEREFOR

This application is a continuation application of U.S. patent application Ser. No. 17/979,403, filed on Nov. 2, 2022, which is a continuation of U.S. patent application Ser. No. 17/561,642, filed on Dec. 23, 2021 (now U.S. Pat. No. 11,539,941, issued on Dec. 27, 2022), which is a continuation of International Application No. PCT/KR2020/008106, filed on Jun. 24, 2020, which claims the benefit of U.S. Provisional Application No. 62/865,957, filed on Jun. 24, 2019, the contents of which are all hereby incorporated by reference herein in their entirety.

BACKGROUND OF THE DISCLOSURE

Field of the Disclosure

The present disclosure relates to an image decoding method for deriving a predicted sample using a merge candidate and an apparatus therefor.

Related Art

Recently, the demand for high resolution, high quality image/video such as 4K, 8K or more Ultra High Definition (UHD) image/video is increasing in various fields. As the image/video resolution or quality becomes higher, relatively more amount of information or bits are transmitted than for conventional image/video data. Therefore, if image/video data are transmitted via a medium such as an existing wired/wireless broadband line or stored in a legacy storage medium, costs for transmission and storage are readily increased.

Moreover, interests and demand are growing for virtual reality (VR) and artificial reality (AR) contents, and immersive media such as hologram; and broadcasting of images/videos exhibiting image/video characteristics different from those of an actual image/video, such as game images/videos, are also growing.

Therefore, a highly efficient image/video compression technique is required to effectively compress and transmit, store, or play high resolution, high quality images/videos showing various characteristics as described above.

SUMMARY

The present disclosure provides a method and an apparatus for increasing image coding efficiency.

The present disclosure also provides a method and an apparatus for deriving weight index information for generating a prediction sample in inter prediction.

The present disclosure also provides a method and an apparatus for deriving weight index information on a candidate in an affine merge candidate list during bi-prediction.

In an aspect, an image decoding method performed by a decoding apparatus is provided. The method includes acquiring image information including an inter-prediction mode information through a bitstream; generating a merge candidate list of a current block based on the inter-prediction mode information; selecting one candidate among candidates included in the merge candidate list; and generating prediction samples of the current block based on the selected candidate and the weight index information about the selected candidate, and the candidates may include a constructed affine merge candidate, and the constructed affine merge candidate may be generated based on at least two of a control point CP0 located at a top-left side of the current block, a control point CP1 located at a top-right side of the current block, a control point CP2 located at a bottom-left side of the current block, and a control point CP3 located at a bottom-right side of the current block, and, when the constructed affine merge candidate is generated based on a combination of the control points including the CP0, weight index information about the constructed affine merge candidate may be derived based on weight index information about the CP0, and, when the constructed affine merge candidate is generated based on a combination of the control points except the CP0, weight index information about the constructed affine merge candidate may be derived based on weight index information about the CP1.

In another aspect, a video encoding method performed by an encoding apparatus is provided. The method includes determining an inter-prediction mode of a current block and generating inter-prediction mode information indicating the inter-prediction mode; generating a merge candidate list of the current block based on the inter-prediction mode; generating selection information which indicates one candidate among candidates included in the merge candidate list; and encoding image information which includes the inter-prediction mode information and the selection information, and the candidates may include a constructed affine merge candidate, and the constructed affine merge candidate may be generated based on at least two of a control point CP0 located at a top-left side of the current block, a control point CP1 located at a top-right side of the current block, a control point CP2 located at a bottom-left side of the current block, and a control point CP3 located at a bottom-right side of the current block, and, when the constructed affine merge candidate is generated based on a combination of the control points including the CP0, weight index information about the constructed affine merge candidate may be indicated based on weight index information about the CP0, and, when the constructed affine merge candidate is generated based on a combination of the control points except the CP0, weight index information about the constructed affine merge candidate may be indicated based on weight index information about the CP1.

In a further aspect, a computer-readable digital storage medium configured to store a bitstream including image information to cause a decoding apparatus to perform an image decoding method is provided. The image decoding method includes acquiring image information including an inter-prediction mode information through a bitstream; generating a merge candidate list of a current block based on the inter-prediction mode information; selecting one candidate among candidates included in the merge candidate list; and generating prediction samples of the current block based on the selected candidate and the weight index information about the selected candidate, and the candidates may include a constructed affine merge candidate, and the constructed affine merge candidate may be generated based on at least two of a control point CP0 located at a top-left side of the current block, a control point CP1 located at a top-right side of the current block, a control point CP2 located at a bottom-left side of the current block, and a control point CP3 located at a bottom-right side of the current block, and, when the constructed affine merge candidate is generated based on a combination of the control points including the CP0, weight index information about the constructed affine merge candidate may be derived based on weight index information about the CP0, and, when the constructed affine merge candidate is generated based on a combination of the control points except the CP0, weight index information about the constructed affine merge candidate may be derived based on weight index information about the CP1.

Advantageous Effects

According to the present disclosure, it is possible to increase the overall image/video compression efficiency.

According to the present, it is possible to efficiently construct motion vector candidates during inter-prediction.

According to the present disclosure, it is possible to efficiently perform weight-based bi-prediction.

DESCRIPTION OF EXEMPLARY EMBODIMENTS

Figure 1:
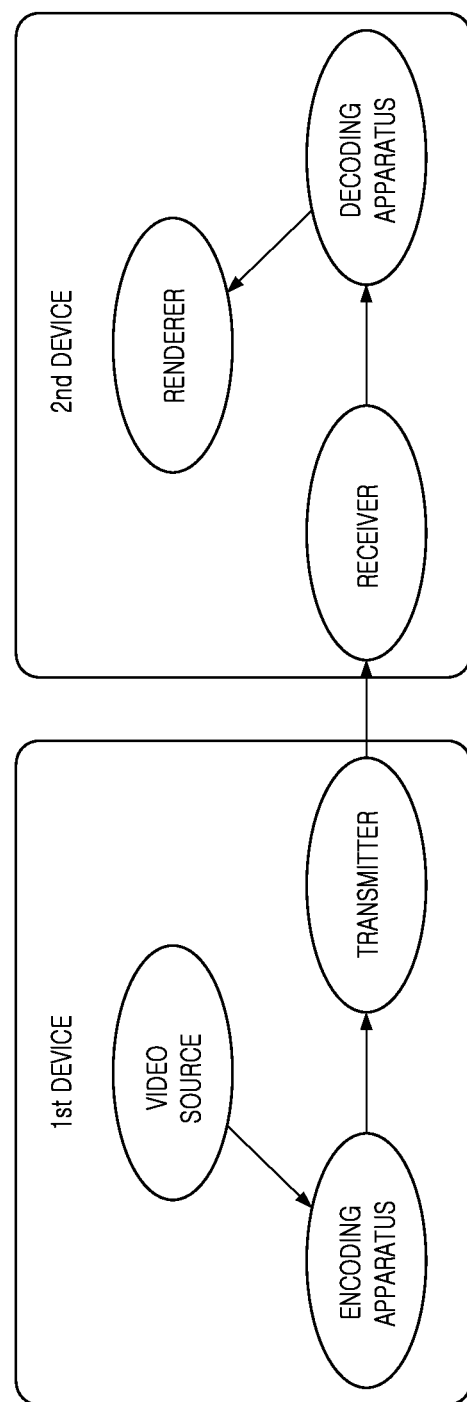
FIG. 1 is a diagram schematically illustrating an example of a video/image coding system to which embodiments of the present disclosure may be applied.

The present disclosure may be variously modified and have several exemplary embodiments. Therefore, specific exemplary embodiments of the present disclosure will be illustrated in the accompanying drawings and be described in detail. However, this is not intended to limit the present disclosure to specific embodiments. Terms used in the present specification are used only in order to describe specific exemplary embodiments rather than limiting the present disclosure. Singular forms are intended to include plural forms unless the context clearly indicates otherwise. It is to be understood that terms "include", "have", or the like, used in the present specification specify the presence of features, numerals, steps, operations, components, parts, or a combination thereof stated in the present specification, but do not preclude the presence or addition of one or more other features, numerals, steps, operations, components, parts, or a combination thereof.

Meanwhile, each component in the drawings described in the present disclosure is illustrated independently for convenience of description regarding different characteristic functions, and does not mean that each component is implemented as separate hardware or separate software. For example, two or more components among each component may be combined to form one component, or one component may be divided into a plurality of components. Embodiments in which each component is integrated and/or separated are also included in the scope of the present disclosure.

In the present disclosure, "A or B" may mean "only A", "only B" or "both A and B". In other words, "A or B" in the present disclosure may be interpreted as "A and/or B". For example, in the present disclosure, "A, B, or C" means "only A", "only B", "only C", or "any and any combination of A, B, and C".

A slash (/) or comma (comma) used in the present disclosure may mean "and/or". For example, "A/B" may mean "and/or B". Accordingly, "A/B" may mean "only A", "only B", or "both A and B." For example, "A, B, C" may mean "A, B, or C".

In the present specification, "at least one of A and B" may mean "only A", "only B", or "both A and B". Further, in the present specification, the expression "at least one of A or B" or "at least one of A and/or B" may be interpreted the same as "at least one of A and B".

Further, in the present specification, "at least one of A, B and C" may mean "only A", "only B", "only C", or "any combination of A, B and C". Further, "at least one of A, B or C" or "at least one of A, B and/or C" may mean "at least one of A, B and C".

Further, the parentheses used in the present specification may mean "for example". Specifically, in the case that "prediction (intra prediction)" is expressed, it may be indicated that "intra prediction" is proposed as an example of "prediction". In other words, the term "prediction" in the present specification is not limited to "intra prediction", and it may be indicated that "intra prediction" is proposed as an example of "prediction". Further, even in the case that "prediction (i.e., intra prediction)" is expressed, it may be indicated that "intra prediction" is proposed as an example of "prediction".

In the present specification, technical features individually explained in one drawing may be individually implemented, or may be simultaneously implemented.

Hereinafter, embodiments of the present disclosure will be described in detail with reference to the accompanying drawings. In addition, like reference numerals are used to indicate like elements throughout the drawings, and the same descriptions on the like elements may be omitted.

FIG. 1 illustrates an example of a video/image coding system to which the embodiments of the present disclosure may be applied.

Referring to FIG. 1, a video/image coding system may include a first device (a source device) and a second device (a reception device). The source device may transmit encoded video/image information or data to the reception device through a digital storage medium or network in the form of a file or streaming.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input video/image. The encoding apparatus may perform a series of procedures such as prediction, transform, and quantization for compaction and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

The present disclosure relates to video/image coding. For example, the method/embodiment disclosed in the present disclosure may be applied to the methods disclosed in a verstatile video coding (VVC) standard, an essential video coding (EVC) standard, an AOMedia Video 1 (AV1) standard, 2nd generation of audio video coding standard (AVS2), or a next-generation video/image coding standard (ex. H.267 or H.268, etc).

This document suggests various embodiments of video/image coding, and the above embodiments may also be performed in combination with each other unless otherwise specified.

In this document, a video may refer to a series of images over time. A picture generally refers to the unit representing one image at a particular time frame, and a slice/tile refers to the unit constituting a part of the picture in terms of coding. A slice/tile may include one or more coding tree units (CTUs). One picture may consist of one or more slices/tiles.

A tile is a rectangular region of CTUs within a particular tile column and a particular tile row in a picture. The tile column is a rectangular region of CTUs having a height equal to the height of the picture and a width specified by syntax elements in the picture parameter set. The tile row is a rectangular region of CTUs having a height specified by syntax elements in the picture parameter set and a width equal to the width of the picture. A tile scan is a specific sequential ordering of CTUs partitioning a picture in which the CTUs are ordered consecutively in CTU raster scan in a tile whereas tiles in a picture are ordered consecutively in a raster scan of the tiles of the picture. A slice may comprise a number of complete tiles or a number of consecutive CTU rows in one tile of a picture that may be contained in one NAL unit. In this document, tile group and slice can be used interchangeably. For example, in this document, a tile group/tile group header may be referred to as a slice/slice header.

Meanwhile, one picture may be divided into two or more subpictures. The subpicture may be a rectangular region of one or more slices within a picture.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (ex. cb, cr) blocks. The unit may be used interchangeably with terms such as block or area in some cases. In a general case, an M×N block may include samples (or sample arrays) or a set (or array) of transform coefficients of M columns and N rows. Alternatively, the sample may mean a pixel value in the spatial domain, and when such a pixel value is transformed to the frequency domain, it may mean a transform coefficient in the frequency domain.

Figure 2:
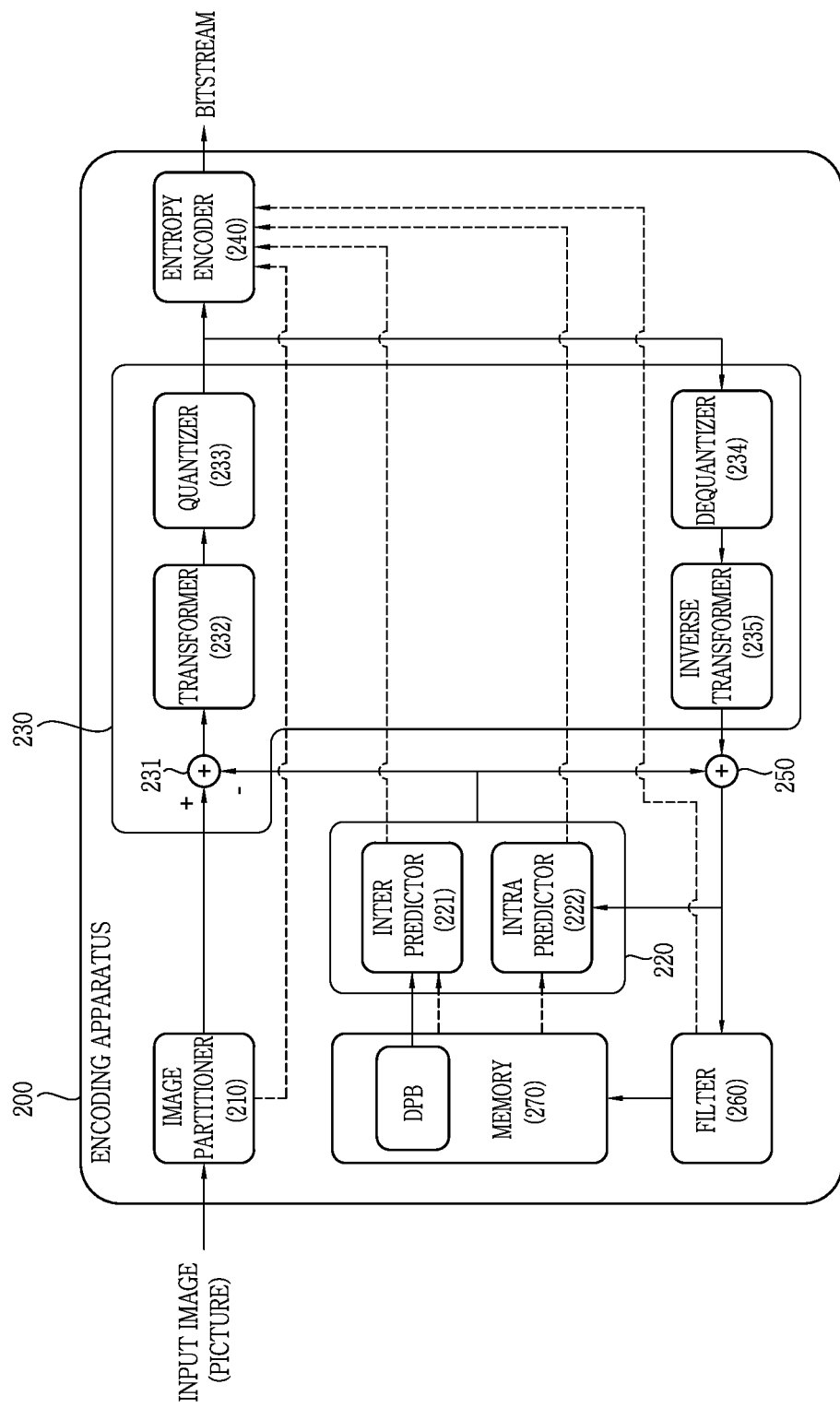
FIG. 2 is a diagram schematically illustrating a configuration of a video/image encoding apparatus to which embodiments of the present disclosure may be applied.

FIG. 2 is a diagram schematically illustrating the configuration of a video/image encoding apparatus to which the disclosure of the present document may be applied. Hereinafter, what is referred to as the video encoding apparatus may include an image encoding apparatus.

Referring to FIG. 2, the encoding apparatus 200 may include and be configured with an image partitioner 210, a predictor 220, a residual processor 230, an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or reconstructed block generator. The image partitioner 210, the predictor 220, the residual processor 230, the entropy encoder 240, the adder 250, and the filter 260, which have been described above, may be configured by one or more hardware components (e.g., encoder chipsets or processors) according to an embodiment. In addition, the memory 270 may include a decoded picture buffer (DPB), and may also be configured by a digital storage medium. The hardware component may further include the memory 270 as an internal/external component.

The image partitioner 210 may split an input image (or, picture, frame) input to the encoding apparatus 200 into one or more processing units. As an example, the processing unit may be called a coding unit (CU). In this case, the coding unit may be recursively split according to a Quad-tree binary-tree ternary-tree (QTBTTT) structure from a coding tree unit (CTU) or the largest coding unit (LCU). For example, one coding unit may be split into a plurality of coding units of a deeper depth based on a quad-tree structure, a binary-tree structure, and/or a ternary-tree structure. In this case, for example, the quad-tree structure is first applied and the binary-tree structure and/or the ternary-tree structure may be later applied. Alternatively, the binary-tree structure may also be first applied. A coding procedure according to the present disclosure may be performed based on a final coding unit which is not split any more. In this case, based on coding efficiency according to image characteristics or the like, the maximum coding unit may be directly used as the final coding unit, or as necessary, the coding unit may be recursively split into coding units of a deeper depth, such that a coding unit having an optimal size may be used as the final coding unit. Here, the coding procedure may include a procedure such as prediction, transform, and reconstruction to be described later. As another example, the processing unit may further include a predictor (PU) or a transform unit (TU). In this case, each of the predictor and the transform unit may be split or partitioned from the aforementioned final coding unit. The predictor may be a unit of sample prediction, and the transform unit may be a unit for inducing a transform coefficient and/or a unit for inducing a residual signal from the transform coefficient.

The unit may be interchangeably used with the term such as a block or an area in some cases. Generally, an M×N block may represent samples composed of M columns and N rows or a group of transform coefficients. The sample may generally represent a pixel or a value of the pixel, and may also represent only the pixel/pixel value of a luma component, and also represent only the pixel/pixel value of a chroma component. The sample may be used as the term corresponding to a pixel or a pel configuring one picture (or image).

The encoding apparatus 200 may subtract the prediction signal (predicted block, prediction sample array) output from the inter predictor 221 or the intra predictor 222 from the input image signal (original block, original sample array) to generate a residual signal (residual block, residual sample array), and the generated residual signal is transmitted to the transformer 232. In this case, as illustrated, a unit for subtracting the prediction signal (prediction block, prediction sample array) from an input image signal (original block, original sample array) in the encoder 200 may be referred to as a subtractor 231. The predictor may perform prediction on a processing target block (hereinafter, referred to as a current block) and generate a predicted block including prediction samples for the current block. The predictor may determine whether intra prediction or inter prediction is applied in units of a current block or CU. The predictor may generate various information on prediction, such as prediction mode information, and transmit the generated information to the entropy encoder 240, as is described below in the description of each prediction mode. The information on prediction may be encoded by the entropy encoder 240 and output in the form of a bitstream.

The intra predictor 222 may predict a current block with reference to samples within a current picture. The referenced samples may be located neighboring to the current block, or may also be located away from the current block according to the prediction mode. The prediction modes in the intra prediction may include a plurality of non-directional modes and a plurality of directional modes. The non-directional mode may include, for example, a DC mode or a planar mode. The directional mode may include, for example, 33 directional prediction modes or 65 directional prediction modes according to the fine degree of the prediction direction. However, this is illustrative and the directional prediction modes which are more or less than the above number may be used according to the setting. The intra predictor 222 may also determine the prediction mode applied to the current block using the prediction mode applied to the neighboring block.

The inter predictor 221 may induce a predicted block of the current block based on a reference block (reference sample array) specified by a motion vector on a reference picture. At this time, in order to decrease the amount of motion information transmitted in the inter prediction mode, the motion information may be predicted in units of a block, a sub-block, or a sample based on the correlation of the motion information between the neighboring block and the current block. The motion information may include a motion vector and a reference picture index. The motion information may further include inter prediction direction (L0 prediction, L1 prediction, Bi prediction, or the like) information. In the case of the inter prediction, the neighboring block may include a spatial neighboring block existing within the current picture and a temporal neighboring block existing in the reference picture. The reference picture including the reference block and the reference picture including the temporal neighboring block may also be the same as each other, and may also be different from each other. The temporal neighboring block may be called the name such as a collocated reference block, a collocated CU (colCU), or the like, and the reference picture including the temporal neighboring block may also be called a collocated picture (colPic). For example, the inter predictor 221 may configure a motion information candidate list based on the neighboring blocks, and generate information indicating what candidate is used to derive the motion vector and/or the reference picture index of the current block. The inter prediction may be performed based on various prediction modes, and for example, in the case of a skip mode and a merge mode, the inter predictor 221 may use the motion information of the neighboring block as the motion information of the current block. In the case of the skip mode, the residual signal may not be transmitted unlike the merge mode. A motion vector prediction (MVP) mode may indicate the motion vector of the current block by using the motion vector of the neighboring block as a motion vector predictor, and signaling a motion vector difference.

The predictor 220 may generate a prediction signal based on various prediction methods to be described below. For example, the predictor may apply intra prediction or inter prediction for prediction of one block and may simultaneously apply intra prediction and inter prediction. This may be called combined inter and intra prediction (CIIP). In addition, the predictor may be based on an intra block copy (IBC) prediction mode or based on a palette mode for prediction of a block. The IBC prediction mode or the palette mode may be used for image/video coding of content such as games, for example, screen content coding (SCC). IBC basically performs prediction within the current picture, but may be performed similarly to inter prediction in that a reference block is derived within the current picture. That is, IBC may use at least one of the inter prediction techniques described in this document. The palette mode may be viewed as an example of intra coding or intra prediction. When the palette mode is applied, a sample value in the picture may be signaled based on information on the palette table and the palette index.

The prediction signal generated by the predictor (including the inter predictor 221 and/or the intra predictor 222) may be used to generate a reconstructed signal or may be used to generate a residual signal. The transformer 232 may generate transform coefficients by applying a transform technique to the residual signal. For example, the transform technique may include at least one of a discrete cosine transform (DCT), a discrete sine transform (DST), a Karhunen-Loeve Transform (KLT), a graph-based transform (GBT), or a conditionally non-linear transform (CNT). Here, GBT refers to transformation obtained from a graph when expressing relationship information between pixels in the graph. CNT refers to transformation obtained based on a prediction signal generated using all previously reconstructed pixels. Also, the transformation process may be applied to a block of pixels having the same size as a square or may be applied to a block of a variable size that is not a square.

The quantizer 233 quantizes the transform coefficients and transmits the same to the entropy encoder 240, and the entropy encoder 240 encodes the quantized signal (information on the quantized transform coefficients) and outputs the encoded signal as a bitstream. Information on the quantized transform coefficients may be referred to as residual information. The quantizer 233 may rearrange the quantized transform coefficients in the block form into a one-dimensional vector form based on a coefficient scan order and may generate information on the transform coefficients based on the quantized transform coefficients in the one-dimensional vector form. The entropy encoder 240 may perform various encoding methods such as, for example, exponential Golomb, context-adaptive variable length coding (CAVLC), and context-adaptive binary arithmetic coding (CABAC). The entropy encoder 240 may encode information necessary for video/image reconstruction (e.g., values of syntax elements, etc.) other than the quantized transform coefficients together or separately. Encoded information (e.g., encoded video/image information) may be transmitted or stored in units of a network abstraction layer (NAL) unit in the form of a bitstream. The video/image information may further include information on various parameter sets, such as an adaptation parameter set (APS), a picture parameter set (PPS), a sequence parameter set (SPS), or a video parameter set (VPS). Also, the video/image information may further include general constraint information. In this document, information and/or syntax elements transmitted/signaled from the encoding apparatus to the decoding apparatus may be included in video/image information. The video/image information may be encoded through the encoding procedure described above and included in the bitstream. The bitstream may be transmitted through a network or may be stored in a digital storage medium. Here, the network may include a broadcasting network and/or a communication network, and the digital storage medium may include various storage media such as USB, SD, CD, DVD, Blu-ray, HDD, and SSD. A transmitting unit (not shown) and/or a storing unit (not shown) for transmitting or storing a signal output from the entropy encoder 240 may be configured as internal/external elements of the encoding apparatus 200, or the transmitting unit may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transform unit 235. The adder 250 may add the reconstructed residual signal to the prediction signal output from the inter predictor 221 or the intra predictor 222 to generate a reconstructed signal (reconstructed picture, reconstructed block, reconstructed sample array). When there is no residual for the processing target block, such as when the skip mode is applied, the predicted block may be used as a reconstructed block. The adder 250 may be referred to as a restoration unit or a restoration block generator. The generated reconstructed signal may be used for intra prediction of a next processing target block in the current picture, or may be used for inter prediction of the next picture after being filtered as described below.

Meanwhile, luma mapping with chroma scaling (LMCS) may be applied during a picture encoding and/or reconstruction process.

The filter 260 may improve subjective/objective image quality by applying filtering to the reconstructed signal. For example, the filter 260 may generate a modified reconstructed picture by applying various filtering methods to the reconstructed picture, and store the modified reconstructed picture in the memory 270, specifically, in a DPB of the memory 270. The various filtering methods may include, for example, deblocking filtering, a sample adaptive offset, an adaptive loop filter, a bilateral filter, and the like. The filter 260 may generate various kinds of information related to the filtering, and transfer the generated information to the entropy encoder 240 as described later in the description of each filtering method. The information related to the filtering may be encoded by the entropy encoder 240 and output in the form of a bitstream.

The modified reconstructed picture transmitted to the memory 270 may be used as a reference picture in the inter predictor 221. When the inter prediction is applied through the encoding apparatus, prediction mismatch between the encoding apparatus 200 and the decoding apparatus can be avoided and encoding efficiency can be improved.

The DPB of the memory 270 may store the modified reconstructed picture for use as the reference picture in the inter predictor 221. The memory 270 may store motion information of a block from which the motion information in the current picture is derived (or encoded) and/or motion information of blocks in the picture, having already been reconstructed. The stored motion information may be transferred to the inter predictor 221 to be utilized as motion information of the spatial neighboring block or motion information of the temporal neighboring block. The memory 270 may store reconstructed samples of reconstructed blocks in the current picture, and may transfer the reconstructed samples to the intra predictor 222.

Meanwhile, in this document, at least one of quantization/dequantization and/or transform/inverse transform may be omitted. When the quantization/dequantization is omitted, the quantized transform coefficient may be referred to as a transform coefficient. When the transform/inverse transform is omitted, the transform coefficient may be called a coefficient or a residual coefficient or may still be called the transform coefficient for uniformity of expression.

Further, in this document, the quantized transform coefficient and the transform coefficient may be referred to as a transform coefficient and a scaled transform coefficient, respectively. In this case, the residual information may include information on transform coefficient(s), and the information on the transform coefficient(s) may be signaled through residual coding syntax. Transform coefficients may be derived based on the residual information (or information on the transform coefficient(s)), and scaled transform coefficients may be derived through inverse transform (scaling) on the transform coefficients. Residual samples may be derived based on inverse transform (transform) of the scaled transform coefficients. This may be applied/expressed in other parts of this document as well.

Figure 3:
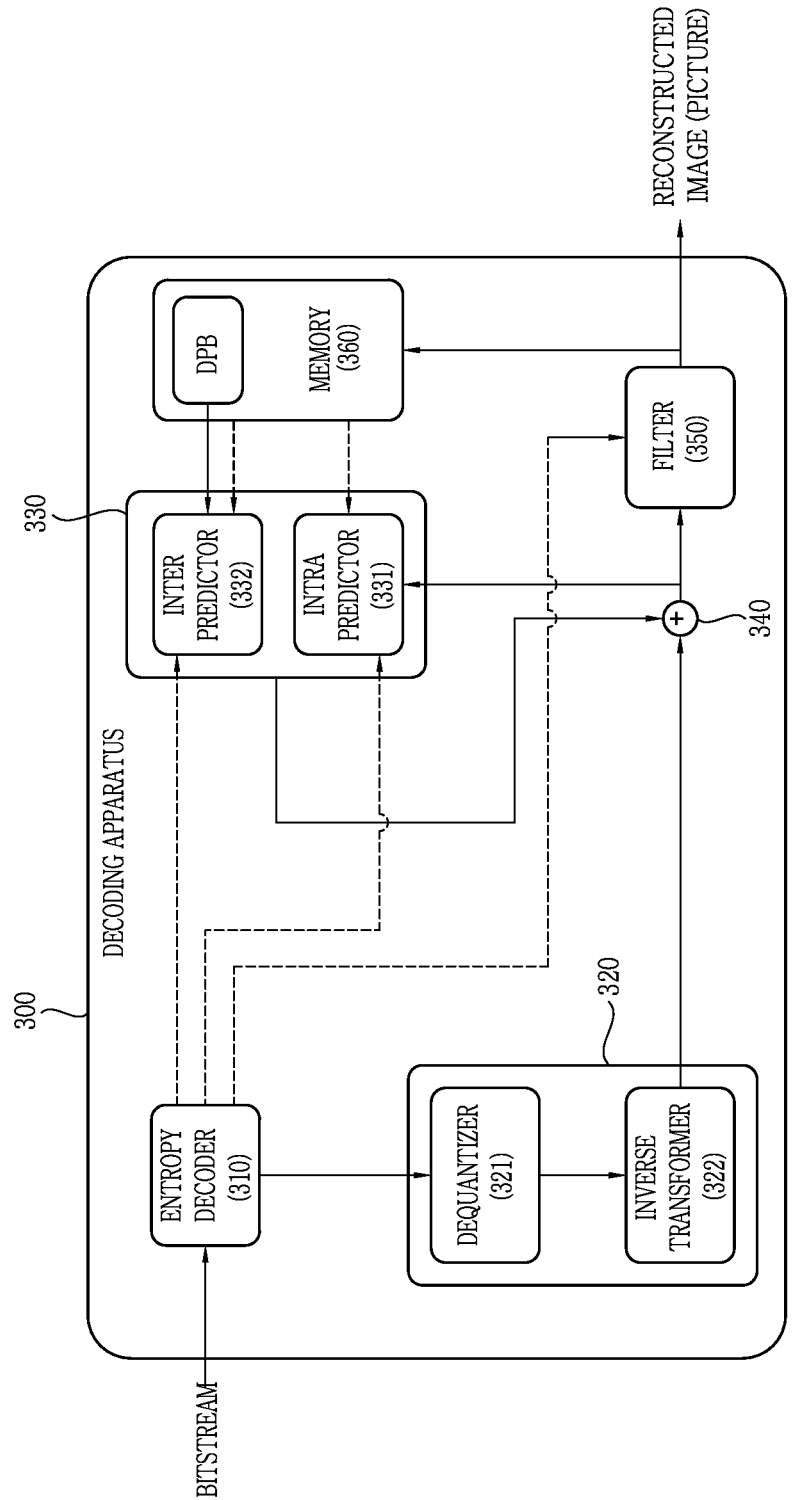
FIG. 3 is a diagram schematically illustrating a configuration of a video/image decoding apparatus to which embodiments of the present disclosure may be applied.

FIG. 3 is a diagram for schematically explaining the configuration of a video/image decoding apparatus to which the disclosure of the present document may be applied.

Referring to FIG. 3, the decoding apparatus 300 may include and configured with an entropy decoder 310, a residual processor 320, a predictor 330, an adder 340, a filter 350, and a memory 360. The predictor 330 may include an intra predictor 331 and an inter predictor 332. The residual processor 320 may include a dequantizer 321 and an inverse transformer 322. The entropy decoder 310, the residual processor 320, the predictor 330, the adder 340, and the filter 350, which have been described above, may be configured by one or more hardware components (e.g., decoder chipsets or processors) according to an embodiment. Further, the memory 360 may include a decoded picture buffer (DPB), and may be configured by a digital storage medium. The hardware component may further include the memory 360 as an internal/external component.

When the bitstream including the video/image information is input, the decoding apparatus 300 may reconstruct the image in response to a process in which the video/image information is processed in the encoding apparatus illustrated in FIG. 2. For example, the decoding apparatus 300 may derive the units/blocks based on block split-related information acquired from the bitstream. The decoding apparatus 300 may perform decoding using the processing unit applied to the encoding apparatus. Therefore, the processing unit for the decoding may be, for example, a coding unit, and the coding unit may be split according to the quad-tree structure, the binary-tree structure, and/or the ternary-tree structure from the coding tree unit or the maximum coding unit. One or more transform units may be derived from the coding unit. In addition, the reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (e.g., video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in this document may be decoded may decode the decoding procedure and obtained from the bitstream. For example, the entropy decoder 310 decodes the information in the bitstream based on a coding method such as exponential Golomb coding, context-adaptive variable length coding (CAVLC), or context-adaptive arithmetic coding (CABAC), and output syntax elements required for image reconstruction and quantized values of transform coefficients for residual. More specifically, the CABAC entropy decoding method may receive a bin corresponding to each syntax element in the bitstream, determine a context model by using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the the predictor (inter predictor 332 and intra predictor 331), and residual values on which the entropy decoding has been performed in the entropy decoder 310, that is, the quantized transform coefficients and related parameter information, may be input to the residual processor 320.

The dequantizer 321 may dequantize the quantized transform coefficients to output the transform coefficients. The dequantizer 321 may rearrange the quantized transform coefficients in a two-dimensional block form. In this case, the rearrangement may be performed based on a coefficient scan order performed by the encoding apparatus. The dequantizer 321 may perform dequantization for the quantized transform coefficients using a quantization parameter (e.g., quantization step size information), and acquire the transform coefficients.

The inverse transformer 322 inversely transforms the transform coefficients to acquire the residual signal (residual block, residual sample array).

The predictor 330 may perform the prediction of the current block, and generate a predicted block including the prediction samples of the current block. The predictor may determine whether the intra prediction is applied or the inter prediction is applied to the current block based on the information about prediction output from the entropy decoder 310, and determine a specific intra/inter prediction mode.

The predictor 330 may generate a prediction signal based on various prediction methods to be described later. For example, the predictor may apply intra prediction or inter prediction for prediction of one block, and may simultaneously apply intra prediction and inter prediction. This may be called combined inter and intra prediction (CIIP). In addition, the predictor may be based on an intra block copy (IBC) prediction mode or based on a palette mode for prediction of a block. The IBC prediction mode or the palette mode may be used for image/video coding of content such as games, for example, screen content coding (SCC). IBC may basically perform prediction within the current picture, but may be performed similarly to inter prediction in that a reference block is derived within the current picture. That is, IBC may use at least one of the inter prediction techniques described in this document. The palette mode may be considered as an example of intra coding or intra prediction. When the palette mode is applied, information on the palette table and the palette index may be included in the video/image information and signaled.

The intra predictor 3321 may predict the current block by referring to the samples in the current picture. The referred samples may be located in the neighborhood of the current block, or may be located apart from the current block according to the prediction mode. In intra prediction, prediction modes may include a plurality of non-directional modes and a plurality of directional modes. The intra predictor 331 may determine the prediction mode to be applied to the current block by using the prediction mode applied to the neighboring block.

The inter predictor 332 may derive a predicted block for the current block based on a reference block (reference sample array) specified by a motion vector on a reference picture. In this case, in order to reduce the amount of motion information being transmitted in the inter prediction mode, motion information may be predicted in the unit of blocks, subblocks, or samples based on correlation of motion information between the neighboring block and the current block. The motion information may include a motion vector and a reference picture index. The motion information may further include information on inter prediction direction (L0 prediction, L1 prediction, Bi prediction, and the like). In case of inter prediction, the neighboring block may include a spatial neighboring block existing in the current picture and a temporal neighboring block existing in the reference picture. For example, the inter predictor 332 may construct a motion information candidate list based on neighboring blocks, and derive a motion vector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, or reconstructed sample array) by adding the obtained residual signal to the prediction signal (predicted block or predicted sample array) output from the predictor (including inter predictor 332 and/or intra predictor 331). If there is no residual for the processing target block, such as a case that a skip mode is applied, the predicted block may be used as the reconstructed block.

The adder 340 may be called a reconstructor or a reconstructed block generator. The generated reconstructed signal may be used for the intra prediction of a next block to be processed in the current picture, and as described later, may also be output through filtering or may also be used for the inter prediction of a next picture.

Meanwhile, a luma mapping with chroma scaling (LMCS) may also be applied in the picture decoding process.

The filter 350 may improve subjective/objective image quality by applying filtering to the reconstructed signal. For example, the filter 350 may generate a modified reconstructed picture by applying various filtering methods to the reconstructed picture, and store the modified reconstructed picture in the memory 360, specifically, in a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 332. The memory 360 may store the motion information of the block from which the motion information in the current picture is derived (or decoded) and/or the motion information of the blocks in the picture having already been reconstructed. The stored motion information may be transferred to the inter predictor 332 so as to be utilized as the motion information of the spatial neighboring block or the motion information of the temporal neighboring block. The memory 360 may store reconstructed samples of reconstructed blocks in the current picture, and transfer the reconstructed samples to the intra predictor 331.

In this disclosure, the embodiments described in the filter 260, the inter predictor 221, and the intra predictor 222 of the encoding apparatus 200 may be applied equally or to correspond to the filter 350, the inter predictor 332, and the intra predictor 331.

Meanwhile, as described above, in performing video coding, prediction is performed to improve compression efficiency. Through this, a predicted block including prediction samples for a current block as a block to be coded (i.e., a coding target block) may be generated. Here, the predicted block includes prediction samples in a spatial domain (or pixel domain). The predicted block is derived in the same manner in an encoding apparatus and a decoding apparatus, and the encoding apparatus may signal information (residual information) on residual between the original block and the predicted block, rather than an original sample value of an original block, to the decoding apparatus, thereby increasing image coding efficiency. The decoding apparatus may derive a residual block including residual samples based on the residual information, add the residual block and the predicted block to generate reconstructed blocks including reconstructed samples, and generate a reconstructed picture including the reconstructed blocks.

The residual information may be generated through a transform and quantization procedure. For example, the encoding apparatus may derive a residual block between the original block and the predicted block, perform a transform procedure on residual samples (residual sample array) included in the residual block to derive transform coefficients, perform a quantization procedure on the transform coefficients to derive quantized transform coefficients, and signal related residual information to the decoding apparatus (through a bit stream). Here, the residual information may include value information of the quantized transform coefficients, location information, a transform technique, a transform kernel, a quantization parameter, and the like. The decoding apparatus may perform dequantization/inverse transform procedure based on the residual information and derive residual samples (or residual blocks). The decoding apparatus may generate a reconstructed picture based on the predicted block and the residual block. Also, for reference for inter prediction of a picture afterward, the encoding apparatus may also dequantize/inverse-transform the quantized transform coefficients to derive a residual block and generate a reconstructed picture based thereon.

Figure 4:
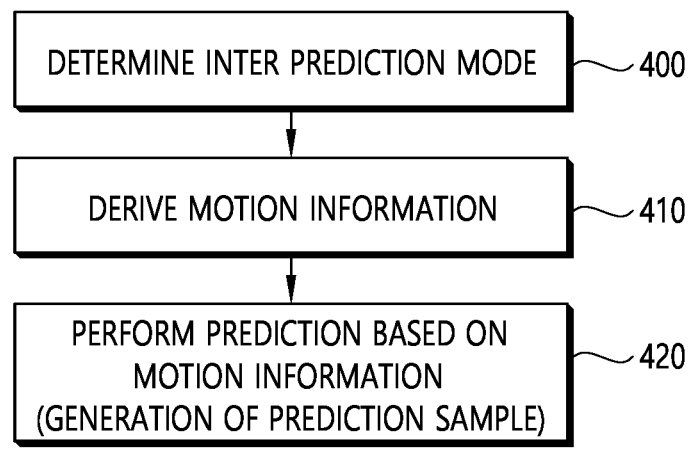
FIG. 4 is a diagram illustrating an example of an inter prediction procedure.

FIG. 4 is a diagram illustrating an example of an inter prediction procedure.

Referring to FIG. 4, the inter prediction procedure may include determining an inter prediction mode, deriving motion information according to the determined prediction mode, and performing prediction based on the derived motion information (generating a prediction sample). The inter prediction procedure may be performed by an encoding apparatus and a decoding apparatus, as described above. In the present disclosure, a coding apparatus may include an encoding apparatus and/or a decoding apparatus.

Referring to FIG. 4, the coding apparatus determines an inter prediction mode for a current block in operation S400. Various inter prediction modes may be used for prediction of the current block in a picture. For example, various modes such as a merge mode, a skip mode, a motion vector prediction (MVP) mode, an affine mode, a sub-block merge mode, and a merge with MVD (MMVD) mode may be used. A decoder side motion vector refinement (DMVR) mode, an adaptive motion vector resolution (AMVR) mode, a bi-prediction with CU-level weight (BCW), a bi-directional optical flow (BDOF), etc. may be further used as an auxiliary mode or may be used instead. The affine mode may be referred to as an affine motion prediction mode. The MVP mode may be referred to as an advanced motion vector prediction (AMVP) mode. In the present disclosure, some modes and/or motion information candidates derived by some modes may be included as one of motion information-related candidates of other modes. For example, the HMVP candidate may be added as a merge candidate of the merge/skip mode, or may be added as an MVP candidate of the MVP mode. When the HMVP candidate is used as a motion information candidate of the merge mode or skip mode, the HMVP candidate may be referred to as an HMVP merge candidate.

Prediction mode information indicating an inter prediction mode of the current block may be signaled from the encoding apparatus to the decoding apparatus. The prediction mode information may be included in a bitstream and received by the decoding apparatus. The prediction mode information may include index information indicating one of a plurality of candidate modes. Alternatively, the inter prediction mode may be indicated through hierarchical signaling of flag information. In this case, the prediction mode information may include one or more flags. For example, a skip flag is signaled to indicate whether to apply the skip mode; when the skip mode is not applied, a merge flag is signaled to indicate whether to apply the merge mode; and when the merge mode is not applied, it may be indicated that the MVP mode is applied or a flag may be further signaled for additional classification. The affine mode may be signaled as an independent mode, or may be signaled as a mode dependent on the merge mode or the MVP mode. For example, the affine mode may include an affine merge mode and an affine MVP mode.

The coding apparatus derives motion information on the current block in operation S410. The motion information may be derived based on the inter prediction mode.

The coding apparatus may perform inter prediction using motion information on the current block. The encoding apparatus may derive optimal motion information on the current block through a motion estimation procedure. For example, the encoding apparatus may search for a similar reference block with high correlation in a fractional pixel unit within a predetermined search range in a reference picture by using an original block in an original picture for the current block, and may derive motion information using the similar reference block. A block similarity may be derived based on a difference between phase-based sample values. For example, the block similarity may be calculated based on an SAD between the current block (or a template of the current block) and a reference block (or a template of the reference block). In this case, motion information may be derived based on a reference block having a smallest SAD in a search area. The derived motion information may be signaled to the decoding apparatus according to any of various methods based on the inter prediction mode.

The coding apparatus performs inter prediction based on the motion information on the current block in operation S420. The coding apparatus may derive a prediction sample(s) for the current block based on the motion information. The current block including the prediction samples may be referred to as a predicted block.

Figure 5:
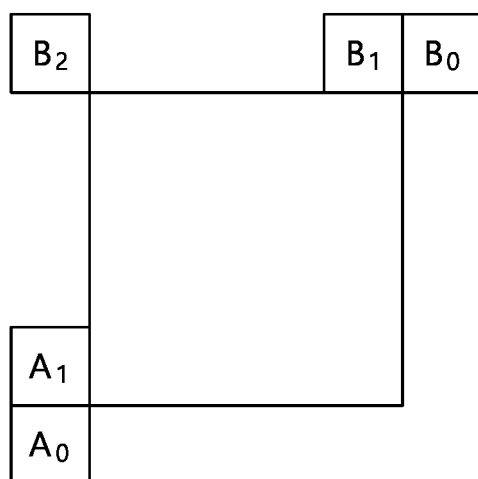
FIG. 5 is a diagram for explaining a merge mode in inter prediction.

FIG. 5 is a diagram for explaining a merge mode in inter prediction.

When the merge mode is applied, motion information on the current prediction block is not directly transmitted, but the motion information on the current prediction block is derived using motion information on a neighboring prediction block. Accordingly, the motion information on the current prediction block may be indicated by transmitting flag information indicating that the merge mode is used and a merge index indicating which prediction block in the vicinity is used. The merge mode may be referred to as a regular merge mode. For example, the merge mode may be applied when a value of a regular_merge_flag syntax element is 1.

In order to perform the merge mode, the encoding apparatus needs to search for a merge candidate block used to derive motion information on the current prediction block. For example, up to five merge candidate blocks may be used, but the embodiment(s) of the present disclosure are not limited thereto. In addition, the maximum number of merge candidate blocks may be transmitted in a slice header or a tile group header, but the embodiment(s) of the present disclosure are not limited thereto. After finding the merge candidate blocks, the encoding apparatus may generate a merge candidate list, and may select a merge candidate block having the smallest cost among the merge candidate blocks as a final merge candidate block.

The present disclosure may provide various embodiments of merge candidate blocks constituting the merge candidate list.

For example, the merge candidate list may use five merge candidate blocks. For example, four spatial merge candidates and one temporal merge candidate may be used. As a specific example, in the case of the spatial merge candidate, blocks illustrated in FIG. 4 may be used as the spatial merge candidates. Hereinafter, the spatial merge candidate or a spatial MVP candidate to be described later may be referred to as an SMVP, and the temporal merge candidate or a temporal MVP candidate to be described later may be referred to as a TMVP.

The merge candidate list for the current block may be constructed, for example, based on the following procedure.

The coding apparatus (encoding apparatus/decoding apparatus) may insert spatial merge candidates, which are derived by searching for spatial neighboring blocks of the current block, into the merge candidate list. For example, the spatial neighboring blocks may include a bottom-left corner neighboring block, a left neighboring block, a top-right corner neighboring block, a top neighboring block, and a top-left corner neighboring block of the current block. However, this is merely an example, and in addition to the above-described spatial neighboring blocks, other neighboring blocks such as a right neighboring block, a bottom neighboring block, and a bottom-right neighboring block may be further used as the spatial neighboring blocks. The coding apparatus may detect available blocks by searching for the spatial neighboring blocks based on priority, and may derive motion information on the detected blocks as the spatial merge candidates. For example, the encoding apparatus or the decoding apparatus may search for five blocks shown in FIG. 5 in the order of A1→B1 B0→A0→B2, and sequentially index available candidates to construct a merge candidate list.

The coding apparatus may search for a temporal neighboring block of the current block and insert a derived temporal merge candidate into the merge candidate list. The temporal neighboring block may be positioned at a reference picture that is a different picture from the current picture in which the current block is positioned. The reference picture in which the temporal neighboring blocks are positioned may be called a collocated picture or a col picture. The temporal neighboring blocks may be searched for in the order of the bottom-right corner neighboring block and the bottom-right center block of the co-located block with respect to the current block on the col picture. Meanwhile, when motion data compression is applied, specific motion information may be stored as representative motion information on each predetermined storage unit in the col picture. In this case, there is no need to store motion information on all blocks in the predetermined storage unit, and through this, a motion data compression effect may be obtained. In this case, the predetermined storage unit may be predetermined as, for example, units of 16×16 samples or units of 8×8 samples, or size information on the predetermined storage unit may be signaled from the encoding apparatus to the decoding apparatus. When the motion data compression is applied, the motion information on the temporally neighboring blocks may be replaced with representative motion information on the predetermined storage unit in which the temporally neighboring blocks are positioned. That is, in this case, from an implementation point of view, instead of the predicted block positioned at the coordinates of the temporally neighboring blocks, the temporal merge candidate may be derived based on the motion information on the prediction block covering the arithmetic left shifted position after arithmetic right shift by a certain value based on the coordinates (top-left sample position) of the temporal neighboring block. For example, when the predetermined storage unit is units of 2n×2n samples, if the coordinates of the temporally neighboring blocks are (xTnb, yTnb), the motion information on the prediction block positioned at the corrected position ((xTnb>>n)<<n), (yTnb>>n)<<n)) may be used for the temporal merge candidate. Specifically, when the predetermined storage unit is units of 16×16 samples, if the coordinates of the temporally neighboring blocks are (xTnb, yTnb), the motion information on the prediction block positioned at the corrected position ((xTnb>>4)<<4), (yTnb>>4)<<4)) may be used for the temporal merge candidate. Alternatively, when the predetermined storage unit is units of 8×8 samples, if the coordinates of the temporally neighboring blocks are (xTnb, yTnb), the motion information on the prediction block positioned at the corrected position ((xTnb>>3)<<3), (yTnb>>3)<<3)) may be used for the temporal merge candidate.

The coding apparatus may check whether the number of current merge candidates is smaller than the number of maximum merge candidates. The maximum number of merge candidates may be predefined or signaled from the encoding apparatus to the decoding apparatus. For example, the encoding apparatus may generate and encode information on the maximum number of merge candidates, and transmit the information to the decoder in the form of a bitstream. When the maximum number of merge candidates is filled, the subsequent candidate addition process may not proceed.

As a result of the check, when the number of the current merge candidates is smaller than the maximum number of merge candidates, the coding apparatus may insert an additional merge candidate into the merge candidate list. For example, the additional merge candidates may include at least one of a history based merge candidate(s), pair-wise average merge candidate(s), ATMVP, a combined bi-predictive merge candidate (when the slice/tile group type of the current slice/tile group is type B) and/or a zero vector merge candidate which will be described later.

As a result of the check, when the number of the current merge candidates is not smaller than the maximum number of merge candidates, the coding apparatus may terminate the construction of the merge candidate list. In this case, the encoding apparatus may select an optimal merge candidate from among the merge candidates constituting the merge candidate list based on rate-distortion (RD) cost, and signal selection information indicating the selected merge candidate (ex. merge index) to the decoding apparatus. The decoding apparatus may select the optimal merge candidate based on the merge candidate list and the selection information.

As described above, the motion information on the selected merge candidate may be used as the motion information on the current block, and prediction samples of the current block may be derived based on the motion information on the current block. The encoding apparatus may derive residual samples of the current block based on the prediction samples, and may signal residual information on the residual samples to the decoding apparatus. As described above, the decoding apparatus may generate reconstructed samples based on residual samples derived based on the residual information and the prediction samples, and may generate a reconstructed picture based thereon.

When the skip mode is applied, the motion information on the current block may be derived in the same way as when the merge mode is applied. However, when the skip mode is applied, the residual signal for the corresponding block is omitted, and thus the prediction samples may be directly used as the reconstructed samples. The skip mode may be applied, for example, when the value of the cu_skip_flag syntax element is 1.

Meanwhile, the pair-wise average merge candidate may be referred to as a pair-wise average candidate or a pair-wise candidate. The pair-wise average candidate(s) may be generated by averaging pairs of predefined candidates in an existing merge candidate list. In addition, predefined pairs may be defined as {(0, 1), (0, 2), (1, 2), (0, 3), (1, 3), (2, 3)}. Here, the numbers may indicate merge indices for the merge candidate list. An averaged motion vector may be calculated separately for each reference list. For example, when two motion vectors are available in one list, the two motion vectors may be averaged even if they point to different reference pictures. For example, when only one motion vector is available, one motion vector may be used directly. For example, when there are no motion vectors available, the list may remain invalid.

For example, when the merge candidate list is not full even after pair-wise average merge candidates are added, that is, when the number of current merge candidates in the merge candidate list is smaller than the number of maximum merge candidates, a zero vector (zero MVP) may be inserted last until the maximum merge candidate number appears. That is, a zero vector may be inserted until the number of current merge candidates in the merge candidate list becomes the maximum number of merge candidates.

Meanwhile, conventionally, only one motion vector can be used to express a motion of a coding block. That is, a translational motion model can be used. However, although this method may have expressed the optimal motion in a block unit, it is not the actual optimal movement of each sample, and if it is possible to determine an optimal motion vector in a sample unit, coding efficiency may improve. To this end, an affine motion model may be used. The affine motion prediction method, which is to perform coding using the affine motion model, may efficiently express four motions as described below.

Figure 6:
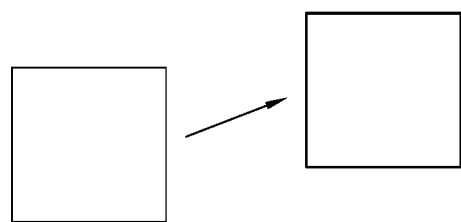
FIG. 6 is a diagram illustrating an example of a motion represented by an affine motion model.
Figure 6:
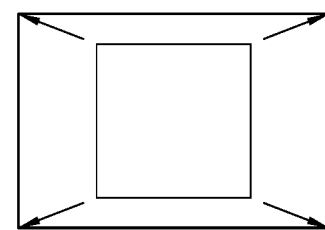
Figure 6:
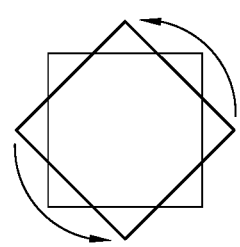
Figure 6:
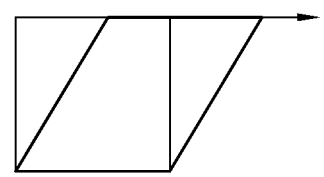

FIG. 6 is a diagram illustrating an example of a motion expressed by an affine motion model.

Referring to FIG. 6, motions that can be expressed by the affine motion model may include a translational motion, a scale motion, a rotational motion, and a shear motion. That is, not only the translational motion in which (a part of) the image moves in a plane over time as shown in FIG. 6, but also the scale motion in which (a part of) the image is scaled over time, the rotational motion in which (a part of) the image rotates over time, and the shear motion in which (a part of) the image is deformed into a parallelogram shape over time may be efficiently expressed through the affine motion prediction.

The encoding apparatus/decoding apparatus may predict a distorted shape of an image based on motion vectors at control points (CPs) of the current block through the affine motion prediction. In doing so, the encoding apparatus/decoding apparatus may increase the accuracy of the prediction, thereby improving performance in compressing the image. In addition, a motion vector for at least one control point of the current block may be derived using a motion vector of a neighboring block of the current block, thereby reducing the amount of data on added additional information and improving inter prediction efficiency.

An affine motion model which expresses three motions (translation, scale, and rotation) among the motions that can be expressed by the affine motion model may be referred to as a similarity (or simplified) affine motion model. However, the affine movement model is not limited to the above-described movement model.

The affine motion prediction method may express a motion vector in each sample unit of a block using two, three, or four motion vectors.

Figure 7A:
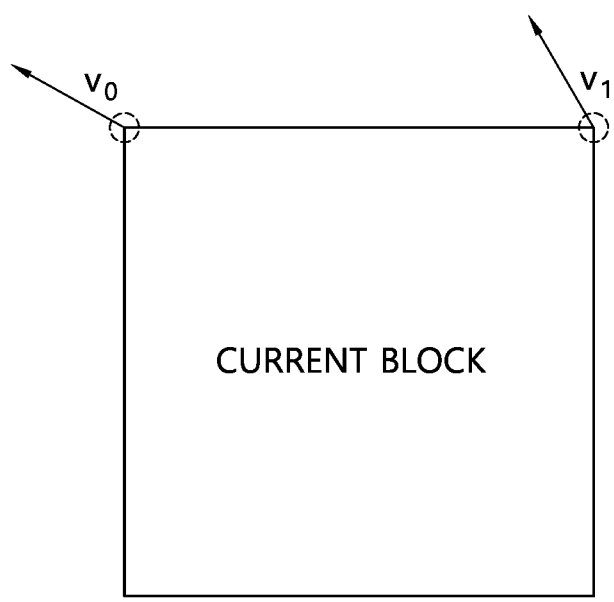
FIGS. 7A and 7B are diagrams illustrating an example of control point motion vectors (CPMVs) for affine motion prediction.
Figure 7B:
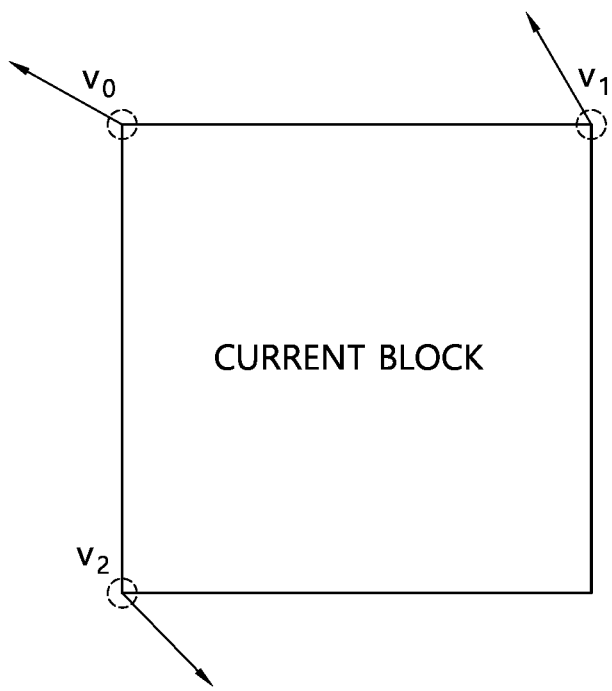

FIGS. 7A and 7B are diagrams illustrating an example of control point motion vectors (CPMVs) for affine motion prediction.

In the affine motion prediction, it is possible to determine a motion vector of a sample position included in a block using two or more control point motion vectors (CPMVs). In this case, a set of motion vectors may be referred to as an affine motion vector field (MVF).

For example, FIG. 7A may illustrate a case where two CPMVs are used, which may be referred to as a 4-parameter affine model. In this case, a motion vector at an (x, y) sample position may be determined as in Equation 1, for example.

$$\begin{cases} mv_x = \dfrac{mv_{1x} - mv_{0x}}{W}x + \dfrac{mv_{1y} - mv_{0y}}{W}y + mv_{0x} \\ mv_y = \dfrac{mv_{1y} - mv_{0y}}{W}x + \dfrac{mv_{1x} - mv_{0x}}{W}y + mv_{0y} \end{cases} \quad \text{[Equation 1]}$$

For example, FIG. 7B may illustrate a case where three CPMVs are used, which may be referred to as a 6-parameter affine model. In this case, a motion vector at a sample position of (x, y) may be determined as in Equation 2, for example.

$$\begin{cases} mv_x = \dfrac{mv_{1x} - mv_{0x}}{W}x + \dfrac{mv_{2x} - mv_{0x}}{H}y + mv_{0x} \\ mv_y = \dfrac{mv_{1y} - mv_{0y}}{W}x + \dfrac{mv_{2y} - mv_{0y}}{H}y + mv_{0y} \end{cases} \quad \text{[Equation 2]}$$

In Equations 1 and 2, {vx, vy} may indicate a motion vector at the position of (x, y). In addition, {v0x, v0y} may indicate a CPMV of a control point (CP) at the top-left corner of the coding block, {v1x, v1y} may indicate a CPMV of a CP at the top-right corner of the coding block, and {v2x, v2y} may indicate a CPMV of a CP at the bottom-left corner of the coding block. In addition, W may indicate a width of the current block, and H may indicate a height of the current block.

Figure 8:
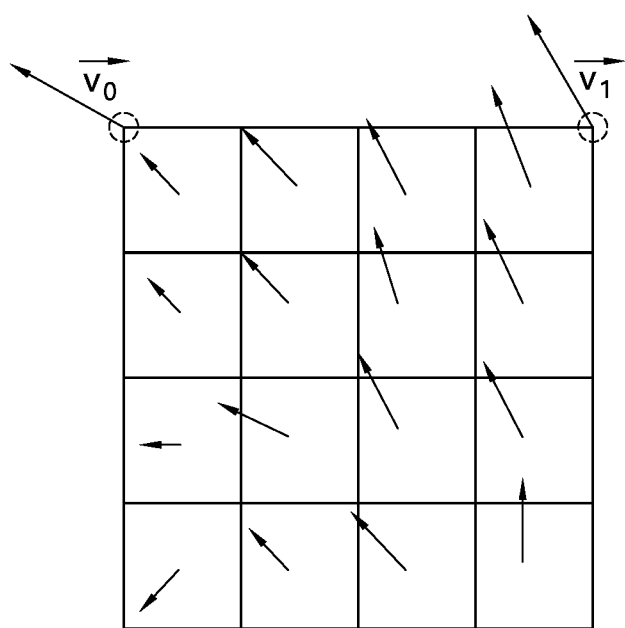
FIG. 8 is a diagram illustrating an example in which an affine MVF is determined in a sub-block unit.

FIG. 8 is a diagram illustrating an example in which an affine MVF is determined in a sub-block unit.

In an encoding/decoding process, the affine MVF may be determined in a sample unit or in a predefined sub-block unit. For example, when the affine MVF is determined in a sample unit, a motion vector may be obtained based on each sample value. Alternatively, for example, when the affine MVF is determined in a sub-block unit, a motion vector of a corresponding block may be obtained based on a sample value of the center (which is the bottom-right side of the center, that is, the bottom-right sample among the four center samples) of the sub-blocks. That is, the motion vector of the current block in the affine motion estimation may be derived in a sample or sub-block unit.

In the case of FIG. 8, the affine MVF is determined in the unit of 4×4 sub-blocks, but the size of the sub-blocks may be variously modified.

That is, when the affine prediction is available, three motion models applicable to the current block may include a translational motion model, a 4-parameter affine motion model, and a 6-parameter affine motion model. Here, the translational motion model may represent a model in which the existing block unit motion vector is used, the 4-parameter affine motion model may represent a model in which two CPMVs are used, and the 6-parameter affine motion model may represent a model in which three CPMVs are used.

Meanwhile, the affine motion prediction may include an affine MVP (or affine inter) mode or an affine merge mode.

Figure 9:
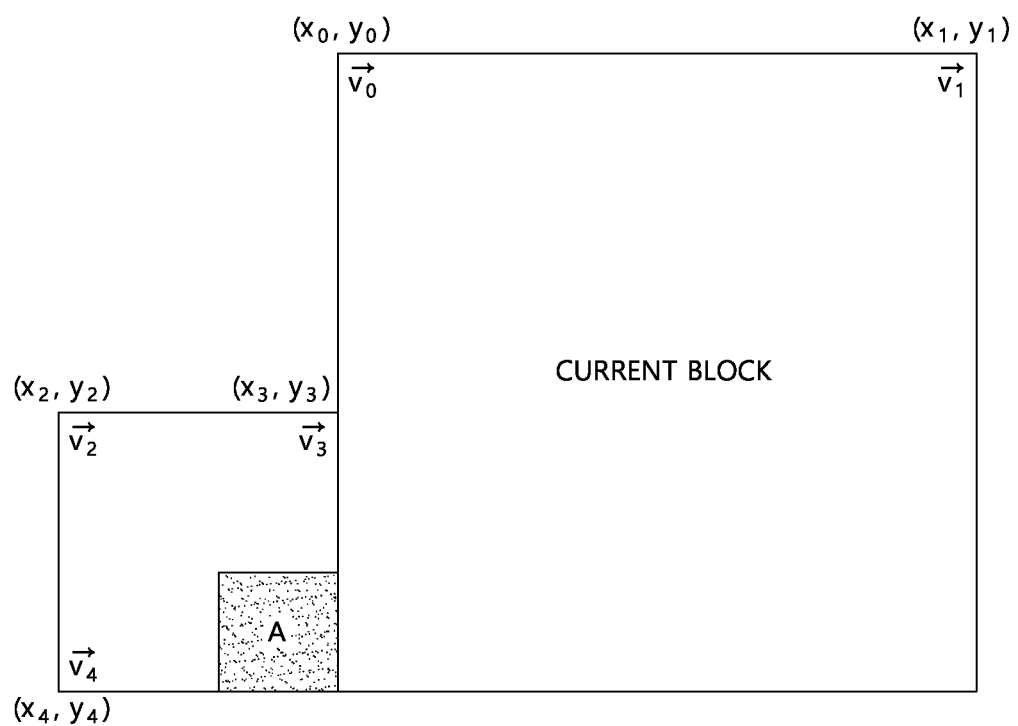
FIG. 9 is a diagram for explaining an affine merge mode in inter prediction.

FIG. 9 is a diagram for explaining an affine merge mode in inter prediction.

For example, in the affine merge mode, the CPMV may be determined according to the affine motion model of the neighboring block coded by the affine motion prediction. For example, neighboring blocks coded as affine motion prediction in search order may be used for affine merge mode. That is, when at least one of neighboring blocks is coded in the affine motion prediction, the current block may be coded in the affine merge mode. Here, the fine merge mode may be called AF_MERGE.

When the affine merge mode is applied, the CPMVs of the current block may be derived using CPMVs of neighboring blocks. In this case, the CPMVs of the neighboring block may be used as the CPMVs of the current block as they are, and the CPMVs of the neighboring block may be modified based on the size of the neighboring block and the size of the current block and used as the CPMVs of the current block.

On the other hand, in the case of the affine merge mode in which the motion vector (MV) is derived in units of subblocks, it may be called a subblock merge mode, which may be indicated based on a subblock merge flag (or a merge_subblock_flag syntax element). Alternatively, when the value of the merge_subblock_flag syntax element is 1, it may be indicated that the subblock merge mode is applied. In this case, an affine merge candidate list to be described later may be called a subblock merge candidate list. In this case, the subblock merge candidate list may further include a candidate derived by SbTMVP, which will be described later. In this case, the candidate derived by the SbTMVP may be used as a candidate of index 0 of the subblock merge candidate list. In other words, the candidate derived from the SbTMVP may be positioned before an inherited affine candidate or a constructed affine candidate to be described later in the subblock merge candidate list.

When the affine merge mode is applied, the affine merge candidate list may be constructed to derive CPMVs for the current block. For example, the affine merge candidate list may include at least one of the following candidates. 1) An inherited affine merge candidate. 2) Constructed affine merge candidate. 3) Zero motion vector candidate (or zero vector). Here, the inherited affine merge candidate is a candidate derived based on the CPMVs of the neighboring block when the neighboring block is coded in affine mode, the constructed affine merge candidate is a candidate derived by constructing the CPMVs based on the MVs of neighboring blocks of the corresponding CP in units of each CPMV, and the zero motion vector candidate may indicate a candidate composed of CPMVs whose value is 0.

The affine merge candidate list may be constructed as follows, for example.

There may be up to two inherited affine candidates, and the inherited affine candidates may be derived from affine motion models of neighboring blocks. Neighboring blocks can contain one left neighboring block and a top neighboring block. The candidate blocks may be positioned as illustrated in FIG. 4. A scan order for a left predictor may be $A_1 \rightarrow A_0$, and a scan order for the top predictor may be $B_1 \rightarrow B_0 \rightarrow B_2$. Only one inherited candidate from each of the left and top may be selected. A pruning check may not be performed between two inherited candidates.

When a neighboring affine block is identified, control point motion vectors of the identified block may be used to derive a CPMVP candidate in the affine merge list of the current block. In this case, the neighboring affine block may indicate a block coded in the affine prediction mode among neighboring blocks of the current block. For example, referring to FIG. 8, when a bottom-left neighboring block A is coded in the affine prediction mode, a motion vector v2 of the top-left corner of the neighboring block A, a motion vector v2 of the top-right corner of the neighboring block A, and a motion vector v4 of the bottom-left corner of the neighboring block A may be obtained. When the neighboring block A is coded with the 4-parameter affine motion model, two CPMVs of the current block may be calculated according to v2 and v3. When the neighboring block A is coded with the 6-parameter affine motion model, three CPMVs of the current block may be calculated according to v2, v3 and v4.

Figure 10:
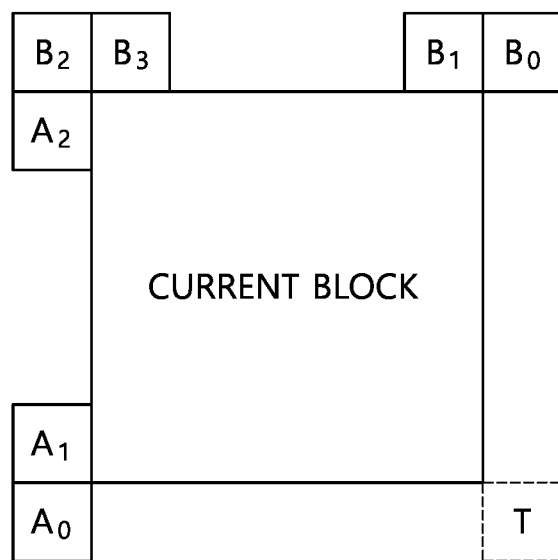
FIG. 10 is a diagram for explaining positions of candidates in the affine merge mode.

FIG. 10 is a diagram for explaining positions of candidates in the affine merge mode.

A constructed affine candidate may refer to a candidate constructed by combining neighboring translational motion information on each control point. Motion information on control points may be derived from specified spatial neighborhoods and temporal neighborhoods. CPMVk (k=0, 1, 2, 3) may indicate a k-th control point.

Referring to FIG. 10, for CPMV0, blocks may be checked in the order of $B2 \rightarrow B3 \rightarrow A2$ and a motion vector of a first available block may be used. For CPMV1, blocks may be checked in the order of $B1 \rightarrow B0$. For CPMV2, blocks may be checked in the order of $A1 \rightarrow A0$. A temporal motion vector predictor (TMVP) may be used as CPMV3, if available.

After motion vectors of four control points are obtained, the affine merge candidates may be generated based on the acquired motion information. The combination of the control point motion vectors may correspond to any one of {CPMV0, CPMV1, CPMV2}, {CPMV0, CPMV1, CPMV3}, {CPMV0, CPMV2, CPMV3}, {CPMV1, CPMV2, CPMV3}, {CPMV0, CPMV1}, and {CPMV0, CPMV2}.

A combination of three CPMVs may constitute a 6-parameter affine merge candidate, and a combination of two CPMVs may constitute a 4-parameter affine merge candidate. In order to avoid the motion scaling process, when the reference indices of the control points are different, the relevant combinations of the control point motion vectors may be discarded.

Figure 11:
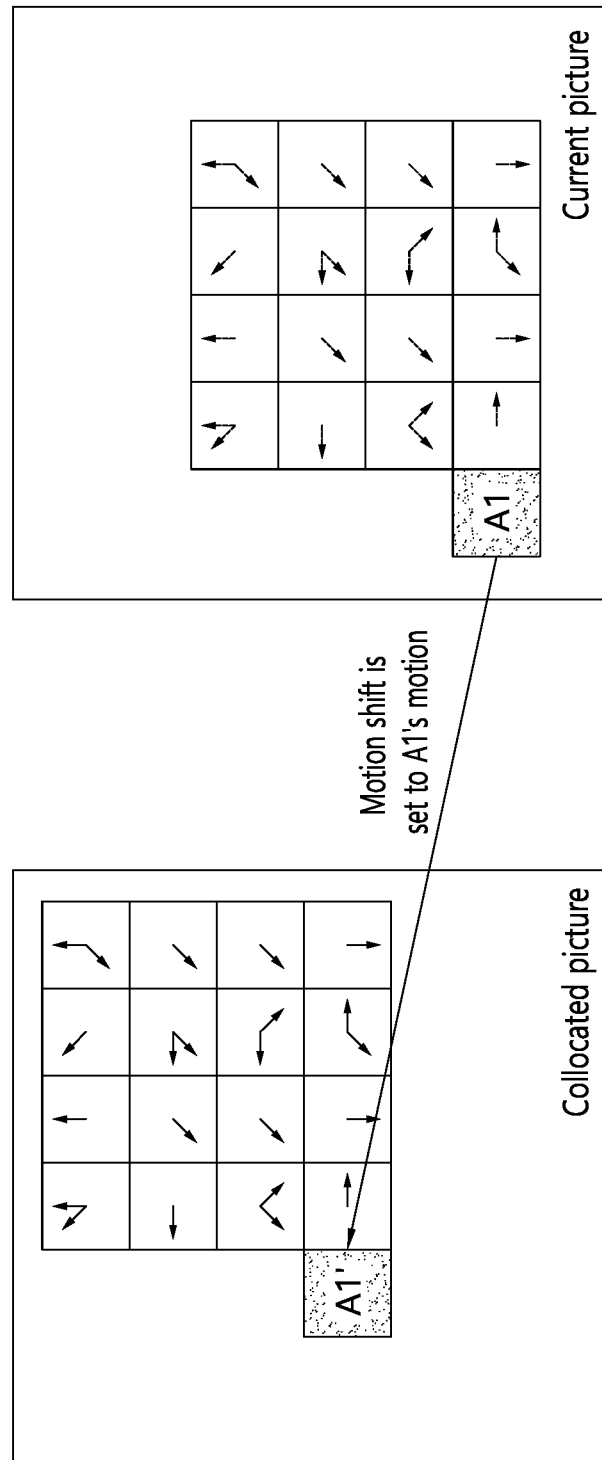
FIG. 11 is a diagram for explaining sub-block-based temporal motion vector prediction (SbTMVP) in inter prediction.

FIG. 11 is a diagram for explaining sub-block-based temporal motion vector prediction (SbTMVP) in inter prediction.

Meanwhile, the subblock-based temporal motion vector prediction (SbTMVP) method may also be used. For example, the SbTMVP may be called advanced temporal motion vector prediction (ATMVP). The SbTMVP may use a motion field in a collocated picture to improve motion vector prediction and merge mode for CUs in the current picture. Here, the collocated picture may be called a col picture.

For example, the SbTMVP may predict motion at a subblock (or sub-CU) level. In addition, the SbTMVP may apply a motion shift before fetching the temporal motion information from the col picture. Here, the motion shift may be acquired from a motion vector of one of spatially neighboring blocks of the current block.

The SbTMVP may predict the motion vector of a subblock (or sub-CU) in the current block (or CU) according to two steps.

In the first step, the spatially neighboring blocks may be tested according to the order of $A_1$, $B_1$, $B_0$ and $A_0$ in FIG. 4. A first spatial neighboring block having a motion vector using a col picture as its reference picture may be checked, and the motion vector may be selected as a motion shift to be applied. When such a motion is not checked from spatially neighboring blocks, the motion shift may be set to (0, 0).

In the second step, the motion shift checked in the first step may be applied to obtain sub-block level motion information (motion vector and reference indices) from the col picture. For example, the motion shift may be added to the coordinates of the current block. For example, the motion shift may be set to the motion of $A_1$ of FIG. 4. In this case, for each subblock, the motion information on a corresponding block in the col picture may be used to derive the motion information on the subblock. The temporal motion scaling may be applied to align reference pictures of temporal motion vectors with reference pictures of the current block.

The combined subblock-based merge list including both the SbTVMP candidates and the affine merge candidates may be used for signaling of the affine merge mode. Here, the affine merge mode may be referred to as a subblock-based merge mode. The SbTVMP mode may be available or unavailable according to a flag included in a sequence parameter set (SPS). When the SbTMVP mode is available, the SbTMVP predictor may be added as the first entry of the list of subblock-based merge candidates, and the affine merge candidates may follow. The maximum allowable size of the affine merge candidate list may be five.

The size of the sub-CU (or subblock) used in the SbTMVP may be fixed to 8×8, and as in the affine merge mode, the SbTMVP mode may be applied only to blocks having both a width and a height of 8 or more. The encoding logic of the additional SbTMVP merge candidate may be the same as that of other merge candidates. That is, for each CU in the P or B slice, an RD check using an additional rate-distortion (RD) cost may be performed to determine whether to use the SbTMVP candidate.

Meanwhile, the predicted block for the current block may be derived based on the motion information derived according to the prediction mode. The predicted block may include prediction samples (prediction sample array) of the current block. When the motion vector of the current block indicates a fractional sample unit, an interpolation procedure may be performed. Through this, the prediction samples of the current block may be derived based on the fractional sample unit reference samples in the reference picture. When the affine inter-prediction (affine prediction mode) is applied to the current block, the prediction samples may be generated based on a sample/subblock unit MV. When the bi-prediction is applied, the prediction samples may be used as the prediction samples of the current block derived through a weighted sum or weighted average (according to a phase) of the prediction samples derived based on the L0 prediction (ie, prediction using the reference picture and MVL0 in the reference picture list L0) and the prediction samples derived based on the L1 prediction (ie, prediction using the reference picture and MVL1 in the reference picture list L1). Here, the motion vector in the L0 direction may be referred to as an L0 motion vector or MVL0, and the motion vector in the L1 direction may be referred to as an L1 motion vector or MVL1. In the case where the bi-prediction is applied, when the reference picture used for the L0 prediction and the reference picture used for the L1 prediction are positioned in different temporal directions with respect to the current picture (that is, case corresponding to the bidirectional direction or bi-prediction), which may be called a true bi-prediction.

Also, as described above, reconstructed samples and reconstructed pictures may be generated based on the derived prediction samples, and then procedures such as in-loop filtering may be performed.

Meanwhile, when the bi-prediction is applied to the current block, the prediction samples may be derived based on a weighted average. For example, the bi-prediction using the weighted average may be called bi-prediction with CU-level weight (BCW), bi-prediction with weighted Average (BWA), or weighted averaging bi-prediction.

Conventionally, the bi-prediction signal (ie, bi-prediction samples) may be derived through a simple average of the L0 prediction signal (L0 prediction samples) and the L1 prediction signals. That is, the bi-prediction samples are derived as an average of the L0 prediction samples based on the L0 reference picture and MVL0 and the L1 prediction samples based on the L1 reference picture and MVL1. However, when the bi-prediction is applied, the bi-prediction signal (bi-prediction samples) may be derived through the weighted average of the L0 prediction signal and the L1 prediction signal as follows. For example, the bi-prediction signals (bi-prediction samples) may be derived as in Equation 3.

$$P_{bi\text{-}pred}=((8-w)*P_0+w*P_1+4)>>3 \quad \text{[Equation 3]}$$

In Equation 3, Pbi-pred may indicate a value of a bi-prediction signal, that is, a prediction sample value derived by applying bi-prediction, and w may indicate a weight. In addition, P0 may indicate the value of the L0 prediction signal, that is, the prediction sample value derived by applying the L0 prediction, and P1 may indicate the value of the L1 prediction signal, ie, the prediction sample value derived by applying the L1 prediction.

For example, 5 weights may be allowed in the weighted average bi-prediction. For example, the five weights w may include −2, 3, 4, 5, or 10. That is, the weight w may be determined as one of weight candidates including −2, 3, 4, 5, or 10. For each CU to which the bi-prediction is applied, the weight w may be determined by one of two methods. In the first method, the weight index may be signaled after a motion vector difference for an unmerged CU. In the second method, a weight index for a merged CU may be inferred from neighboring blocks based on a merge candidate index.

For example, the weighted average bi-prediction may be applied to a CU having 256 or more luma samples. That is, when the product of the width and height of the CU is greater than or equal to 256, the weighted average bi-prediction may be applied. In the case of a low-delay (low-delay) picture, five weights may be used, and in the case of a non-low-delay picture, three weights may be used. For example, the three weights may include 3, 4 or 5.

For example, in the encoding apparatus, a fast search algorithm may be applied to find a weight index without significantly increasing the complexity of the encoding apparatus. This algorithm may be summarized as follows. For example, when the current picture is a low-delay picture when combined with adaptive motion vector resolution (AMVR) (when AMVR is used as inter-prediction mode), unequal weights may be conditionally checked for 1-pel and 4-pel motion vector precision. For example, when combined with affine (when the affine prediction mode is used as the inter-prediction mode), in the case where the affine prediction mode is currently selected as the best mode, the affine motion estimation (ME) may be performed on unequal weights. For example, when two reference pictures of bi-prediction are the same, unequal weights may be conditionally checked. For example, when a specific condition is satisfied depending on a POC distance between the current picture and a reference picture, a coding quantization parameter (QP), and a temporal level, unequal weights may not be searched.

For example, the BCW weight index may be coded using one context coded bin followed by a bypass coded bin. The first context coded bin may indicate whether the same weight is used. When the unequal weights are used based on the first context coded bin, additional bins may be signaled using bypass coding to indicate unequal weights to be used.

Meanwhile, when the bi-prediction is applied, weight information used to generate prediction samples may be derived based on weight index information on a candidate selected from among candidates included in the merge candidate list.

According to an embodiment of the present disclosure, when constructing a motion vector candidate for a merge mode, weight index information on a temporal motion vector candidate may be derived as follows. For example, when a temporal motion vector candidate uses bi-prediction, weight index information on a weighted average may be derived. That is, when the inter-prediction type is bi-prediction, weight index information (or a temporal motion vector candidate) on a temporal merge candidate in the merge candidate list may be derived.

For example, weight index information on a weighted average with respect to a temporal motion vector candidate may always be derived as 0. Here, the weight index information on 0 may mean that the weights of each reference direction (ie, the L0 prediction direction and the L1 prediction direction in bi-prediction) are the same. For example, a procedure for deriving a motion vector of a luma component for the merge mode may be shown in Table 1 below.

TABLE 1

8.4.2.2 Derivation process for luma motion vectors for merge mode

This process is only invoked when merge_flag[ xCb ][ yPb ] is equal to 1, where ( xCb, yCb ) specify the top-left sample of the current luma coding block relative to the top-left luma sample of the current picture.
Inputs to this process are:
   a luma location ( xCb, yCb ) of the top-left sample of the current luma coding block relative to the top-left luma sample of the current picture,
   a variable cbWidth specifying the width of the current coding block in luma samples,
   a variable cbHeight specifying the height of the current coding block in luma samples.
Outputs of this process are:
   the luma motion vectors in 1/16 fractional-sample accuracy mvL0[ 0 ][ 0 ] and mvL1[ 0 ][ 0 ],
   the reference indices refIdxL0 and refIdxL1,
   the prediction list utilization flags predFlagL0[ 0 ][ 0 ] and predFlagL1[ 0 ][ 0 ],
   the bi-prediction weight index gbiIdx.
The bi-prediction weight index gbiIdx is set equal to 0.
The motion vectors mvL0[ 0 ][ 0 ] and mvL1[ 0 ][ 0 ], the reference indices refIdxL0 and refIdxL1 and the prediction utilization flags predFlagL0[ 0 ][ 0 ] and predFlagL1[ 0 ][ 0 ] are derived by the following ordered steps:
1. The derivation process for merging candidates from neighbouring coding units as specified in clause 8.4.2.3 is invoked with the luma coding block location ( xCb, yCb ), the luma coding block width cbWidth, and the luma coding block height cbHeight as inputs, and the output being the availability flags availableFlag$A_0$, availableFlag$A_1$, availableFlag$B_0$, availableFlag$B_1$ and availableFlag$B_2$, the reference indices refIdxLX$A_0$, refIdxLX$A_1$, refIdxLX$B_0$, refIdxLX$B_1$ and refIdxLX$B_2$, the prediction list utilization flags predFlagLX$A_0$, predFlagLX$A_1$, predFlagLX$B_0$, predFlagLX$B_1$ and predFlagLX$B_2$, and the motion vectors mvLX$A_0$, mvLX$A_1$, mvLX$B_0$, mLX$B_1$ and mvLX$B_2$, with X being 0 or 1, and the bi-prediction weight indices gbiIdx$A_0$, gbiIdx$A_1$, gbiIdx$B_0$, gbiIdx$B_1$, gbiIdx$B_2$.
2. The reference indices, refIdxLXCol, with X being 0 or 1, and the bi-prediction weight index gbiIdxCol for the temporal merging candidate Col are set equal to 0.
3. The derivation process for temporal luma motion vector prediction as specified in in clause 8.4.2.11 is invoked with the luma location ( xCb, yCb ), the luma coding block width cbWidth, the luma coding block height cbHeight and the variable refIdxL0Col as inputs, and the output being the availability flag availableFlagL0Col and the temporal motion vector mvL0Col. The variables availableFlagCol, predFlagL0Col and predFlagL1Col are derived as follows:
     availableFlagCol = availableFlagL0Col      (8-283)
     predFlagL0Col = availableFlagL0Col      (8-284)
     predFlagL1Col = 0      (8-285)
     gbiIdxCol = 0
     (8-xxx)
4. When tile_group_type is equal to B, the derivation process for temporal luma motion vector prediction as specified in clause 8.4.2.11 is invoked with the luma location ( xCb, yCb ) the luma coding block width cbWidth, the luma coding block height cbHeight and the variable refIdxL1Col as inputs, and the output being the availability flag availableFlagL1Col and the temporal motion vector mvL1Col. The variables availableFlagCol and predFlagL1Col are derived as follows:
     availableFlagCol = availableFlagL0Col | | availableFlagL1Col      (8-286)
     predFlagL1Col = availableFlagL1Col      (8-287)
5. The merging candidate list, mergeCandList, is constructed as follows:
    i = 0
    if( availableFlag$A_1$ )
      mergeCandList[ i++ ] = $A_1$
    if( availableFlag$B_1$ )
      mergeCandList[ i++ ] = $B_1$
    if( availableFlag$B_0$ )
      mergeCandList[ i++ ] = $B_0$      (8-288)
    if( availableFlag$A_0$ )
      mergeCandList[ i++ ] = $A_0$
    if( availableFlag$B_2$ )
      mergeCandList[ i++ ] = $B_2$
    if( availableFlagCol )
      mergeCandList[ i++ ] = Col
6. The variable numCurrMergeCand and numOrigMergeCand are set equal to the number of merging candidates in the mergeCandList.
7. When numCurrMergeCand is less than (MaxNumMergeCand − 1) and NumHmvpCand is greater than 0, the following applies:
    The derivation process of history-based merging candidates as specified in 8.4.2.6 is invoked with mergeCandList, and numCurrMergeCand as inputs, and modified mergeCandList and numCurrMergeCand as outputs.
    numOrigMergeCand is set equal to numCurrMergeCand.
8. The derivation process for pairwise average merging candidates specified in clause 8.4.2.4 is invoked with mergeCandList, the reference indices refIdxL0N and refIdxL1N, the prediction list utilization flags predFlagL0N and predFlagL1N the motion vectors mL0N and mL1N of every candidate N in mergeCandList, numCurrMergeCand and numOrigMergeCand as inputs, and the output is assigned to mergeCandList, numCurrMergeCand, the reference indices refIdxL0avgCand$_k$ and refIdxL1avgCand$_k$, the prediction list utilization flags predFlagL0avgCand$_k$ and predFlagL1avgCand$_k$ and the motion vectors mvL0avgCand$_k$ and mvL1avgCand$_k$ of every new candidate avgCand$_k$ being added into mergeCandList. The bi-prediction weight index gbiIdx of every new candidate avgCand$_k$ being added into mergeCandList is set equal to 0. The number of candidates being added, numAvgMergeCand, is set equal to ( numCurrMergeCand − numOrigMergeCand ). When numAvgMergeCand is greater than 0, k ranges from 0 to numAvgMergeCand − 1, inclusive.

TABLE 1-continued

8.4.2.2 Derivation process for luma motion vectors for merge mode

9. The derivation process for zero motion vector merging candidates specified in clause 8.4.2.5 is invoked with the mergeCandList, the reference indices refIdxL0N and refIdxL1N, the prediction list utilization flags predFlagL0N and predFlagL1N, the motion vectors mvL0N and mvL1N of every candidate N in mergeCandList and numCurrMergeCand as inputs, and the output, is assigned to mergeCandList, numCurMergeCand, the reference indices refIdxL0zeroCand$_m$ and refIdxL1zeroCand$_m$, the prediction list utilization flags predFlagL0zeroCand$_m$ and predFlagL1zeroCand$_m$ rnd the motion vectors myL0zeroCand$_m$ and mvL1zeroCand$_m$ of every new candidatezeroCand$_m$ being added into mergeCandList. The bi-prediction weight index gbiIdx of every new candidate zeroCand$_m$ being added into mergeCandList is set equal to 0. The number of candidates being added, numZeroMergeCand, is set equal to ( numCurrMergeCand − numOrigMergeCand − numAvgMergeCand ). When numZeroMergeCand is greater than 0, m ranges from 0 to numZeroMergeCand − 1, inclusive.
10. The variable mergeIdxOffset is set equal to 0.
11. When mmvd_flag[ xCb ][ yCb ] is equal to 1, the variable mmvdCnt is set equal to 0 and tThe following applies until mmvdCnt is greater than ( merge_idx[ xCb ][ yCb ] + mergeIdxOffset ) or mmvdCnt is equal to MaxNumMergeCand:
    When candidate mergeCandList[ mmvdCnt ] uses the current decoded picture as its reference picture, mergeIdxOffset is incremented by 1.
    The variable mmvdCnt is incremented by 1.
12. The following assignments are made with N being the candidate at position merge_idx[ xCb ][ yCb ] + mergeIdxOffset in the merging candidate list mergeCandList ( N = mergeCandList[ merge_idx[ xCb ] [ yCb ] + mergeIdxOffset ] ) and X being replaced by 0 or 1:
    refIdxLX = refIdxLXN (8-289)
    predFlagLX[ 0 ][ 0 ] = predFlagLXN (8-290)
    mvLX[ 0 ][ 0 ][ 0 ] = mvLXN[ 0 ] (8-291)
    mvLX[ 0 ][ 0 ][ 1 ] = mvLXN[ 1 ] (8-292)
    gbiIdx = gbiIdxN (8-293)
13. When mmvd_flag[ xCb ][ yCb ] is equal to 1, the following applies:
    The derivation process for merge motion vector difference as specified in 8.4.2.7 is invoked with the luma location ( xCb, yCb ), the luma motion vectors mvL0[ 0 ][ 0 ], mvL1[ 0 ][ 0 ] the reference indices refIdxL0, refIdxL1 and the prediction list utilization flags predFlagL0[ 0 ][ 0 ] and predFlagL1[ 0 ][ 0 ] as inputs, and the motion vector differences mMvdL0 and mMvdL1 as outputs. The motion vector difference mMvdLX is added to the merge motion vectors mvLX for X being 0 and 1 as follows:
    mvLX[ 0 ][ 0 ][ 0 ] += mMvdLX[ 0 ] (8-294)
    mvLX[ 0 ][ 0 ][ 1 ] += mMvdLX[ 1 ] (8-295)

Referring to Table 1, gbiIdx may indicate a bi-prediction weight index, and gbiIdxCol may indicate a bi-prediction weight index for a temporal merge candidate (eg, a temporal motion vector candidate in the merge candidate list). In the procedure for deriving the motion vector of the luma component for the merge mode (Table of Contents 3 of 8.4.2.2), the gbiIdxCol may be derived as 0. That is, the weight index of the temporal motion vector candidate may be derived as 0.

Alternatively, a weight index for a weighted average of temporal motion vector candidates may be derived based on weight index information on a collocated block. Here, the collocated block may be referred to as a col block, a co-located block, or a co-located reference block, and the col block may indicate a block at the same position as the current block on the reference picture. For example, a procedure for deriving a motion vector of a luma component for the merge mode may be as shown in Table 2 below.

TABLE 2

8.4.2.2 Derivation process for luma motion vectors for merge mode

This process is only invoked when merge_flag[ xCb ][ yPb ] is equal to 1, where (xCb, yCb) specify the top-left sample of the current luma coding block relative to the top-left luma sample of the current picture.
Inputs to this process are:
    a luma location ( xCb, yCb ) of the top-left sample of the current luma coding block relative to the top-left luma sample of the current picture,
    a variable cbWidth specifying the width of the current coding block in luma samples,
    a variable cbHeight specifying the height of the current coding block in luma samples.
Outputs of this process are:
    the luma motion vectors in 1/16 fractional-sample accuracy mvL0[ 0 ][ 0 ] and mvL1[ 0 ][ 0 ],
    the reference indices refIdxL0 and refIdxL1,
    the prediction list utilization flags predFlagL0[ 0 ][ 0 ] and predFlagL1[ 0 ][ 0 ],
    the bi-prediction weight index gbiIdx.
The bi-prediction weight index gbiIdx is set equal to 0.
The motion vectors mvL0[ 0 ][ 0 ] and mvL1[ 0 ][ 0 ], the reference indices refIdxL0 and refIdxL1 and the prediction utilization flags predFlagL0[ 0 ][ 0 ] and predFlagL1[ 0 ][ 0 ] are derived by the following ordered steps:
    1. The derivation process for merging candidates from neighbouring coding units as specified in clause 8.4.2.3 is invoked with the luma coding block location ( xCb, yCb ), the luma coding block width cbWidth, and the luma coding block height cbHeight as inputs, and the output being the availability flags availableFlagA$_0$, availableFlagA$_1$, availableFlagB$_0$, availableFlagB$_1$ and availableFlagB$_2$, the reference indices refIdxLXA$_0$, refIdxLXA$_1$, refIdxLXB$_0$, refIdxLXB$_1$ and TABLE 2-continued 8.4.2.2 Derivation process for luma motion vectors for merge mode refIdxLXB$_2$, the prediction list utilization flags predFlagLXA$_0$, predFlagLXA$_1$, predFlagLXB$_0$, predFlagLXB$_1$ and predFlagLXB$_2$, and the motion vectors mvLXA$_0$, mvLXA$_1$, mvLXB$_0$, mvLXB$_1$ and mvLXB$_2$, with X being 0 or 1, and the bi-prediction weight indices gbiIdxA$_0$, gbiIdxA$_1$, gbiIdxB$_0$, gbiIdxB$_1$, gbiIdxB2.
2. The reference indices, refIdxLXCol, with X being 0 or 1, and the bi-prediction weight index gbiIdxCol for the temporal merging candidate Col are set equal to 0.
3. The derivation process for temporal luma motion vector prediction as specified in in clause 8.4.2.11 is invoked with the luma location ( xCb, yCb ), the luma coding block width cbWidth, the luma coding block height cbHeight and the variable refIdxL0Col as inputs and the output being the availability flag availableFlagL0Col and the temporal motion vector mvL0Col. The variables availableFlagCol, predFlagL0Col and predFlagL1Col are derived as follows:
    availableFlagCol = availableFlagL0Col     (8-283)
    predFlagL0Col = availableFlagL0Col     (8-284)
    predFlagL1Col=0     (8-285)
    gbiIdxCol = 0     (8-xxx)
4. When tile_group _type is equal to B, the derivation process for temporal luma motion vector prediction as specified in clause 8.4.2.11 is invoked with the luma location ( xCb, yCb ), the luma coding block width cbWidth, the luma coding block height cbHeight and the variable refIdxL1Col as inputs, and the output being the availability flag availableFlagL1Col and the temporal motion vector mvL1Col. The variables availableFlagCol and predFlagL1Col are derived as follows:
    availableFlagCol = availableFlagL0Col | | availableFlagL1Col     (8-286)
    predFlagL1Col = availableFlagL1Col     (8-287)
    gbiIdxCol = gbiIdxCol     (x-xxx)
5. The merging candidate list, mergeCandList, is constructed as follows:
    i = 0
    if( availableFlagA$_1$ )
        mergeCandList[ i++ ] = A$_1$
    if( availableFlagB$_1$ )
        mergeCandList[ i++ ] = B$_1$
    if ( availableFlagB$_0$ )
        mergeCandlist[ i++ ] = B$_0$     (8-288)
    if( availableFlagA$_0$ )
        mergecandList[ i++ ] = A$_0$
    if( availableFlagB$_2$ )
        mergeCandList[ i++ ] = B$_2$
    if( availableFlagCol )
        mergeCandList[ i++ ] = Col
6. The variable numCurrMergeCand and numOrigMergeCand are set equal to the number of merging candidates in the mergeCandList.
7. When numCurrMergeCand is less than (MaxNumMergeCand − 1) andNumHmvpCand is greater than 0, the following applies:
    The derivation process of history-based merging candidates as specified in 8.4.2.6 is invoked with mergeCandList, and numCurrMergeCand as inputs, and modified mergeCandList and numCurrMergeCand as outputs.
    numOrigMergeCand is set equal to numCurrMergeCand
8. The derivation process for pairwise average merging candidates specified in clause 8.4.2.4 is invoked with mergeCandList, the reference indices refIdxL0N and refIdxL1N, the prediction list utilization flags predFlagL0N and predFlagL1N, the motion vectors mvL0N and mvL1N of every candidate N in mergeCandList, numCurrMergeCand and numOrigMergeCand as inputs, and the output is assigned to mergeCandList, numCurrMergeCand, the reference indices refIdxL0avgCand$_k$ and refIdxL1avgCand$_k$, the prediction list utilization flags predFlagL0avgCand$_k$ and predFlagL1 avgCand$_k$ and the motion vectors mvL0avgCand$_k$ and mvL1avgCand$_k$ of every new candidate avgCand$_k$ being added into mergeCandList. The bi-prediction weight index gbiIdx of every new candidate avgCand$_k$ being added into mergeCandList is set equal to 0. The number of candidates being added, numAvgMergeCand, is set equal to ( numCurrMergeCand − numOrigMergeCand ). When numAvgMergeCand, is greater than 0, k ranges from 0 to numAvgMergeCand − 1, inclusive.
9. The derivation process for zero motion, vector merging candidates specified in clause 8.4.2.5 is invoked with the mergeCandList, the reference indices refIdxL0N and refIdxL1N, the prediction list utilization flags predFlagL0N and predFlagL1N, the motion vectors mvL0N and mvL1N of every candidate N in mergeCandList and mimCurrMergeCand as inputs, and the output is assigned to mergeCandList, numCurrMergeCand, the reference indices refIdxL0zeroCand$_m$ and refIdxL1zeroCand$_m$ the predcton list utilization flags predFlagL0zeroCand$_m$ and predFlagL1zeroCand$_m$ and the motion vectors mvL0zeroCand$_m$ and mvL1zeroCand$_m$ of every new candidate zeroCand$_m$ being added into mergeCandList. The bi-prediction weight index gbiIdx of every new candidate zeroCand being added into mergeCandList is set equal to 0. The number of candidates being added, numZeroMergeCand, is set equal to
( numCurrMergeCand − numOrigMergeCand − numAvgMergeCand ). When numZeroMergeCand is greater than 0, m ranges from 0 to numZeroMergeCand − 1, inclusive.
10. The variable mergeIdxOffset is set equal to 0.
11. When mmvd_flag[ xCb ][ yCb ] is equal to 1, the variable mmvdCnt is set equal to 0 and tThe following applies until mmvdCnt is greater than ( merge_idx[ xCb ][ yCb ] + mergeIdxOffset ) or mmvdCnt is equal to MaxNumMergeCand:
    When candidate mergeCandList[ mmvdCnt ] uses the current decoded picture as its reference picture, mergeIdxOffset is incremented by 1.
    The variable mmvdCnt is incremented by 1.

TABLE 2-continued

| 8.4.2.2 Derivation process for luma motion vectors for merge mode |
|---|

12. The following assignments are made with N being the candidate at position
merge_idx[ xCb ][ yCb ] + mergeIdxOffset in the merging candidate list mergeCandList
(N = mergeCandList[ merge idx[ xCb ][ yCb ] + mergeIdxOffset ] ) and X being replaced by 0 or 1:

$$refIdxLX = refIdxLXN \qquad (8\text{-}289)$$
$$predFlagLX[\ 0\ ][\ 0\ ] = predFlagLXN \qquad (8\text{-}290)$$
$$mvLX[\ 0\ ][\ 0\ ][\ 0\ ] = mLXN[\ 0\ ] \qquad (8\text{-}291)$$
$$mvLX[\ 0\ ][\ 0\ ][\ 1\ ] = mvLXN[\ 1\ ] \qquad (8\text{-}292)$$
$$gbiIdx = gbiIdxN \qquad (8\text{-}293)$$

13. When mmvd_flag[ xCb ][ yCb ] is equal to 1, the following applies:
The derivation process for merge motion vector difference as specified in 8.4.2.7 is invoked with
the luma location ( xCb, yCb ), the luma motion vectors mvL0[ 0 ][ 0 ], mvL1[ 0 ][ 0 ], the
reference indices refIdxL0, refIdxL1 and the prediction list utilization flags predFlagL0[ 0 ][ 1 ]
and predFlagL1[ 0 ][ 0 ] as inputs, and the motion vector differences mMvdL0 and mMvdL1 as
outputs.
The motion vector difference mMvdLX is added to the merge motion vectors mvLX for X being
0 and 1 as follows:

$$mLX[\ 0\ ][\ 0\ ][\ 0\ ] \mathrel{+}= mMvdLX[\ 0\ ] \qquad (8\text{-}294)$$
$$mvLx[\ 0\ ][\ 0\ ][\ 1\ ] \mathrel{+}= mMvdLX[\ 1\ ] \qquad (8\text{-}295)$$

Referring to Table 2, gbiIdx may indicate a bi-prediction weight index, and gbiIdxCol may indicate a bi-prediction weight index for a temporal merge candidate (eg, a temporal motion vector candidate in the merge candidate list). In the procedure of deriving the motion vector of the luma component for the merge mode, when the slice type or the tile group type is B (Table of Contents 4 of 8.4.2.2), the gbiIdxCol may be derived as gbiIdxCol. That is, the weight index of the temporal motion vector candidate may be derived as the weight index of the col block.

Meanwhile, according to another embodiment of the present disclosure, when constructing a motion vector candidate for a merge mode in units of subblocks, a weight index for a weighted average of temporal motion vector candidates may be derived. Here, the merge mode in units of subblocks may be referred to as an affine merge mode (in units of subblocks). The temporal motion vector candidate may indicate a subblock-based temporal motion vector candidate, and may be referred to as an SbTMVP (or ATMVP) candidate. That is, when the inter-prediction type is bi-prediction, the weight index information on the SbTMVP candidate (or a subblock-based temporal motion vector candidate) in the affine merge candidate list or the subblock merge candidate list may be derived.

For example, the weight index information on the weighted average of subblock-based temporal motion vector candidates may always be derived as 0. Here, the weight index information of 0 may mean that the weights of each reference direction (ie, the L0 prediction direction and the L1 prediction direction in bi-prediction) are the same. For example, a procedure for deriving a motion vector and a reference index in a subblock merge mode and a procedure for deriving a subblock-based temporal merge candidate may be as shown in Tables 3 and 4 be

TABLE 3

| 8.4.4.2 Derivation process for motion vectors and reference indices in subblock merge mode |
|---|

Inputs to this process are:
  a luma location ( xCb, yCb ) of the top-left sample of the current luma coding block relative to the top-
  left luma sample of the current picture,
  two variables cbWidth and cbHeight specifying the width and the height of the luma coding block.
Outputs of this process are:
  the number of luma coding subblocks in horizontal direction numSbX and in vertical direction numSbY,
  the reference indices refIdxL0 and refIdxL1,
  the prediction list utilization flag arrays predFlagL0[ xSbIdx ] [ySbIdx ] and
  predFlagL1[ xSbIdx ][ ySbIdx ],
  the luma subblock motion vector arrays in 1/16 fractional-sample accuracy mvL0[ xSbIdx ][ ySbIdx ] and
  mvL1[ xSbIdx ][ ySbIdx ] with xSbIdx = 0 . . . numSbX −1, ySbIdx = 0 . . . numSbY − 1,
  the chroma subblock motion vector arrays in 1/32 fractional-sample accuracy mvCL0[ xSbIdx ][ ySbIdx ]
  and mvCL1[ xSbIdx ][ ySbIdx ] with xSbIdx = 0 . . . numSbx − 1, ySbIdx = 0 numSbY − 1,
  the bi-prediction weight index gbiIdx.
The variables numSbX, numSbY and the subblock merging candidate list, subblockMergeCandList are derived
by the following ordered steps:
  1. When sps_sbtmvp_enabled_flag is equal to 1, the following applies:
    The derivation process for merging candidates from neighbouring coding units as specified in
    clause 8.4.2.3 is invoked with the luma coding block location ( xCb, yCb ), the luma coding
    block width cbWidth, the luma coding block height cbHeight and the luma coding block width
    as inputs, and the output being the availability flags availableFlag$A_0$, availableFlag$A_1$,
    availableFlag$B_0$, availableFlag$B_1$ and availableFlag$B_2$, the reference indices refIdxLX$A_0$,
    refIdxLX$A_1$, refIdxLX$B_0$, refIdxLX$B_1$ and refIdxLX$B_2$, the prediction list utilization flags
    predFlagLX$A_1$ predFlagLX$A_1$, predflagLX$B_0$, predFlagLX$B_1$, and predFlagLX$B_2$, and the
    motion vectors mvLX$A_0$, mvLX$A_1$, mvLX$B_0$, mLX$B_1$ and mvLX$B_2$, with X being 0 or 1.
    The derivation process for subblock-based temporal merging candidates as specified in
    clause 8.4.4.3 is invoked with the luma location ( xCb, yCb ), the luma coding block width
    cbWidth, the luma coding block height cbHeight , the availability flags availableFlag$A_0$,
    availableFlag$A_1$, availableFlag$B_0$, availableFlag$B_1$, the reference indices refIdxLX$A_0$,
    refIdxLX$A_1$, refIdxLX$B_0$, refIdxLX$B_1$, the prediction list utilization flags predFlagLX$A_0$,
    predFlagLX$A_1$, predFlagLX$B_0$, predFlagLX$B_1$ and the motion vectors mvLX$A_0$, mvLX$A_1$, TABLE 3-continued 8.4.4.2 Derivation process for motion vectors and reference indices in subblock merge mode $mvLXB_0$, $mvLXB_1$ as inputs and the output being the availability flag availableFlagSbCol, the bi-prediction weight index gbiIdxSbCol, the number of luma coding subblocks in horizontal direction numSbX and in vertical direction numSbY, the reference indices refIdxLXSbCol, the luma motion vectors mvLXSbCol[ xSbIdx ][ ySbIdx ] and the prediction list utilization flags predFlagLXSbCol[ xSbIdx ][ ySbIdx ] with xSbIdx = 0 . . . numSbX − 1, ySbIdx = 0 . . . numSbY − 1 and X being 0: or 1.

2. When sps_affine_enabled_flag is equal to 1, the sample locations ( $xNbA_0$, $yNbA_0$ ), ( $xNbA_1$, $yNbA_1$ ), ( $xNbA_2$, $yNbA_2$ ), ( $xNbB_0$, $yNbB_0$ ), ( $xNbB_1$, $yNbB_1$ ), ( $xNbB_2$, $yNbB_2$ ), ( $xNbB_3$, $yNbB_3$ ), and the variables numSbX and numSbY are derived as follows:

| | |
|---|---:|
| ( $xA_0$, $yA_0$ ) = ( xCb − 1, yCb + cbHeight ) | (8-536) |
| ( $xA_1$, $yA_1$ ) = ( xCb − 1, yCb + cbHeight − 1 ) | (8-537) |
| ( $xA_2$, $yA_2$ ) = ( xCb − 1, yCb ) | (8-538) |
| ( $xB_0$, $yB_0$ ) = ( xCb + cbWidth, yCb − 1 ) | (8-539) |
| ( $xB_1$, $yB_1$ ) = ( xCb + cbWidth − 1, yCb − 1 ) | (8-540) |
| ( $xB_2$, $yB_2$ ) = ( xCb − 1, yCb − 1 ) | (8-541) |
| ( $xB_3$, $yB_3$ ) = ( xCb, yCb − 1 ) | (8-542) |
| numSbx = cbWidth >> 2 | (8-543) |
| numSby = cbHeight >> 2 | (8-544) |

3. When sps_affine_enabled_flag is equal to 1, the variable availableFlagA is set-equal to FALSE and the following applies for ( $xNbA_k$, $yNbA_k$ ) from ( $xNbA_0$, $yNbA_0$ ) to ( $xNbA_1$, $yNbA_1$ )
    The availabiltiy derivation process for a block as specified in clause 6.4.X [Ed. (BB): Neighbouring blocks availability checking process tbd] is invoked with the current luma location ( xCurr, yCurr ) set equal to ( xCb, yCb ) and the neighbouring luma location ( $xNbA_k$, $yNbA_k$ ) as inputs, and the output is assigned to the block availability flag $availableA_k$.
    When $availableA_k$ is equal to TRUE and MotionModelIdc[ $xNbA_k$ ][ $yNbA_k$ ] is greater than 0 and availableFlagA is equal to FALSE, the following applies:
        The variable availableFlagA is set equal to TRUE, motionModelIdcA is set equal to MotionModelIdc[ $xNbA_k$ ][ $yNbA_k$ ], ( xNb, yNb ) is set equal to ( CbPosX[ $xNbA_k$ ][ $yNbA_k$ ], CbPosY[ $xNbA_k$ ][ $yNbA_k$ ] ), nbW is set equal to Cbwidth[ $xNbA_k$ ][ $yNbA_k$ ], nbH is set equal to CbHeight[ $xNbA_k$ ][ $yNbA_k$ ], numCpMv is set equal to MotionModelIdc[ $xNbA_k$ ][ $yNbA_k$ ] + 1, and gbiIdxA is set equal to GbiIdx[ $xNbA_k$ ][ $YNbA_k$ ].
        For X being replaced by either 0 or 1, the following applies:
        When PredFlagLX[ $xNbA_k$ ][ $yNbA_k$ ] is equal to 1, the derivation process for luma affine control point motion vectors from a neighbouring block as specified in clause 8.4.4.5 is invoked with the luma coding block location ( xCb, yCb ), the luma coding block width and height (cbWidth, cbHeight), the neighbouring luma coding block location ( xNb, yNb ), the neighbouring luma coding block width and height (nbW, nbH), and the number of control point motion vectors numCpMv as input, the control point motion vector predictor candidates cpMVLXA[ cpIdx ] with cpIdx = 0 . . . numCpMv −1 as output.
        The following assignments are made:

| | |
|---|---:|
|     predFlagLXA = PredFlagLX[ $xNbA_k$ ][ yNbAk ] | (8-545) |
|     refIdxLXA = RefIdxLX[ xNbAk ][ yNbAk ] | (8-546) |

4. When sps_affine_enabled_flag is equal to 1, the variable availableFlagB is set equal to FALSE and toe following applies for ( $xNbB_k$, $yNbB_k$ ) from ( $xNbB_0$, $yNbB_0$ ) to ( $xNbB_2$, $yNbB_2$ ):
    The availability derivation process for a block as specified in clause 6.4.X [Ed. (BB): Neighbouring blocks availability checking process tbd] is invoked with the current luma location ( xCurr, yCurr ) set equal to ( xCb, yCb ) and the neighbouring luma location ( $xNbB_k$, $yNbB_k$ ) as inputs, and the output is assigned to the block availability flag $availableB_k$.
    When $availableB_k$ is equal to TRUE and MotionModelIdc[ $xNbB_k$ ][ $yNbB_k$ ] is greater than 0 and availableFlagB is equal to FALSE, the following applies:
        The variable availableFlagB is set equal to TRUE, motionModelIdcB is set equal to MotionModelIdc[ $xNbB_k$ ][ $yNbB_k$ ], ( xNb, yNb ) is set equal to ( CbPosX[ xNbAB ][ $yNbB_k$ ], CbPosY[ $xNbB_k$ ][ $yNbB_k$ ] ), nbW is set equal to CWidth[ $xNbB_k$ ][ $yNbB_k$ ], nbH is set equal to CbHeight[ $xNbB_k$ ][ $yNbB_k$ ] numCpMv to set equal to MotionModelIdc[ $xNbB_k$ ][ $yNbB_k$ ] + 1, and gbiIdxB is set equal to GbiIdx[ $xNbB_k$ ][ $yNbB_k$ ]
        For X being replaced by either 0 or 1, toe following applies:
        When PredFlagLX[ $xNbB_k$ ][ $yNbB_k$ ] is equal to TRUE, the derivation process tor luma affine control point motion vectors from a neighbouring block as specified in clause 8.4.4.5 is invoked with the luma coding block location ( xCb, yCb ), the luma coding block width and height (cbWidth, cbHeight), the neighbouring luma coding block location ( xNb, yNb ), the neighbouring luma coding block width and height (nbW, nbH), and the number of control point motion vectors numCpMv as input, the control point motion vector predictor candidates cpMvLXB[ cpIdx ] with cpIdx = 0 . . . numCpMy − 1 as output.
        The following assignments are made:
            predFlagLXB = PredFlagLX[ $xNbB_k$ ][ $yNbB_k$ ]
            refIdxLXB = RefIdxLX[ $xNbB_k$ ][ $yNbB_k$ ]

5. When sps_affine_enabled_flag is equal to 1, the derivation process for constructed affine control point motion vector merging candidates as specified in clause 8.4.4.6 is invoked with the luma coding block location ( xCb, yCb ), the luma coding block width and height (cbWidth, cbHeight), the availability flags $availableA_0$, $availableA_1$, $availableA_2$, $availableB_0$, $availableB_1$, $availableB_2$, $availableB_3$ as inputs, and the availability flags availableFlagConstK, the reference indices refIdxLXConstK, prediction list utilization flags predFlagLXConstK, motion model indices motionModelIdcConstK and cpMvpLXConstK[ cpIdx ] with X being 0 or 1, K = 1 . . . 6, cpIdx = 0 . . . 2 as outputs and gbiIdxConstK is set equal to 0 with K = 1 . . . 6.

TABLE 3-continued

8.4.4.2 Derivation process for motion vectors and reference indices in subblock merge mode 6.     The initial subblock merging candidate list, subblockMergeCandList, is constructed as follows:
   i = 0
   if( availableFlagSbCol )
      subblockMergeCandList[ i++ ] = SbCol
   if( availableFlag && i << MaxNumSubblockMergeCand )
      subblockMergeCandList[ i++ ] = A
   if( availableFlagB && i < MaxNumSubblockMergeCand )
      subblockMergeCandList[ i++ ] = B
   if( availableFlagConst1 && i < MaxNumSubblockMergeCand )
      subblockMergeCandList[ i++ ] = Const1     (8-549)
   if( availableFlagConst2 && i < MaxNumSubblockMergeCand )
      subblockMergeCandList[ i++ ] = Const2
   if( availableFlagConst3 && i < MaxNumSubblockMergeCand )
      subblockMergeCandList[ i++ ] = Const3
   if( availableFlagConst4 && i < MaxNumSubblockMergeCand )
      subblockMergeCandList[ i++ ] = Const4
   if( availableFlagConst5 && i < MaxNumSubblockMergeCand )
      subblockMergeCandList[ i++ ] = Const5
   if( availableFlagConst6 && i < MaxNumSubblockMergeCand )
      subblockMergeCandList[ i++ ] = Const6

7.     The variable numCurrMergeCand and numOrigMergeCand are set equal to the number of merging candidates in the subblockMergeCandList.

8.     When numCurrMergeCand is less than MaxNumSubblockMergeCand, the following is repeated until numCurrMrgeCand is equal to MaxNumSubblockMergeCand, with mvZero[0] and mvZero[1] both being equal to 0:
   The reference indices, the prediction list utilization flags and the motion vectors of $zeroCand_m$ with m equal to ( numCurrMergeCand − numOrigMergeCand ) are derived as follows:

$refIdxL0ZeroCand_m = 0$     (8-550)
   $predFlagL0ZeroCand_m = 1$     (8-551)
   $cpMVL0ZeroCand_m[ 0 ] = mvZero$     (8-552)
   $cpMVL0ZeroCand_m[ 1 ] = mvZero$     (8-553)
   $cpMVL0ZeroCand_m[ 2 ] = mvZero$     (8-554)
   $refIdxL1ZeroCand_m$ = ( tile_group_type = = B ) ? 0 : −1     (8-555)
   $predFlagL1ZeroCand_m$ = ( tile_group_type = = B ) ? 1 : 0     (8-556)
   $cpMVL1ZeroCand_m[ 0 ] = mvZero$     (8-557)
   $cpMvL1ZeroCand_m[ 1 ] = mvZero$     (8-558)
   $cpMvL1ZeroCand_m[ 2 ] = mvZero$     (8-559)
   $motionModelIdcZeroCand_m = 1$     (8-560)
   gbiIdxZeroCandm = 0     (8-561)

The candidate $zeroCand_m$ with m equal to ( numCurrMergeCand − numOrigMergeCand ) is added at the end of subblockMergeCandList and numCurrMergeCand is incremented by 1 as follows:

$subblockMergeCandList[ numCurrMergeCand++ ] = zeroCand_m$     (8-562)

The variables refIdxL0, refIdxL1, predFlagL0[ xSbIdx ][ ySbIdx ], predFlagL1[ xSbIdx ][ ySbIdx ], mvL0[ xSbIdx ][ ySbIdx ], mvL1[ xSbIdx ][ ySbIdx ], mvCL0[ xSbIdx ][ ySbIdx ], and mvCL1[ xSbIdx ][ ySbIdx ] with xSbIdx = 0 . . . numsbx − 1, ySbIdx = 0 . . . numSbY − 1 are derived as follows:
If subblockMergeCandList[ merge_subblock_idx[ xCb ][ yCb ] ] is equal to SbCol, the bi-prediction weight index gbiIdx is set equal to 0 and the following applies with X being 0 or 1:

refIdxLX = refIdxLXSbCol     (8-563)
    For xSbIdx = 0 . . . numSbx − 1, ySbIdx = 0 . . . numsbY − 1, the following applies:
       predFlagLX[ xSbIdx ][ ySbIdx ] = predFlagLXSbCol[ xSbIdx ][ ySbIdx ]     (8-564)
       mvLX[ xSbIdx ][ ySbIdx][ 0 ] = mvLXSbCol[ xSbIdx ][ ySbIdx ][ 0 ]     (8-565)
       mvLX[ xSbIdx ][ ySbIdx ][ 1 ] = mvLXSbCol[ xSbIdx ][ ySbIdx ][ 1 ]     (8-566)
       When predFlagLX[ xSbIdx ][ ySbIdx ] is equal to 1, the derivation process for chroma motion vectors in clause 8.4.2.13 is invoked with mvLX[ xSbIdx ][ ySbIdx ] and refIdxLX as inputs, and the output being mvCLX[ xSbIdx ][ ySbIdx ]
    The following assignment is made for x = xCb . . . xCb + cbWidth − 1 and
y = yCb . . . yCb + cbHeight − 1:
       MotionModelIdc[ x ][ y ] = 0     (8-567)

Otherwise (subblockMergeCandList[ merge_subblock_idx[ xCb ][ yCb ] ] is not equal to SbCol), the following applies with X being 0 or 1:
    The following assignments are made with N being the candidate at position
merge_subblock_idx[ xCb ][ yCb ] in the subblock merging candidate list subblockMergeCandList
( N = subblockMergeCandList[ merge subblock idx[ xCb ][yCb ] ] ):

refIdxLX = refIdxLXN     (8-568)
       predFlagLX[ 0 ][ 0 ] = predFlagLXN     (8-569)
       cpMvLX[ 0 ] = cpMvLXN[ 0 ]     (8-570)
       cpMvLX[ 1 ] = cpMvLXN[ 1 ]     (8-571)
       cpMvLX[ 2 ] = cpMvLXN[ 2 ]     (8-572)
       numCpMv = motionModelIdxN + 1     (8-573)
       gbiIdx = gbiIdxN     (8-574)

For xSbIdx = 0 . . . numSbX − 1, ySbIdx = 0 . . . numSbY − 1, the following applies:
       predFlagLX[ xSbIdx ] [ SbIdx ] = predFlagLX[ 0 ][ 0 ]     (8-575)
    When predFlagLX[ 0 ][ 0 ] is equal to 1, the derivation process for motion vector arrays from affine control point motion vectors as specified in subclause 8.4.4.9 is invoked with the luma coding block location ( xCb, yCb ), the luma coding block width cbWidth, the luma predication block height cbHeight, the number of control point motion vectors numCpMv, the control point motion vectors cpMyLX[ cpIdx ] with cpIdx being 0 . . . 2, and the number of luma coding subblocks in horizontal direction numSbX and in vertical direction numSbY as inputs, the luma subblock motion vector array TABLE 3-continued 8.4.4.2 Derivation process for motion vectors and reference indices in subblock merge mode mvLX[ xSbIdx ][ ySbIdx ] and the chroma subblock motion vector array mvCLX[ xSbIdx ][ ySbIdx ]
with xSbIdx = 0 . . . numSbX − 1, ySbIdx = 0 . . . numSbY − 1 as outputs.
The following assignment is made for x = xCb . . . xCb + cbWidth − 1 and
y = yCb . . . yCb + cbHeight − 1:
    MotionModelIdc[ x ][ y ] = numCpMv − 1    (8-576)

TABLE 4

8.4.4.3 Derivation process for subblock-based temporal merging candidates

Inputs to this process are:
  a luma location ( xCb, yCb ) of the top-left sample of the current luma coding block relative to the top-left
  luma sample of the current picture,
  a variable cbWidth specifying the width of the current coding block in luma samples,
  a variable cbHeight specifying the height of the current coding block in luma samples.
  the availability flags availableFlagA$_0$, availableFlagA$_1$, availableFlagB$_0$, and availableFlagB$_1$ of the
  neighbouring coding units,
  the reference indices refIdxLXA$_0$, refIdxLXA$_1$, refIdxLXB$_0$, and refIdxLXB$_1$ of the neighbouring coding units,
  the prediction list utilization flags predFlagLXA$_0$, predFlagLXA$_1$, predFlagLXB$_0$, and predFlagLXB$_1$ of the
  neighbouring coding units,
  the motion vectors in 1/16 fractional-sample accuracy mvLXA$_0$, mLXA$_1$, mvLXB$_0$, and mvLXB$_1$ of the
  neighbouring coding units.
Outputs of this process are::
  the availability flag availableFlagSbCol,
  the number of luma coding subblocks in horizontal direction numSbX and in vertical direction numSbY,
  the reference indices refIdxL0SbCol and refIdxL1SbCol,
  the luma motion vectors in 1/16 fractional-sample accuracy mL0SbCol[ xSbIdx ][ ySbIdx ] and
  mvL1SbCol[ xSbIdx ][ ySbIdx ] with xSbIdx = 0 . . . numsbx − 1, ySbIdx = 0 . . . numSbY − 1,
  the prediction list utilization flags predFlagL0SbCol[ xSbIdx ][ ySbIdx ] and
  predFlagL1SbCol[ xSbIdx ][ ySbIdx ] with xSbIdx = 0 . . . numSbX − 1, ySbIdx = 0 . . . numsbY − 1,
  the bi-prediction weight index gbiIdxSbCol.
The gbiIdxSbCol is set equal to 0.
  . . .

Referring to Tables 3 and 4 above, gbiIdx may indicate a bi-prediction weight index, gbiIdxSbCol may indicate a bi-prediction weight index for a subblock-based temporal merge candidate (eg, a temporal motion vector candidate in a subblock-based merge candidate list), and in the procedure (8.4.4.3) for deriving the subblock-based temporal merge candidate, the gbiIdxSbCol may be derived as 0. That is, the weight index of the subblock-based temporal motion vector candidate may be derived as 0.

Alternatively, weight index information on a weighted average of subblock-based temporal motion vector candidates may be derived based on weight index information on a temporal center block. For example, the temporal center block may indicate a subblock or sample positioned at the center of the col block or the col block, and specifically, may indicate a subblock positioned at the bottom-right of the four central subblocks or samples of the col block or a sample. For example, in this case, the procedure for deriving the motion vector and reference index in the subblock merge mode, the procedure for deriving the subblock-based temporal merge candidate, and the procedure for deriving the base motion information for the subblock-based temporal merge may be shown in Table 5, Table 6, and Table 7.

TABLE 5

8.4.4.2 Derivation process for motion vectors and reference indices in subblock merge mode Inputs to this process are:
  a luma location ( xCb, yCb ) of the top-left sample of the current luma coding block relative to the top-
  left luma sample of the current picture,
  two variables cbWidth and cbHeight specifying the width and the height of the luma coding block.
Outputs of this process are:
  the number of luma coding subblocks in horizontal direction numSbX and in vertical direction numSbY,
  the reference indices refIdxL0 and refIdxL1,
  the prediction list utilization flag arrays predFlagL0[ xSbIdx ][ ySbIdx ] and
  predFlagL1[ xSbIdx [ ySbIdx ],
  the luma subblock motion vector arrays in 1/16 fractional-sample accuracy mvL0[ xSbIdx ][ ySbIdx ] and
  mvL1[ xSbIdx ][ ySbIdx ] with xSbIdx = 0 . . . numSbx − 1, ySbIdx = 0 . . . numSbY − 1,
  the chroma subblock motion vector arrays in 1/32 fractional-sample accuracy mvCL0[ xSbIdx ][ ySbIdx ]
  and mvCL1[ xSbIdx ][ ySbIdx ] with xSbIdx = 0 . . . numSbX − 1, ySbIdx = 0 numSbY − 1,
  the bi-prediction weight index gbiIdx.
The variables numSbX, numSbY and the subblock merging candidate list, subblockMergeCandList are derived
by the following ordered steps:
    1.  When sps_sbtmvp_enabled_flag is equal to 1, the following applies:
        The derivation process for merging candidates from neighbouring coding units as specified in TABLE 5-continued 8.4.4.2 Derivation process for motion vectors and reference indices in subblock merge mode clause 8.4.2.3 is invoked with the luma coding block location ( xCb, yCb ) the luma coding block width cbWidth, the luma coding block height cbHeight and the luma coding block width as inputs, and the output being the availability flags availableFlag$A_0$, availableFlag$A_1$, availableFlag$B_0$, availableFlag$B_1$ and availableFlag$B_2$, the reference indices refIdxLX$A_0$, refIdxLX$A_1$, refIdxLX$B_0$, refIdxLX$B_1$, and refIdxLX$B_2$, the prediction list utilization flags predFlagLX$A_0$, predFlagLX$A_1$, predFlagLX$B_0$, predFlagLX$B_1$ and predFlagLX$B_2$, and the motion vectors mvLX$A_0$, myLX$A_1$, mvLX$B_0$, mvLX$B_1$ and mvLX$B_2$, with X being 0 or 1. The derivation process for subblock-based temporal merging candidates as specified in clause 8.4.4.3 is invoked with the luma location ( xCb, yCb ), the luma coding block width cbWidth, the luma coding block height cbHeight , the availability flags availableFlag$A_0$, availableFlag$A_1$, availableFlag$B_0$, availableFlag$B_1$, the reference indices refIdxLX$A_0$, refIdxLX$A_1$, refIdxLX$B_0$, refIdxLX$B_1$, the prediction list utilization flags predFlagLX$A_0$, predFlagLX$A_1$, predFlagLX$B_0$, predFlagLX$B_1$ and the motion vectors mvLX$A_0$, mvLX$A_1$, mvLX$B_0$, mvLX$B_1$ as inputs and the output being the availability flag availableFlagSbCol, the bi-prediction weight index gbiIdxSbCol, the number of luma coding subblocks in horizontal direction numSbX and in vertical direction numSbY, the. reference indices refIdxLXSbCol, the luma motion vectors mvLXSbCol[ xSbIdx ][ ySbIdx ] and the prediction list utilization flags predFlagLXSbCol[ xSbIdx ][ ySbIdx ] with xSbIdx = 0 . . . numSbX− 1, ySbIdx = 0 . . . numSbY − 1 and X being 0 or 1.

2. When sps_affine_enabled_flag is equal to 1, the sample locations ( xNb$A_0$, yNb$A_0$ ), ( xNb$A_1$, yNb$A_1$ ), ( xNb$A_2$, yNb$A_2$ ), ( xNb$B_0$, yNb$B_0$ ), ( xNb$B_1$, yNb$B_1$ ), ( xNb$B_2$, yNb$B_2$ ), ( xNb$B_3$, yNb$B_3$ ), and the variables numSbX and numSbY are derived as follows:

| | |
|---|---|
| ( x$A_0$, y$A_0$ ) = ( xCb − 1, yCb + cbHeight ) | (8-536) |
| ( x$A_1$, y$A_1$ ) = ( xCb − 1, yCb + cbHeight − 1 ) | (8-537) |
| ( x$A_2$, y$A_2$ ) = ( xCb − 1, yCb ) | (8-538) |
| ( x$B_0$, y$B_0$ ) = ( xCb + cbWidth, yCb − 1 ) | (8-539) |
| ( x$B_1$, y$B_1$ ) = ( xCb + cbWidth − 1, yCb − 1 ) | (8-540) |
| ( x$B_2$, y$B_2$ ) = ( xCb − 1, yCb − 1 ) | (8-541) |
| ( x$B_3$, y$B_3$ ) = ( xCb, yCb − 1 ) | (8-542) |
| numSbx = cbWidth >> 2 | (8-543) |
| numSby = cbHeight >> 2 | (8-544) |

3. When sps_affine_enabled_flag is equal to 1 the variable availableFlagA is set equal to FALSE and the following applies for ( xNb$A_k$, yNb$A_k$ ) from ( xNb$A_0$, yNb$A_0$ ) to ( xNb$A_1$, yNb$A_1$ )

The availability derivation process for a block as specified in clause 6.4.X [Ed. (BB): Neighbouring blocks availability checking process tbd] is invoked with the current luma location ( xCurr, yCurr ) set equal to ( xCb, yCb ) and the neighbouring luma location ( xNb$A_k$, yNb$A_k$ ) as inputs, and the output is assigned to the block availability flag available$A_k$.

When available$A_k$ is equal to TRUE and MotionModelIdc[ xNb$A_k$ ][ yNb$A_k$ ] is greater than 0 and availableFlagA is equal to FALSE, the following applies:

The variable availableFlagA is set equal to TRUE, motionModelIdcA is set equal to MotionModelIdc[ xNb$A_k$ ][ yNb$A_k$ ], ( xNb, yNb ) is set equal to ( CbPosX[ xNb$A_k$ ][ yNb$A_k$ ], CbPosY[ xNb$A_k$ ][ yNb$A_k$ ] ), nbW is set equal to CbWidth[ xNb$A_k$ ][ yNb$A_k$ ] nbH is set equal to CbHeight [ xNb$A_k$ ][ yNb$A_k$ ], numCpMv is set equal to MotionModelIdc[ xNb$A_k$ ][ yNb$A_k$ ] + 1, and gbiIdxA is set equal to GbiIdx[ xNb$A_k$ ] [ yNb$A_k$ ].

For X being replaced by either 0 or 1, the following applies:

When PredFlagLX[ xNbAk ][ yNb$A_k$ ] is equal to 1, the derivation process for luma affine control point motion vectors from a neighbouring block as specified in clause 8.4.4.5 is invoked with the luma coding block location ( xCb, yCb ), the luma coding block width and height (cbWidth, cbHeight), the neighbouring luma coding block location ( xNb, yNb ), the neighbouring luma coding block width and height (nbW, nbH), and the number of control point motion vectors numCpMv as input, the control point motion vector predictor candidates cpMvLXA[ cpIdx ] with cpIdx = 0 . . . numCpMv − 1 as output.

The following assignments are made:

| | |
|---|---|
| predFlagLXA = PredFlagLX[ xNb$A_k$ ][ yNb$A_k$ ] | (8-545) |
| refIdxLXA = RefIdxLX[ xNb$A_k$ ][ yNb$A_k$ ] | (8-546) |

4. When sps_affine_enabled_flag is equal to 1, the variable availableFlagB is set equal to FALSE and the following applies for ( xNb$B_k$, yNb$B_k$ ) from ( xNb$B_0$, yNb$B_0$ ) to ( xNb$B_2$, yNb$B_2$ )

The availability derivation process for a block as specified in clause 6.4.X [Ed (BB): Neighbouring blocks availability checking process tbd] is invoked with the current luma location ( xCurr, yCurr ) set equal to ( xCb, yCb ) and the neighbouring luma location ( xNb$B_k$, yNb$B_k$ ) as inputs, and the output is assigned to the block availability flag available$B_k$.

When available$B_k$ is equal to TRUE and MotionModelIdc[ xNb$B_k$ ][ yNb$B_k$ ] is greater than 0 and availableFlagB is equal to FALSE, the following applies:

The variable availableFlagB is set equal to TRUE, motionModelIdcB is set equal to MotionModelIdc[ xNb$B_k$ ][ yNb$B_k$ ], ( xNb, yNb )is set equal to (CbPosX[ xNbAB ][ yNb$B_k$ ], CbPosY[ xNb$B_k$ ][ yNb$B_k$ ] ), nbw is set equal to CbWidth[ xNb$B_k$ ][ yNb$B_k$ ], nbH is set equal to CbHeight[ xNb$B_k$ ][ yNb$B_k$ ], numCpMv is set equal to MotionModelIdc[ xNb$B_k$ ][ yNb$B_k$ ] + 1, and gbiIdxB is set equal to GbiIdx[ xNb$B_k$ ][ yNb$B_k$ ].

For X being replaced by either 0or 1, the following applies:

When PredFlagLX[ xNb$B_k$ ][ yNb$B_k$ ] is equal to TRUE, the derivation process tor luma affine control point motion vectors from a neighbouring block as specified in clause 8.4.4.5 is invoked with the luma coding block location ( xCb, yCb ) the luma coding block width and height (cbWidth, cbHeight), the neighbouring luma coding block location ( xNb, yNb ), the neighbouring luma coding block width and height (nbW, nbH), and the number of control point motion vectors numCpMv as input, the control point motion TABLE 5-continued 8.4.4.2 Derivation process for motion vectors and reference indices in subblock merge mode vector predictor candidates cpMvLXB[ cpIdx ] with cpIdx = 0 . . . numCpMv − 1 as output
The following assignments are made:
    predFlagLXB = PredFlagLX[ xNbB$_k$ ][ yNbB$_k$ ]    (8-547)
    refIdxLXB = RefIdxLX[ xNbB$_k$ ][ yNbB$_k$ ]    (8-548)

5. When sps_affine_enabled_flag is equal to 1, the derivation process for constructed affine control point motion vector merging candidates as specified in clause 8.4.4.6 is invoked with the luma coding block location ( xCb, yCb ), the luma coding block width and height (cbWidth, cbHeight), the availability flags availableA$_0$, availableA$_1$, availableA$_2$, availableB$_0$, availableB$_1$, availableB$_2$, availableB$_3$ as inputs, and the availability flags availableFlagConstK, the reference indices refIdxLXConstK, prediction list utilization flags predFlagLXConstK, motion model indices motionModelIdcConstK and cpMvpLXConstK[ cpIdx ] with X being 0 or 1, K = 1 . . . 6, cpIdx = 0 . . . 2 as outputs and gbiIdxConstK is set equal to 0 with K = 1 . . . 6 . . .

6. The initial subblock merging candidate list, subblockMergeCandList, is constructed as follows:
  i = 0
  if( availableFlagSbCol )
    subblockMergeCandList[ i++ ] = SbCol
  if( availableFlagA && i < MaxNumSubblockMergeCand )
    subblockMergeCandList[ i++ ] = A
  if( availableFlagB && i < MaxNumSubblockMergeCand )
    subblockMergeCandList[ i++ ] = B
  if( availableFlagConst1 && i < MaxNumSubblockMergeCand )
    subblockMergeCandList[ i++ ] = Const1    (8-549)
  if( availableFlagConst2 && i < MaxNumSubblockMergeCand )
    subblockMergeCandList[ i++ ] = Const2
  if( availableFlagConst3 && i < MaxNumSubblockMergeCand )
    subblockMergeCandList[ i++ ] = Const3
  if( availableFlagConst4 && i < MaxNumSubblockMergeCand )
    subblockMergeCandList[ i++ ] = Const4
  if( availableFlagConst5 && i < MaxNumSubblockMergeCand )
    subblockMergeCandList[ i++ ]= Const5
  if( availableFlagConst6 && i < MaxNumSubblockMergeCand )
    subblockMergeCandList[ i++ ] = Const6

7. The variable numCurrMergeCand and numOrigMergeCand are set equal to the number of merging candidates in the subblockMergeCandList.

8. When numCurrMergeCand is less than MaxNumSubblockMergeCand, the following is repeated until numCurrMrgeCand is equal to MaxNumSubblockMergeCand, with mvZero[0] and mvZero[1] both being equal to 0:
The reference indices, the prediction list utilization flags and the motion vectors of zeroCand$_m$ with m equal to ( numCurrMergeCand − numOrigMergeCand ) are derived as follows:
    refIdxL0ZeroCand$_m$ = 0    (8-550)
    predFlagL0ZeroCand$_m$ = 1    (8-551)
    cpMvL0ZeroCand$_m$[ 0 ] = mvZero    (8-552)
    cpMvL0ZeroCand$_m$[ 1 ] = mvZero    (8-553)
    cpMvL0ZeroCand$_m$[ 2 ] = mvZero    (8-554)
    refIdxL1ZeroCand$_m$ = ( tile_group_type = = B ) ? 0 : −1    (8-555)
    predFlagL1ZeroCand$_m$ = ( tile_group_type = = B ) ? 1 : 0    (8-556)
    cpMvL1ZeroCand$_m$[ 0 ] = mvZero    (8-557)
    cpMvL1ZeroCand$_m$[ 1 ] = mvZero    (8-558)
    cpMvL1ZeroCand$_m$[ 2 ] = mvZero    (8-559)
    motionModelIdcZeroCand$_m$ = 1    (8-560)
    gbiIdxZeroCand$_m$ = 0    (8-561)
The candidate zeroCand$_m$ with m equal to ( numCurrMergeCand − numOrigMergeCand ) is added at the end of subblockMergeCandList and numCurrMergeCand is incremented by 1 as follows:
    subblockMergeCandList[ numCurrMergeCand++ ] = zeroCand$_m$    (8-562)
The variables refIdxL0, refIdxL1, predFlagL0[ xSbIdx ][ ySbIdx ], predFlagL1[ xSbIdx ][ ySbIdx ], mL0[ xSbIdx ][ ySbIdx ], mvL1[xSbIdx ][ ySbIdx ], mvCL0[ xSbIdx ][ ySbIdx ], and mvCL1[ xSbIdx ][ ySbIdx ] with xSbIdx = 0 . . . numSbX − 1, ySbIdx = 0 . . . numsbY − 1 are derived as follows:
If subblockMergeCandList[ merge_subblock_idx[ xCb ][ yCb ] ] is equal to SbCol, the bi-prediction weight index gbiIdx is set equal to 0 and the following applies with X being 0 or 1:
    refIdxLX = refIdxLXSbCol    (8-563)
  For xSbIdx = 0 . . . numSbX − 1, ySbIdx = 0 . . . numSbY − 1, the following applies:
    predFlagLX[ xSbIdx ][ ySbIdx ] = predFlagLXSbCol[ xSbIdx ][ ySbIdx ]    (8-564)
    mvLX[ xSbIdx ][ ySbIdx ][ 0 ] = mvLXSbCol[ xSbIdx ][ ySbIdx ][ 0 ]    (8-565)
    mvLX[ xSbIdx ][ ySbIdx ][ 1 ] = mvLXSbCol[ xSbIdx ][ ySbIdx ][ 1 ]    (8-566)
  When predFlagLX[ xSbIdx ][ ySbIdx ] is equal to 1, the derivation process for chroma motion vectors in clause 8.4.2.13 is invoked with mvLX[ xSbIdx ][ ySbIdx ] and refIdxLX as inputs, and the output being mvCLX[ xSbIdx ][ ySbIdx ]
  The following assignment is made for x = xCb . . . xCb + cbWidth − 1 and
y = yCb . . . yCb + cbHeight − 1:
    MotionModelIdc[ x ][ y ] = 0    (8-567)
Otherwise (subblockMergeCandList merge_subblock_idx[ xCb ][ yCb ] ] is not equal to SbCol), the following applies with X being 0 or 1:
The following assignments are made with N being the candidate at position merge_subblock_idx[ xCb ][ yCb ] in the sbblock merging candidate list subblockMergeCandList
(N = subblockMergeCandList[ merge subblock idx[ xCb ][ yCb ] ] ):
    refIdxLX = refIdxLXN    (8-568)
    predFlagLX[ 0 ][ 0 ] = predFlagLXN    (8-569)
    cpMvLX[ 0 ] = cpMVLXN[ 0 ]    (8-570)

TABLE 5-continued

8.4.4.2 Derivation process for motion vectors and reference indices in subblock merge mode cpMvLX[ 1 ] = cpMVLXN[ 1 ]     (8-571)
cpMvLX[ 2 ] = cpMVLXN[ 2 ]     (8-572)
numCpMv = motionModelIdxN + 1     (8-573)
gbiIdx = gbiIdxN     (8-574)
For xSbIdx = 0 . . . numSbX − 1, ySbIdx = 0 . . . numSbY − 1, the following applies:
  predFlagLX[ xSbIdx ][ ySbIdx ] = predFlagLX[ 0 ][ 0 ]     (8-575)
When predFlagLX[ 0 ][ 0 ] is equal to 1, the derivation process for motion vector arrays from affine control point motion vectors as specified in subclause 8.4.4.9 is invoked with the luma coding block location ( xCb, yCb ), the luma coding block width cbWidth, the luma prediction block height cbHeight, the number of control point motion vectors numCpMv, the control point motion vectors cpMvLX[ cpIdx ] with cpIdx being 0 . . . 2, and the number of luma coding subblocks in horizontal direction numSbX and in vertical direction numSbY as inputs, the luma subblock motion vector array mvLX[ xSbIdx ][ ySbIdx ] and the chroma subblock motion vector array mvCLX[ xSbIdx ][ ySbIdx ] with xSbIdx = 0 . . . numSbX − 1, ySbIdx = 0 . . . numSbY − 1 as outputs.
The following assignment is made for x = xCb . . . xCb + cbWidth − 1 and
y = yCb . . . yCb + cbHeight − 1:
  MotionModelIdc[ x ][ y ] = numCpMv − 1     (8-576)

TABLE 6

8.4.4.3 Derivation process for subblock-based temporal merging candidates

Inputs to this process are:
  a luma location ( xCb, yCb ) of the top-left sample of the current luma coding block relative to the top-left luma sample of the current picture,
  a variable cbWidth specifying the width of the current coding block in luma samples.
  a variable cbHeight specifying the height of the current coding block in luma samples.
  the availability flags availableFlag$A_0$, availableFlag$A_1$, availableFlag$B_0$, and availableFlag$B_1$ of the neighbouring coding units,
  the reference indices refIdxLX$A_0$, refIdxLX$A_1$, refIdxLX$B_0$, and refIdxLX$B_1$ of the neighbouring coding units,
  the prediction list utilization flags predFlagLX$A_0$, predFlagLX$A_1$, predFlagLX$B_0$, and predFlagLX$B_1$ of the neighbouring coding units,
  the motion vectors in $\frac{1}{16}$ fractional-sample accuracy mvLX$A_0$, mvLX$A_1$, mvLX$B_0$, and mvLX$B_1$ of the neighbouring coding units.
Outputs of this process are:
  the availability flag availableFlagSbCol,
  the number of luma coding subblocks in horizontal direction numSbX and in vertical direction numsbY,
  the reference indices refIdxL0SbCol andrefIdxL1SbCol,
  the luma motion vectors in $\frac{1}{16}$ fractional-sample accuracy mvL0SbCol[ xSbIdx ][ ySbIdx ] and mvL1SbCol[ xSbIdx ][ ySbIdx ] with xSbIdx = 0 . . . numSbX − 1, ySbIdx = 0 . . . numSbY − 1,
  the prediction list utilization flags predFlagL0SbCol[ xSbIdx ][ ySbIdx ] and predFlagL1SbCol[ xSbIdx ][ ySbIdx ] with xSbIdx = 0 . . . numSbx − 1, ySbIdx = 0 . . . numSbY − 1,
  the bi-prediction weight index gbiIdxSbCol
The availability flag availableFlagSbCol is derived as follows.
  If one or more of the following conditions is true, availableFlagSbCol is set equal to 0.
    tile_group_temporal_mvp_enable_flag is equal to 0.
    sps_shtmvp_flag is equal to 0.
    cbWidth is less than 8.
    cbHeight is less than 8.
  Otherwise, the following ordered steps apply:
1. The location ( xCtb, yCtb ) of the top-left sample of the luma coding tree block that contains the current coding block and the location ( xCtr, yCtr ) of the below-right center sample of the current luma coding block are derived as follows:
  xCtb = ( xCb >> CtuLog2Size ) << CtuLog2Size     (8-577)
  yCtb = ( yCb >> CtuLog2Size ) << CtuLog2Size     (8-578)
  xCt = xCb + ( cbWidth / 2 )     (8-579)
  yCtr = yCb + ( cbHeight / 2 )     (8-580)
2. The luma location ( xColCtCb, yColCtrCb ) is set equal to the top-left sample of the collocated luma coding block covering the location given by ( xCtr, yCtr ) inside ColPic relative to the top-left luma sample of the collocated picture specified by ColPic.
3. The derivation process for subblock-based temporal merging base motion data as specified in clause 8.4.4.4 is invoked with the location ( xCtb, yCtb ), the location ( xColCtrCb, yColCtrCb ), the availability flags availableFlag$A_0$, availableFlag$A_1$, availableFlag$B_0$ and availableFlag$B_1$, and the prediction list utilization flags predFlagLX$A_0$, predFlagLX$A_1$, predFlagLX$B_0$ and predFlagLX$B_1$, and the reference indices refIdxLX$A_0$, refIdxLX$A_1$, refIdxLX$B_0$ and refIdxLX$B_1$, and the motion vectors mvLX$A_0$, mvLX$A_1$, mvLX$B_0$ and mLX$B_1$, with X being 0 and 1 as inputs and the motion vectors ctrMvLX, the prediction list utilization flags ctrPredFlagLX and the reference indices ctrRefIdxLX of the collocated block, with X being 0 and 1, the bi-prediction weight index gbiIdxSbCol, and the temporal motion vector tempMV as outputs.
4. The variable availableFlagSbCol is derived as follows:
  If both ctrPredFlagL0 and ctrPredFlagL1 are equal to 0, availableFlagSbCol is set equal to 0.
  Otherwise, availableFlagSbCol is set equal to 1.

TABLE 6-continued 8.4.4.3 Derivation process for subblock-based temporal merging candidates When availableFlagSbCol is equal to 1, the following applies:
   The variables numSbX, numSbY, sbWidth, sbHeight and refIdxLXSbCol are derived as follows:
        numSbX = cbWidth >> 3   (8-581)
        numSbY = cbHeight >> 3   (8-582)
        sbWidth = cbWidth / numSbX   (8-583)
        sbHeight = cbHeight / numSbY   (8-584)
        refIdxLXSbCol = 0   (8-585)
For xSbIdx = 0 ... numSbX − 1 and ySbIdx = 0 ... numSbY − 1, the motion vectors
mvLXSbCol[ xSbIdx ][ ySbIdx ] and prediction list utilization flags
predFlagLXSbCol[ xSbIdx ][ ySbIdx ] are derived as follows:
   The luma location ( xSb, ySb ) specifying the top-left sample of the current coding subblock relative to
   the top-left luma sample of the current picture is derived as follows:
        xSb = xCb + xSbIdx * sbWidth   (8-586)
        ySb = yCb + ySbIdx * sbHeight   (8-587)
   The location ( xColSb, yColSb ) of the collocated subblock inside ColPic is derived as follows.
        xColSb = Clip3( xCtb,
          Min( CurPicWidthInSamplesY − 1, xCtb + ( 1 << CtbLog2SizeY) + 3 ),   (8-588)
          xSb + ( tempMv[0] >> 4 ) )
        yColSb = Clips( yCtb,
          Min( CurPicHeightInSamplesY − 1, yCtb + (1 << CtbLog2sizeY ) − 1 ),   (8-589)
          ySb + ( tempMv[1] >> 4 ) )
   The variable currCb specifies the luma coding block covering the current coding subblock inside the
   current picture.
   The variable colCb specifies the luma coding block covering the modified location given by
   ( ( xColSb >> 3 ) << 3, ( yColSb >> 3 ) << 3 ) inside the ColPic.
   The luma location ( xColCb, yColCb ) is set equal to the top-left sample of the collocated luma, coding
   block specified by colCb relative to the top-left luma sample of the collocated picture specified by
   ColPic.
   The derivation process for collocated motion vectors as specified in clause 8.4.2.12 is invoked with
   currCb, colCb, ( xColCb, yColCb ), refIdxL0 set equal to 0 and sbFlag set equal to 1 as inputs and the
   output being assigned to the motion vector of the subblock mvL0SbCol[ xSbIdx ][ ySbIdx ] and
   availableFlagL0SbCol.
   The derivation process for collocated motion vectors as specified in clause 8.4.2.12 is invoked with
   currCb, colCb, ( xColCb, yColCb ), refIdxL1 set equal to 0 and sbFlag set equal to 1 as inputs and the
   output being assigned to the motion vector of the subblock mvL1SbCol[ xSbIdx ][ ySbIdx ] and
   availableFlagL1SbCol.
   When availableFlagL0SbCol and availableFlagL1SbCol are both equal to 0, the following applies for X
   being 0 and 1:
        mvLXSbCol[ xSbIdx ][ ySbIdx ] = ctrMvLX   (8-590)
        predFlagLXSbCol[ xSbIdx ][ ySbIdx ] = ctrPredFlagLX   (8-591)

TABLE 7

8.4.4.4 Derivation process for subblock-based temporal merging base motion data

Inputs to this process are:
   the location ( xCtb, yCtb ) of the top-left sample of the luma coding tree block that contains the current coding
   block,
   the location ( xColCtrCb, yColCtrCb ) of the top-left sample of the collocated luma coding block that covers
   the below-right center sample.
   the availability flags availableFlag$A_0$, availableFlag$A_1$, availableFlag$B_0$, and availableFlag$B_1$, of the
   neighbouring coding units,
   the reference indices refIdxLX$A_0$, refIdxLX$A_1$, refIdxLX$B_0$ and refIdxLX$B_1$ of the neighbouring coding units,
   the prediction list utilization flags predFlagLX$A_0$, predFlagLX$A_1$, predFlagLX$B_0$, and predFlagLX$B_1$ of the
   neighbouring coding units,
   the motion vectors in 1/16 fractional-sample accuracy mvLX$A_0$, mvLX$A_1$, mvLX$B_0$, and mvLX$B_1$ of the
   neighbouring coding units.
Outputs of this process are:
   the motion vectors ctrMvL0 and ctrMvL1,
   the prediction list utilization flags ctrPredFlagL0 and ctrPredFlagL1,
   the reference indices ctrRefIdxL0 and ctrRefIdxL1,
   the temporal motion vector tempMV,
   the bi-prediction weight index gbiIdxSbCol
The variable tempMv is set as follows:
   tempMv[ 0 ] = 0   (8-592)
   tempMv[ 1 ] = 0   (8-593)
The variable currPic specifies the current picture.
The variable availableFlagN is set equal to FALSE, and the following applies:
   When availableFlag$A_1$ is equal to 1, the following applies:
      availableFlagN is set equal to TRUE,
      refIdxLXN is set equal to refIdxLX$A_0$ and mvLXN is set equal to mLX$A_0$, for X being replaced by 0 and
      1.
   When availableFlagN is equal to FALSE and availableFlagL$B_1$, is equal to I, the following applies:
      availableFlagN is set equal to TRUE, TABLE 7-continued

| 8.4.4.4 Derivation process for subblock-based temporal merging base motion data |
|---| refIdxLXN is set equal to refidxLXB$_0$ and mLXN is set equal to mvLXB$_0$, for X being replaced by 0 and 1.
When availableFlagN is equal to FALSE and availableFlagB$_0$ is equal to 1, the following applies:
  availableFlagN is set equal to TRUE.
  refIdxLXN is set equal to refIdxLXB$_1$ and mvLXN is set equal to mvLXB$_1$, for X being replaced by 0 and 1.
When availableFlagN is equal to FALSE and availableFlagA$_0$ is equal to 1, the following applies:
  availableFlagN is set equal to TRUE.
  refIdxLXN is set equal to refIdxLXA$_1$ and mvLXN is set equal to mvLXA$_1$, for X being replaced by 0 and 1.
When availableFlagN is equal to TRUE, the following applies:
  If all of the following conditions are true, tempMV is set equal to mvL1N.
    predFlagL1N is equal to 1,
    DiffPicOrderCnt(ColPic,RefPicList1[refIdxL1N]) is equal to 0,
    DiffPicOrderCht(aPic, currPic) is less than or equal to 0 for every picture aPic in every reference picture list of the current tile group.
    tile_group_type is equal to B,
    collocated_from_l0_flag is equal to 0.
  Otherwise if all of the following conditions are true, tempMV is set equal to mvL0N:
    predFlagL0N is equal to 1,
    DiffPicOrderCnt(ColPic, RefPicList0[refIdxL0N]) is equal to 0.
The location ( xColCb, yColCb ) of the collocated block inside ColPic is derived as follows.
  xColCb = Clip3( xCtb,
    Min( CurPicWidthinSamplesY − 1, xCtb + ( 1 << CtbLog2SizeY ) − 3 ), (8-59 4)
    xColCtrCb + ( tempMv[0] >> 4 ) )
  yColCb = Clip3( yCtb,
    Min( CurPicHeightInSamplesY − 1, yCtb + (1 << CtbLog2SizeY ) − 1 ), (8-5 95)
    yColCtCb + ( tempMv[1] >> 4 ) )
The array colPredMode is set equal to the prediction mode array CuPredMode of the collocated picture specified by ColPic.
The motion vectors ctrMvL0 and ctrMvL1, the prediction list utilization flags ctrPredFlagL0 and ctrPredFlagL1, and the reference indices ctrRefIdxL0 and ctrRefIdxL1 are derived as follows:
  If colPredMode[xColCb][yColCb] is equal to MODE INTER, the following applies:
    The variable currCb specifies the luma coding block covering ( xCtrCb ,yCtrCb ) inside the current picture.
    The variable colCb specifies the luma coding block covering the modified location given by
    ( ( xColCb >> 3 ) << 3, ( yColCb >> 3 ) << 3 ) inside the ColPic.
    The luma location ( xColCb, yColCb) is set equal to the top-left sample of-the collocated luma coding block specified by colCb relative to the top-left luma sample of the collocated picture specified by ColPic.
    The gbiIdxSbCol is set equal to gbiIdxcolCb.
    The derivation process for temporal motion vector prediction in subclause 8.4.2.12 is invoked with currCb, colCb, (xColCb, yColCb), centerRefIdxL0 and sbFlag set equal to 1 as inputs and the output being assigned to ctrMvL0 and ctrPredFlagL0.
    The derivation process for temporal motion vector prediction in subelause 8.4.2.12 is invoked with currCb, colCb, (xColCb, yColCb), centerRefIdxL1, and sbFlag set equal to 1 as inputs and the output being assigned to ctrMvL1 andctrPredFlagL1.
  Otherwise, the following applies:
    ctrPredFlagL0 = 0 (8-596)
    ctrPredFlagL1 = 0 (8-597)

Referring to Table 5, Table 6, and Table 7, gbiIdx may indicate a bi-prediction weight index, and gbiIdxSbCol may indicate a bi-prediction weight index for a subblock-based temporal merge candidate (eg, a temporal motion vector candidate in a subblock-based merge candidate list).<0 In the procedure (8.4.4.4) for deriving base motion information on subblock-based temporal merge, the gbiIdxSbCol may be derived as gbiIdxcolCb. That is, the weight index of the subblock-based temporal motion vector candidate may be derived as the weight index of the temporal center block. For example, the temporal center block may indicate a subblock or sample positioned at the center of the col block or the col block, and specifically, may indicate a subblock positioned at the bottom-right of the four central subblocks or samples of the col block or a sample.

Alternatively, the weight index information on the weighted average of the subblock-based temporal motion vector candidates may be derived based on the weight index information in units of each subblock, and may be derived erived based on the weight index information on the temporal center block when the subblock is not available. For example, the temporal center block may indicate a subblock or sample positioned at the center of the col block or the col block, and specifically, may indicate a subblock positioned at the bottom-right of the four central subblocks or samples of the col block or a sample. For example, in this case, the procedure for deriving the motion vector and reference index in the subblock merge mode, the procedure for deriving the subblock-based temporal merge candidate, and the procedure for deriving the base motion information for the subblock-based temporal merge may be shown in Table 8, Table 9, and Table 10.

TABLE 8

8.4.4.2 Derivation process for motion vectors and reference indices in subblock merge mode Inputs to this process are:
    a luma location ( xCb, yCb) of the top-left sample of the current luma coding block relative to the top-left luma sample of the current picture.,
    two variables cbWidth and cbHeight specifying the width and the height of the luma coding block.

Outputs of this process are:
    the number of luma coding subblocks in horizontal direction numSbX and in vertical direction numSbY,
    the reference indices refIdxL0 andrefIdxL1,
    the prediction list utilization flag arrays predFlagL0[ xSbIdx ][ ySbIdx ] and
    predFlagL1[ xSbIdx ][ ySbIdx ],
    the luma subblock motion vector arrays in 1/16 fractional-sample accuracy mvL0[ xSbIdx ][ ySbIdx ] and
    mvL1[ xSbIdx ][ ySbIdx ] with xSbIdx = 0 . . . numSbX − 1, ySbIdx = 0 . . . numSbY − 1,
    the chroma subblock motion vector arrays in 1/32 fractional-sample accuracy mvCL0[ xSbIdx ][ ySbIdx ]
    and mvCL1[ xSbIdx ][ ySbIdx ] with xSbIdx = 0 . . . numSbX − 1, ySbIdx = 0 . . . numSbY − 1,
    the bi-prediction weight index gbiIdx.

The variables numSbX, numSbY and the subblock merging candidate list, subblockMergeCandList are derived by ths following ordered steps:

1. When sps_sbtmvp_enabled_flag is equal to 1, the following applies:
    The derivation process for merging candidates from neighbouring coding units as specified in clause 8.4.2.3 is invoked with the luma coding block location ( xCb, yCb ), the luma coding block width cbWidth, the luma coding block height cbHeight and the luma coding block width as inputs, and the output being the availability flags availableFlag$A_0$, availableFlag$A_1$, availableFlag$B_0$, availableFlag$B_1$ and availableFlag$B_2$, the reference indices refIdxLX$A_0$, refIdxLX$A_1$, refIdxLX$B_0$, refIdxLX$B_1$ and refIdxLX$B_2$, the prediction list utilization flags predFlagLX$A_0$, predFlagLX$A_1$, predFlagLX$B_0$, predFlagLX$B_1$ and predFlagLX$B_2$, and the motion vectors mvLX$A_0$, mvLX$A_1$, mvLX$B_0$, mvLX$B_1$ and mvLX$B_2$, with X being 0 or 1.
    The derivation process for subblock-based temporal merging candidates as specified in clause 8.4.4.3 is invoked with the luma location ( xCb, yCb ), the luma coding block width cbWidth, the luma coding block height cbHeight , the availability flags availableFlag$A_0$, availableFlag$A_1$, availableFLag$B_0$, availableFlag$B_1$, the reference indices refIdxLX$A_0$, refIdxLX$A_1$, refIdxLX$B_0$, refIdxLX$B_1$, the prediction list utilization flags predFlagLX$A_0$, predFlagLX$A_1$, predFlagLX$B_0$, predFlagLX$B_1$ and lthe motion vectors mvLX$A_0$, mvLX$A_1$, mvLX$B_0$, mvLX$B_1$ as inputs and the output being the availability flag availableFlagSbCol, the number of luma coding subblocks in horizontal direction numSbX and in vertical direction. numSbY, the reference indices refIdxLXSbCol, the bi-prediction weight index gbiIdxLXSbCol[ xSbIdx ][ ySbIdx ], the luma motion vectors mvLXSbCol[ xSbIdx ][ ySbIdx ] and the prediction list utilization flags predFlagLXSbCol[ xSbIdx ][ ySbIdx ] with xSbIdx = 0 . . . numSbX − 1, ySbidx = 0 . . . numSbY − 1 and X being 0 or 1.

2. When sps_affine_enabled_flag is equal to 1, the sample locations ( xNb$A_0$, yNb$A_0$ ), ( xNb$A_1$, yNb$A_1$ ), ( xNb$A_2$, yNb$A_2$ ), ( xNb$B_0$, yNb$B_0$ ), ( xNb$B_1$, yNb$B_1$ ), ( xNb$B_2$, yNb$B_2$ ), ( xNb$B_3$, yNb$B_3$ ), and the variables numSbX and numSbY are derived as follows:

( x$A_0$, y$A_0$ ) = ( xCb − 1, yCb + cbHeight )     (8-536)
    ( x$A_1$, y$A_1$ ) = ( xCb − 1, yCb + cbHeight − 1 )     (8-537)
    ( x$A_2$, y$A_2$ ) = ( xCb − 1, yCb )     (8-538)
    ( x$B_0$, y$B_0$ ) = ( xCb + cbWidth, yCb − 1 )     (8-539)
    ( x$B_1$, y$B_1$ ) = ( xCb + cbWidth − 1, yCb − 1)     (8-540)
    ( x$B_2$, y$B_2$ ) = ( xCb − 1, yCb − 1 )     (8-541)
    ( x$B_3$, y$B_3$ ) = ( xCb, yCb − 1 )     (8-542)
    numSbX = cbWidth >> 2     (8-543)
    numSbY = cbHeight >> 2     (8-544)

3. When sps_affine_enabled_flag is equal to 1, the variable availableFlagA is set equal to FALSE and the following applies for ( xNb$A_k$, yNb$A_k$ ) from ( xNb$A_0$, yNb$A_0$ ) to ( xNb$A_1$, yNb$A_1$ ):
    The availability derivation process for a block as specified in clause 6.4.X [Ed. (BB):
    Neighbouring blocks availability checking process tbd] is invoked with the current luma location ( xCurr, yCurr ) set equal to ( xCb, yCb ) and the neighbouring luma location ( xNb$A_k$, yNb$A_k$ ) as inputs, and the output is assigned to the block availability flag availableA$_k$.
    When availableA$_k$ is equal to TRUE and MotionModelIdc[ xNb$A_k$ ][ yNb$A_k$ ] is greater than 0 and availableFlagA is equal to FALSE, the following applies:
        The variable availableFlagA is set equal to TRUE, motionModelIdcA is set equal to MotionModelIdc[ xNb$A_k$ ][ yNb$A_k$ ], ( xNb, yNb) is set equal to ( CbPosX[ xNb$A_k$ ][ yNb$A_k$ ] CbPosY[ xNb$A_k$ ][ yNb$A_k$ ] ), nbW is set equal to CbWidth[ xNb$A_k$ ][ yNb$A_k$ ] nbH is set equal to CbHeight[ xNb$A_k$ ][ yNb$A_k$ ], numCpMv is set equal to MotionModelIdc[ xNb$A_k$ ][ yNb$A_k$ ] + 1, and gbiIdxA is set equal to GbiIdx[ xNb$A_k$ ][ yNb$A_k$ ].
    For X being replaced by either 0 or 1, the following applies:
        When PredFlagLX[ xNb$A_k$ ] [ yNb$A_k$ ] is equal to 1, the derivation process for luma affine control point motion vectors from a neighbouring block as specified in clause 8.4.4.5 is invoked with the luma coding block location ( xCb, yCb ), the luma coding block width and height (cbWidth, cbHeight), the neighbouring luma coding block location ( xNb, yNb ), the neighbouring luma coding block width and height (nbW, nbH), and the number of control point motion vectors numCpMv as input, the control point motion vector predictor candidates cpMvLXA[cpIdx] with cpIdx = 0 . . . numCpMv − 1 as output.
        The following assignments are made:
            predFlagLXA = PredFlagLX[ xNb$A_k$ ][ yNb$A_k$ ]     (8-545)
            refIdxLXA = RefIdxLX[ xNbAk ][ yNbAk ]     (8-546)

TABLE 8-continued 8.4.4.2 Derivation process for motion vectors and reference indices in subblock merge mode 4. When sps_affine_enabled_flag is equal to 1, the variable availableFlagB is set equal to FALSE and the following applies for ( xNbB$_k$, yNbB$_k$ ) from (xNbB$_0$, yNbB$_0$) to ( xNbB$_2$, yNbB$_2$ ):
   The availability derivation process for a block as specified in clause 6.4.X [Ed. (BB):
   Neighbouring blocks availability checking process tbd] is invoked with the current luma location ( xCurr, yCurr ) get equal to ( xCb, yCb ) and the neighbouring luma location ( xNbB$_k$, yNbB$_k$ ) as inputs, and the output is assigned to the block availability flag availableB$_k$.
   When availableB$_k$ is equal to TRUE and MotionModelIdc[ xNbB$_k$ ][ yNbB$_k$ ] is greater than 0 and availableFlagB is equal to FALSE, the following applies:
   The variable availableFlagB is set equal to TRUE, motionModelIdcB is set equal to MotionModelIdc[ xNbB$_k$ ][ yNbB$_k$ ], ( xNb, yNb ) is set equal to ( CbPosX[ xNbAB ][ yNbB$_k$ ], CbPosY[ xNbB$_k$ ][ yNbB$_k$ ] ), nbW is set equal to CbWidth[ xNbB$_k$ ][ yNbB$_k$ ], nbH is set equal to CbHeight[ xNbB$_k$ ][ yNbB$_k$ ], numCpMv is set equal to MotionModelIdc[ xNbB$_k$ ][ yNbB$_k$ ] + 1, and gbiIdxB is set equal to GbiIdx[ xNbB$_k$ ][ yNbB$_k$ ].
   For X being replaced by either 0 or 1, the following applies:
   When PredFlagLX[ xNbB$_k$ ][ yNbB$_k$ ] is equal to TRUE, the derivation process for luma affine control point motion vectors from a neighbouring block as specified in clause 8.4.4.5 is invoked with the luma coding block location ( xCb, yCb ), the luma coding block width and height (cbWidth, cbHeight), the neighbouring luma coding block location ( xNb, yNb ), the neighbouring luma coding block width and height (nbW, nbH), and the number of control point motion vectors numCpMv as input, the control point motion vector predictor candidates cpMVLXB[ cpIdx ] with cpIdx = 0 . . . numCpMv − 1 as output.
   The following assignments are made:
   predFlagLXB = PredFlagLX[ xNbB$_k$ ][ yNbB$_k$ ]   (8-547)
   refIdxLXB = RefIdxLX[ xNbB$_k$ ][ yNbB$_k$ ]   (8-548)

5. When sps_affine_enabled_flag is equal to 1, the derivation process for constructed affine control point motion vector merging candidates as specified clause 8.4.4.6 is invoked with the luma coding block location ( xCb, yCb ) the luma coding block width and height (cbWidth, cbHeight), the availability flags availableA$_0$, availableA$_1$, availableA$_2$, availableB$_0$, availableB$_1$, availableB$_2$, availableB$_3$ as inputs, and the availability flags availableFlagConstK, the reference indices refIdxLXConstK, prediction list utilization flags predFlagLXConstK, motion model indices motionModelIdcConstK and cpMvpLXConstK[ cpIdx ] with X being 0 or 1, K = 1 . . . 6, cpIdx = 0 . . . 2 as outputs and ghiIdxConstK is set equal to 0 with K = 1 . . . 6 . . .

6. The initial subblock merging candidate list, subblockMergeCandList is constructed as follows:
   i = 0
   if ( availableFlagSbCol )
   subblockMergeCandList[ i++ ] = SbCol
   if( availableFlagA && i < MaxNumSubblockMergeCand )
   subblockMergeCandList[ i++ ] = A
   if( availableFlagB && i < MaxNumSubblockMergeCand )
   subblockMergeCandList[ i++ ] = B
   if( availableFlagConst1 && i < MaxNumSubblockMergeCand )
   subblockMergeCandList[ i++ ] = Const1   (8-549)
   if( availableFlagConst2 && i < MaxNumSubblockMergeCand )
   subblockMergeCandList[ i++ ] = Const2
   if( availableFlagConst3 && i < MaxNumSubblockMergeCand )
   subblockMergeCandList[ i++ ] = Const3
   if( availableFlagConst4 && i < MaxNumSubblockMergeCand )
   subblockMergeCandList[ i++ ] = Const4
   if( availableFlagConst5 && i < MaxNumSubblockMergeCand )
   subblockMergeCandList[ i++ ] = Const5
   if( availableFlagConst6 && i < MaxNumSubblockMergeCand )
   subblockMergeCandList[ i++ ] = Const6

7. The variable numCurrMergeCand and numOrigMergeCand are set equal to the number of merging candidates in the subblockMergeCandList.

8. When numCurrMergeCand is less than MaxNumSubblockMergeCand, the following is repeated until numCurrMergeCand is equal to MaxNumSubblockMergeCand, with mvZero[0] and mvZero[1]both being equal to 0:
   The reference indices, the prediction list utilization flags and the motion vectors of zeroCand$_m$ with m equal to ( numCurrMergeCand − numOrigMergeCand ) are derived as follows:
   refIdxL0ZeroCand$_m$ = 0   (8-550)
   predFlagL0ZeroCand$_m$ = 1   (8-551)
   cpMvL0ZeroCand$_m$[ 0 ] = mvZero   (8-552)
   cpMvL0ZeroCand$_m$[ 1 ] = mvZero   (8-553)
   cpMvL0ZeroCand$_m$[ 2 ] = mvZero   (8-554)
   refIdxL1ZeroCand$_m$ = ( tile_group_type = = B ) ? 0 : −1   (8-555)
   predFlagL1ZeroCand$_m$ = ( tile_group_type = = B ) ? 1 : 0   (8-556)
   cpMvL1ZeroCand$_m$[ 0 ] = mvZero   (8-557)
   cpMvL1ZeroCand$_m$[ 1 ] = mvZero   (8-558)
   cpMvL1ZeroCand$_m$[ 2 ]= mvZero   (8-559)
   motionModelIdcZeroCand$_m$ = 1   (8-560)
   gbiIdxZeroCand$_m$ = 0   (8-561)
   The candidate zeroCand with m equal to ( numCurrMergeCand − numOrigMergeCand ) is added at the end of subblockMergeCandList and numCurrMergeCand is incremented by 1 as follows:
   subblockMergeCandList[ numCurrMergeCand++ ] = zeroCand$_m$   (8-562)

TABLE 8-continued

8.4.4.2 Derivation process for motion vectors and reference indices in subblock merge mode The variables refIdxL0, refIdxL1, predFlagL0[ xSbIdx ][ ySbIdx ], predFlagL1[ xSbIdx ][ ySbIdx ],
mvL0[ xSbIdx ][ ySbIdx ], mvL1[ xSbIdx ][ ySbIdx ], mvCL0[ xSbIdx ][ ySbIdx ], and
mvCL1[ xSbIdx ][ ySbIdx ] with xSbIdx = 0 . . . numSbX − 1, ySbIdx = 0 . . . numSbY − 1 are derived as follows:
    If subblockMergeCandList merge_subblock_idx[ xCb ][ yCb ] ] is equal to SbCol, the bi-prediction
    weight index gbiIdx is set equal to 0 and the following applies with X being 0 or 1:
        refIdxLX = refIdxLXSbCol    (8-563)
        For xSbIdx = 0 . . . numSbX − 1, ySbIdx = 0 . . . numSbY − 1, the following applies:
            predFlagLX[ xSbIdx ][ ySbIdx ] = predFlagLXSbCol[ xSbIdx ][ ySbIdx ]    (8-564)
            mvLX[ xSbIdx ][ ySbIdx ][ 0 ] = myLXSbCol[ xSbIdx ][ 0 ]    (8-565)
            mvLX[ xSbIdx ][ ySbIdx ][ 1 ] = mvLXSbCol[ xSbIdx ][ ySbIdx ][ 1 ]    (8-566)
        - When predFlagLX[ xSbIdx ][ ySbIdx ] is equal to 1, the derivation process for chroma motion
            vectors in clause 8.4.2.13 is invoked with mvLX[ xSbIdx ][ ySbIdx ] and refIdxLX as inputs, and
            the output being mvCLX[ xSbIdx ][ ySbIdx ]
    The following assignment is made for x = xCb . . . xCb + cbWidth − 1 and
    y = yCb . . . yCb + cbHeight − 1:
        MotionModelIdc[ x ][ y ] = 0    (8-567)
Otherwise (subblockMergeCandList[ merge_subblock_idx[ xCb ][ yCb ] ] is not equal to SbCol), the
following applies with X being 0 or 1:
    The following assignments are made with N being the candidate at position
    merge_subblock_idx[ xCb ][ yCb ] in the subblock merging candidate list subblockMergeCandList
    (N = subblockMergeCandList[ merge_subblock_idx[ xCb ][ yCb ] ] ):
        refIdxLX = refIdxLXN    (8-568)
        predFlagLX[ 0][ 0 ] = predFlagLXN    (8-569)
        cpMvLX[ 0 ] = cpMvLXN[ 0 ]    (8-570)
        cpMvLX[ 1 ] = cpMvLXN[ 1 ]    (8-571)
        cpMvLX[ 2 ] = cpMvLXN[ 2 ]    (8-572)
        numCpMv = motionModelIdxN + 1    (8-573)
        gbiIdx = gbiIdxN    (8-574)
    For xSbIdx = 0 . . . numSbX − 1, ySbIdx = 0 . . . numSbY − 1, the following applies:
        predFlagLX[ xSbIdx ][ ySbIdx ] = predFlagLX[ 0 ][ 0 ]    (8-575)
    When predFlagLX[ 0 ][ 0 ] is equal to 1, the derivation process for motion vector arrays from affine
    control point motion vectors as specified in subclause 8.4.4.9 is invoked with the luma codig block
    location ( xCb, yCb ), the luma coding block width cbWidth, the luma prediction block height cbHeight,
    the number of control point motion vectors numCpMv, the control point motion vectors cpMvLX[ cpIdx ]
    with cpIdx being 0 . . . 2, and the number of luma coding subblocks in horizontal direction numSbX and in
    vertical direction numSbY as inputs, the luma subblock motion vector array mvLX[ xSbIdx ][ ySbIdx ]
    and the chroma subblock motion vector array mvCLX[ xSbIdx ][ ySbIdx ] with xSbIdx = 0 . . . numSbX − 1,
    ySbIdx = 0 . . . numSbY − 1 as outputs.
    The following assignment is made for x = xCb . . . xCb + cbWidth − 1 and y = yCb . . . yCb + cbHeight − 1:
        MotionModelIdc[ x ][ y ] = numCpMv − 1    (8-576)

TABLE 9

8.4.4.3 Derivation process for subblock-based temporal merging candidates

Inputs to this process are:
    a luma location ( xCb, yCb ) of the top-left sample of the current luma coding block relative to the top-left
    luma sample of the current picture,
    a variable cbWidth specifying the width of the current coding block in luma samples.
    a variable cbHeight specifying the height of the current coding block in luma samples.
    the availability flags availableFlag$A_0$, availableFlag$A_1$, availableFlag$B_0$, and availableFlag$B_1$ of the
    neighbouring coding units.
    the reference indices refIdxLX$A_0$, refIdxLX$A_1$, refIdxLX$B_0$, and refIdxLX$B_1$ of the neighbouring coding units,
    the prediction list utilization flags predFlagLX$A_0$, predFlagLX$A_1$, predFlagLX$B_0$, and predFlagLX$B_1$ of the
    neighbouring coding units.
    the motion vectors in $\frac{1}{16}$ fractional-sample accuracy mvLX$A_0$, mvLX$A_1$, mvLX$B_0$, and mLX$B_1$ of the
    neighbouring coding units.
Outputs of this process are:
    the availability flag availableFlagSbCol,
    the number of luma coding subblocks in horizontal direction numSbX and in vertical direction numSbY,
    the reference indices refdxL0SbCol and refIdxL1SbCol,
    the luma motion vectors in $\frac{1}{16}$ fractional-sample accuracy mvL0SbCol[ xSbIdx ][ ySbIdx ] and
    mvL1SbCol [xSbIdx ][ ySbIdx ] with xSbIdx = 0..numsbX − 1, ySbIdx = 0 . . . numSbY − 1,
    the bi-prediction weight index gbiIdxSbCol[ xSbIdx ][ySbIdx ] the prediction list utilization flags
    predFlagL0SbCol[ xSbIdx ][ ySbIdx ] and predFlagL1SbCol[ xSbIdx ][ ySbIdx ]with
    xSbIdx = 0 . . . numsbX − 1, ySbIdx = 0 . . . numSbY − 1,
The availability flag availableFlagSbCol is derived as follows.
    If one or more of the following conditions is true, availableFlagSbCol is set equal to 0.
        tile group temporal mvp enable flag is equal to 0.
        sps_sbtmvp_flag is equal to 0.
        cbWidth is less than 8
        cbHeight is less than 8.

TABLE 9-continued 8.4.4.3 Derivation process for subblock-based temporal merging candidates Otherwise, the following ordered steps apply:
1. The location ( xCtb, yCtb ) of the top-left sample of the luma coding tree block that contains the current coding block and the location ( xCtr, yCtr ) of the below-right center sample of the current luma coding block are derived as follows:
    xCtb = ( xCb >> CtuLog2Size ) << CtuLog2Size    (8-577)
    yCtb = ( yCb >> CtuLog2Size ) << CtuLog2Size    (8-578)
    xCtr = xCb + ( cbWidth / 2 )    (8-579)
    yCtr = yCb + ( cbHeight / 2 )    (8-580)
2. The luma location ( xColCtrCb, yColCtrCb ) is set equal to the top-left sample of the collocated luma coding block covering the location given by ( xCtr, yCtr ) inside ColPic relative to the top-left luma sample of the collocated picture specified by ColPic.
3. The derivation process for subblock-based temporal merging base motion data as specified in clause 8.4 4.4 is invoked with the location ( xCtb, yCtb ), the location ( xColCtrCb, yColCtrCb ), the availability flags availableFlag$A_0$, availableFlag$A_1$, availableFlag$B_0$ and availableFlag$B_1$, and the prediction list utilization flags predFlagLX$A_0$, predFlagLX$A_1$, predFlagLX$B_0$ and predFlagLX$B_1$, and the reference indices refIdxLX$A_0$, refIdxLX$A_1$, refIdxLX$B_0$ and refIdxLX$B_1$, and the motion vectors mvLX$A_0$, mvLX$A_1$, mvLX$B_0$ and mvLX$B_1$, with X being 0 and 1 as inputs and the motion vectors ctrMvLX, the prediction list utilization flags ctrPredFlagLX and the reference indices ctrRefIdxLX of the collocated block, with X being 0 and 1, the bi-prediction weight index ctrgbiIdx, and the temporal motion vector tempMV as outputs.
4. The variable availableFlagSbCol is derived as follows:
    If both ctrPredFlagL0 and ctrPredFlagL1 are equal to 0, availableFlagSbCol is set equal to 0.
    Otherwise, availableFlagSbCol is set equal to 1.
When availableFlagSbCol is equal to 1, the following applies:
The variables numSbX, numSbY, sbWidth, sbHeight and refIdxLXSbCol are derived as follows:
    numSbX = cbWidth >> 3    (8-581)
    numSbY = cbHeight >> 3    (8-582)
    sbWidth = cbWidth / numSbX    (8-583)
    sbHeight = cbHeight / numSbY    (8-584)
    refIdxLXSbCol = 0    (8-585)
For xSbIdx = 0 . . . numSbX − 1 and ySbIdx = 0 . . . numSbY − 1, the motion vectors mvLXSbCol[ xSbIdx ][ ySbIdx ] and prediction list utilization flags predFlagLXSbCol[ xSbIdx ][ ySbIdx ] are derived as follows:
    The luma location ( xSb, ySb ) specifying the top-left sample of the current coding subblock relative to the top-left luma sample of the current picture is derived as follows:
        xSb = xCb + xSbIdx * sbWidth    (8-586)
        ySb = yCb + ySbIdx * sbHeight    (8-587)
    The location ( xColSb, yColSb ) of the collocated subblock inside ColPic is derived as follows.
        xColSb = Clip3( xCtb,
          Min( CurPicWidthInSamplesY − 1, xCtb + ( 1 << CtbLog2SizeY ) + 3 ), (8-588)
          xSb + ( tempMv[0] >> 4 ) )
        yColSb = Clip3( yCtb,
          Min( CurPicHeightinSamplesY − 1, yCtb + (1 << CtbLog2SizeY ) − 1 ), (8-589)
          ySb + (tempMv[1] >> 4 ) )
    The variable currCb specifies the luma coding block covering the current coding subblock inside the current picture.
    The variable colCb specifies the luma coding block covering the-modified location given by ( ( xColSb >> 3 ) << 3, ( yColSb >> 3 ) << 3 ) inside theColPic.
    The luma location ( xColCb, yColCb ) is set equal to the top-left sample of the collocated luma coding block specified by colCb relative to the top-left luma sample of the collocated picture specified by ColPic.
    The gbiIdxSbCol[ xSbIdx ][ ySbIdx ] is set equal to gbiIdxcolCb.
    The derivation process for collocated motion vectors as specified in clause 8.4.2.12 is invoked with currCb, colCb, ( xColCb, yColCb ), refIdxL0 set equal to 0 and sbFlag set equal to 1 as inputs and the output being assigned to the motion vector of the subblock mvL0SbCol[ xSbIdx ][ ySbIdx ] and availableFlagL0SbCol.
    The derivation process for collocated motion vectors as specified in clause 8.4.2.12 is invoked with currCb, colCb, ( xColCb, yColCb ), reIidxL1 set equal to 0 and sbFlag set equal to 1 as inputs and the output being assigned to the motion vector of the subblock mvL1SbCol[ xSbIdx ][ ySbIdx ] and availableFlagL1SbCol.
    When availableFlagL0SbCol and availableFlagL1SbCol are both equal to 0, the following applies for X being 0 and 1:
        mvLXSbCol[ xSbIdx ][ ySbIdx ] = ctMvLX    (8-590)
        predFlagLXSbCol[ xSbIdx ][ ySbIdx ] = ctrPredFlagLX    (8-591)
        gbiIdxSbCol [ xSbIdx ][ ySbIdx ] = ctrgbiIdx    (x-xxx)

TABLE 10

8.4.4.4 Derivation process for subblock-based temporal merging base motion data

Inputs to this process are:
  the location ( xCtb, yCtb ) of the top-left sample of the luma coding tree block that contains the current coding block,
  the location ( xColCtrCb, yColCtrCb ) of the top-left sample of the collocated luma coding block that covers the below-right center sample.
  the availability flags availableFlag$A_0$, availableFlag$A_1$, availableFlag$B_0$ and availableFlag$B_1$ of the neighbouring coding units,
  the reference indices refIdxLX$A_0$, refIdxLX$A_1$, refIdxLX$B_0$, and refIdxLX$B_1$ of the neighbouring coding units,
  the prediction list utilization flags predFlagLX$A_0$, predFlagLX$A_1$, predFlagLX$B_0$, and predFlagLX$B_1$ of the neighbouring coding units
  the motion vectors in $\frac{1}{16}$fractional-sample accuracy mvLX$A_0$, mvLX$A_1$, mvLX$B_0$, and mvLX$B_1$ of the neighbouring coding units.
Outputs of this process are:
  the motion vectors ctrMvL0 andctrMvL1,
  the prediction list utilization flags ctrPredFlagL0 and ctrPredFlagL1,
  the reference indices ctrRefIdxL0 and ctrRefIdxL1,
  the temporal motion vector tempMV,
  the bi-prediction weight index ctrgbiIdx.
The variable tempMv is set as follows:
  tempMv[ 0 ] = 0  (8-592)
  tempMv[ 1 ] = 0  (8-593)
The variable currPic specifies the current picture.
The variable availableFlagN is set equal to FALSE, and the following applies:
  When availableFlag$A_1$ is equal to 1, the following applies:
    availableFlag$A_1$ is set equal to TRUE,
    refIdxLXN is set equal to refidxLX$A_0$ and mvLXN is set equal to mvLX$A_0$, for X being replaced by 0 and 1.
  When availableFlagN is equal to FALSE and availableFlagL$B_1$ is equal to 1, the following applies:
    availableFlagN is set equal to TRUE,
    refdxLXN is set equal to refIdxLX$B_0$ and mvLXN is set equal to mvLX$B_0$, for X being replaced by 0 and 1.
  When availableFlagN is equal to FALSE and availableFlag$B_0$ is equal to 1, the following applies:
    availableFlagN is set equal to TRUE.
    refIdxLXN is set equal to refIdxLX$B_1$ and mvLXN is set equal to mvLX$B_1$, for X being replaced by 0 and 1.
  When availableFlagN is equal to FALSE and availableFlag$A_0$ is equal to 1, the following applies:
    availableFlagN is set equal to TRUE.
    refIdxLXN is set equal to refIdxLX$A_1$ and mvLXN is set equal to mvLX$A_1$, for X being replaced by 0 and 1.
When availableFlagN is equal to TRUE, the following applies:
  If all of the following conditions are true, tempMV is set equal to mvL1N:
      predFlagL1N is equal to 1,
      DiffPicOrderCnt(ColPic, RefPicList1[refIdxL1N]) is equal to 0,
      DiffPicOrderCnt(aPic, currPic) is less than or equal to 0 for every picture aPic in every reference picture list of the current tile group,
      tile_group_type is equal to B,
      collocated_from_l0_flag is equal to 0.
  Otherwise if all of the following conditions are true, tempMV is set equal to mvL0N:
      predFlagL0N is equal to 1,
      DiffPicOrderCnt(ColPic, RefPicList0[refIdxL0N]) is equal to 0.
The location ( xColCb, yColCb ) of the collocated block inside ColPic is derived as follows.
      xColCb = Clip3( xCtb,
        Min( CurPicWidthinSamplesY − 1, xCtb + ( 1 << CtbLog2SizeY ) + 3 ),(8-594)
        xColCtrCb + ( tempMv[0] >> 4 ) )
      yColCb = Clip3 (yCtb,
        Min( CurPicHeightInSamplesY − 1, yCtb + (1 << CtbLog2SizeY ) − 1 ), (8-595)
        yColCtrCb + ( tempMv[1] >> 4 ) )
The array colPredMode is set equal to the prediction mode array CuPredMode of the collocated picture specified by ColPic.
The motion vectors ctrMvL0 and ctrML1, the prediction list utilization flags ctrPredFlagL0 and ctrPredFlagL1, and the reference indices ctrRefdxL0 and ctrRefdxL1 are derived as follows:
  If colPredMode[xColCb][yColCb] is equal to MODE_INTER, the following applies:
      The variable currCb specifies the luma coding block covering ( xCtrCb, yCtrCb ) inside the current picture.
      The variable colCb specifies the luma coding block covering the modified location given by
      ( ( xColCbp >> 3 ) << 3, ( yColCb >> 3 ) << 3 ) inside the ColPic.
      The luma location ( xColCb, yColCb ) is set equal to the top-left sample of the collocated luma coding block specified by colCb relative to the top-left luma sample of the collocated picture specified byColPic.
      The gbiIdxSbCol is set equal to ctrgbiIdx.
      The derivation process for temporal motion vector prediction in subclause 8.4.2.12 is invoked with currCb, colCb, (xColCb, yColCb), centerRefIdxL0, and sbFlag set equal to 1 as inputs and the output being assigned to ctrMvL0 and ctrPredFlagL0.

TABLE 10-continued 8.4.4.4 Derivation process for subblock-based temporal merging base motion data The derivation process for temporal motion vector prediction in subclause 8.4.2.12 is invoked with currCb, colCb, (xColCb, yColCb), centerRefIdxL1, and sbFlag set equal to 1 as inputs and the output being assigned to ctrMvL1 and ctrPredFlagL1.
Otherwise, the following applies:
    ctrPredFlagL0 = 0    (8-596)
    ctrPredFlagL1 = 0    (8-597)

Referring to Table 8, Table 9, and Table 10, gbiIdx may indicate a bi-prediction weight index, and gbiIdxSbCol may indicate a bi-prediction weight index for a subblock-based temporal merge candidate (eg, a temporal motion vector candidate in a subblock-based merge candidate list). In the procedure (8.4.4.3) for deriving base motion information on subblock-based temporal merge, the gbiIdxSbCol may be derived as gbiIdxcolCb. Alternatively, in the procedure (8.4.4.3) of deriving base motion information on subblock-based temporal merge according to a condition (eg, when availableFlagL0SbCol and availableFlagL1SbCol are both 0), the gbiIdxSbCol may be derived as ctrgbiIdx, and in the procedure (8.4.4.4) for deriving base motion information on subblock-based temporal merge, the ctrgbiIdx may be derived as gbiIdxSbCol. That is, the weight index of the subblock-based temporal motion vector candidate may be derived as a weight index in units of each subblock, or when the subblock is not available, may be derived as the weight index of the temporal center block. For example, the temporal center block may indicate a subblock or sample positioned at the center of the col block or the col block, and specifically, may indicate a subblock positioned at the bottom-right of the four central subblocks or samples of the col block or a sample.

Meanwhile, according to another embodiment of the present disclosure, when constructing a motion vector candidate for a merge mode, weight index information on a pair-wise candidate may be derived. For example, a pair-wise candidate may be included in the merge candidate list, and weight index information on a weighted average of the pair-wise candidate may be derived. The pair-wise candidate may be derived based on other merge candidates in the merge candidate list, and when the pair-wise candidate uses bi-prediction, a weight index for a weighted average may be derived. That is, when the inter-prediction type is bi-prediction, weight index information on pair-wise candidates in the merge candidate list may be derived.

The pair-wise candidate may be derived based on two other merge candidates among candidates included in the merge candidate list. For example, the weight index information about the pair-wise candidate may be derived based on the weight index information on any one of the two merge candidates. Alternatively, for example, the weight index information about the pair-wise candidate may be derived based on the weight index information on a candidate using bi-prediction among the two merge candidates.

Alternatively, the pair-wise candidate may be derived based on a first candidate and a second candidate among candidates included in the merge candidate list. For example, the weight index information about the pair-wise candidate may be derived based on the weight index information on the first candidate. Thus, the weight index information about the pair-wise candidate may be derived as in the following Table 11.

TABLE 11 bcwIdx = bcwIdx0

In the above Table 11, bcwIdx may correspond to the weight index information about the pair-wise candidate, and bcwIdx0 may correspond to the weight index information on the first candidate among candidates included in the merge candidate list.

Alternatively, for example, when the weight index information on the first candidate is the same as that on the second candidate, the weight index information about the pair-wise candidate may be derived based on the weight index information on the first candidate. Meanwhile, when the weight index information on the first candidate is not the same as that on the second candidate, the weight index information about the pair-wise candidate may be derived based on default weight index information. The default weight index information may correspond to weight index information imparting the same weight to each of L0 prediction samples and L1 prediction samples. Thus, the weight index information about the pair-wise candidate may be derived as in the following Table 12.

TABLE 12 if (bcwIdx0 = = bcwIdx1)
    bcwIdx = bcwIdx0
else
    bcwIdx = Default value

In the above Table 12, bcwIdx may correspond to the weight index information about the pair-wise candidate, bcwIdx0 may correspond to the weight index information on the first candidate among candidates included in the merge candidate list, and bcwIdx1 may correspond to the weight index information on the second candidate among candidates included in the merge candidate list. A default value may correspond to the default weight index information.

Alternatively, when the weight index information on the first candidate is the same as that on the second candidate, the weight index information about the pair-wise candidate may be derived based on the weight index information on the first candidate. Meanwhile, when the weight index information on the first candidate is not the same as that on the second candidate, the weight index information about the pair-wise candidate may be derived based on the weight index information which is not the default weight index information, among the weight index information of each of the first and second candidates. The default weight index information may correspond to weight index information imparting the same weight to each of L0 prediction samples and L1 prediction samples.

Meanwhile, according to another embodiment of the present disclosure, when constructing a motion vector candidate for a merge mode in units of subblocks, weight index information on a weighted average of temporal motion vector candidates may be derived. Here, the merge mode in units of subblocks may be referred to as an affine merge mode (in units of subblocks). The temporal motion vector candidate may indicate a subblock-based temporal motion vector candidate, and may be referred to as an SbTMVP (or ATMVP) candidate. The weight index information on the SbTMVP candidate may be derived based on the weight index information on the left neighboring block of the current block. That is, when the candidate derived by SbTMVP uses bi-prediction, the weight index of the left neighboring block of the current block may be derived as the weight index for the subblock-based merge mode.

For example, since the SbTMVP candidate may derive a col block based on the spatially adjacent left block (or left neighboring block) of the current block, the weight index of the left neighboring block may be considered reliable. Accordingly, the weight index for the SbTMVP candidate may be derived as the weight index of the left neighboring block.

Meanwhile, according to another embodiment of the present disclosure, when constructing a motion vector candidate for an affine merge mode, in the case where an affine merge candidate uses bi-prediction, weight index information on a weighted average may be derived. That is, when the inter-prediction type is bi-prediction, weight index information on a candidate in the affine merge candidate list or the subblock merge candidate list may be derived.

For example, among the affine merge candidates, the constructed affine merge candidate may derive a CP0, CP1, CP2 or CP3 candidate, based on motion information on a block (or a spatial neighboring block) which is spatially adjacent to the current block or a block (or a temporal neighboring block) which is temporally adjacent to the current block, thus indicating a candidate for deriving the MVF using an affine model.

Figure 12:
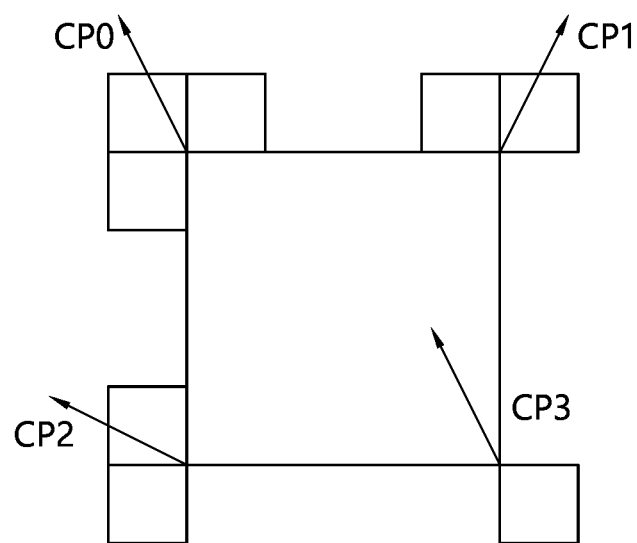
FIG. 12 is a diagram illustrating control points for the constructed affine merge candidate.

FIG. 12 is a diagram illustrating control points for the constructed affine merge candidate.

Referring to FIG. 12, for example, CP0 may indicate a control point located at a top-left sample position of the current block, CP1 may indicate a control point located at a top-right sample position of the current block, and CP2 may indicate a control point located at a bottom-left sample position of the current block. Further, CP3 may indicate a control point located at a bottom-right sample position of the current block.

For example, among the affine merge candidates, the constructed affine merge candidate may be generated by combining motion vectors for each control point of the current block. The constructed affine merge candidate may be generated based on at least two of the control point CP0 located at the top-left sample position of the current block, the control point CP1 located at the top-right sample position of the current block, the control point CP2 located at the bottom-left sample position of the current block, and the control point CP3 located at the bottom-right sample position of the current block.

For example, the constructed affine merge candidate may be generated based on the combination of each control point of the current block, like {CP0, CP1, CP2}, {CP0, CP1, CP3}, {CP0, CP2, CP3}, {CP1, CP2, CP3}, {CP0, CP1} and {CP0, CP2}. For example, the constructed affine merge candidate may include at least one of {CPMV0, CPMV1, CPMV2}, {CPMV0, CPMV1, CPMV3}, {CPMV0, CPMV2, CPMV3}, {CPMV1, CPMV2, CPMV3}, {CPMV0, CPMV1} and {CPMV0, CPMV2}. The CPMV0, CPMV1, CPMV2 and CPMV3 may correspond to motion vectors for CP0, CP1, CP2 and CP3, respectively.

In an embodiment, the weight index information about the constructed affine merge candidate may be derived as in the following Table 13.

TABLE 13 if (bcwIdxCorner0 = = bcwIdxCorner1 &&
 bcwIdxGroup0 = = bcwIdxGroup2)
  bcwIdxConst = bcwIdxCorner0
else if (bcwIdxCorner0 = = bcwIdxCorner2 &&
 bcwIdxGroup0 = = bcwIdxGroup1)
  bcwIdxConst = bcwIdxCorner0
else if (bcwIdxCorner1 = = bcwIdxCorner2 &&
 bcwIdxGroup1 = = bcwIdxGroup0)
  bcwIdxConst = bcwIdxCorner2
else
  bcwIdxConst = Default value In the above Table 13, bcwIdxCornerX (X=0, 1, 2) may indicate the weight index information about each control point of the current block. For example, bcwIdxCorner0 may correspond to weight index information about CP0, bcwIdxCorner1 may correspond to weight index information about CP1, and bcwIdxCorner2 may correspond to weight index information about CP2. Alternatively, as described above, the constructed affine merge candidate may be generated based on the combination of each control point, like {CP0, CP1, CP2}, {CP0, CP1, CP3}, {CP0, CP2, CP3}, {CP1, CP2, CP3}, {CP0, CP1} and {CP0, CP2}. The bcwIdxCorner0 may correspond to the weight index information about the first control point in each combination, the bcwIdxCorner1 may correspond to the weight index information about the second control point in each combination, and the bcwIdxCorner2 may correspond to the weight index information about the third control point in each combination.

Meanwhile, bcwIdxGroupX may be a BCW group index, and be divided into three groups of {0}, {1, 2, 3} and {4}. In other words, the bcwIdxGroupX may be divided into three groups of {(4/4, 5/4)}, {(1/4, 3/4), (2/4, 2/4), (3/4, 1/4)} and {(5/4, −1/4)}.

Referring to Table 13, when three control points are used, six comparison processes may be required.

In this case, as the weight index information about the temporal candidate is set as the default value, the comparison process of the bcwIdxCorner2 may be simplified. Thus, the weight index information about the constructed affine merge candidate may be derived as in the following Table 14.

TABLE 14 if (bcwIdxCorner0 = = bcwIdxCorner1 &&
 bcwIdxGroup0 = = bcwIdxGroup2)
  bcwIdxConst = bcwIdxCorner0
else if (bcwIdxGroup0 = = bcwIdxGroup1)
  bcwIdxConst = bcwIdxCorner0
else if (bcwIdxGroup1 = = bcwIdxGroup0)
  bcwIdxConst = bcwIdxCorner2
else
  bcwIdxConst = Default value Further, in the BCW group index {(1/4, 3/4), (2/4, 2/4), (3/4, 1/4)}, only three pieces of weight index information may be used. Since the pieces of weight index information are mapped to only one group, the BCW group index comparison process may be simplified as shown in the following Table 15.

TABLE 15

```
if (bcwIdxCorner = = bcwIdxCorner1)
    bcwIdxConst = bcwIdxCorner0
else if (bcwIdxCorner0 = = bcwIdxCorner2)
    bcwIdxConst = bcwIdxCorner0
else if (bcwIdxCorner1 = = bcwIdxCorner2)
    bcwIdxConst = bcwIdxCorner2
else
    bcwIdxConst = Default value
```

As described above, it is possible to simplify the process of deriving the weight index information about the constructed affine merge candidate by removing unnecessary conditions. Hereinafter, other embodiments for simplifying the process of deriving the weight index information about the constructed affine merge candidate will be described.

In an embodiment, when the constructed affine merge candidate is generated based on the combination of the control points including CP0, the weight index information about the constructed affine merge candidate may be derived based on the weight index information about CP0. For example, the combination of the control points including CP0 may correspond to any one of {CP0, CP1, CP2}, {CP0, CP1, CP3}, {CP0, CP2, CP3}, {CP0, CP1} and {CP0, CP2}.

In this case, the weight index information about CP0 may correspond to the weight index information of the block used to derive the CPMV (Control Point Motion Vector) for CP0 among the neighboring blocks of CP0. Further, the neighboring blocks of CP0 may include a top-left corner neighboring block of the current block, a left neighboring block adjacent to the bottom side of the top-left corner neighboring block, and a top neighboring block adjacent to the right side of the top-left corner neighboring block.

Meanwhile, when the constructed affine merge candidate is generated based on the combination of the control points except CP0, the weight index information about the constructed affine merge candidate may be derived based on the weight index information about CP1. For example, the combination of the control points except CP0 may correspond to {CP1, CP2, CP3}.

In this case, the weight index information about CP1 may correspond to the weight index information of the block used to derive the CPMV (Control Point Motion Vector) for CP1 among the neighboring blocks of CP1. Further, the neighboring blocks of CP1 may include a top-right corner neighboring block of the current block and a top neighboring block adjacent to the left side of the top-right corner neighboring block.

According to the above-described method, the weight index information about the affine merge candidate may be derived based on the weight index information on the block used to derive the first CPMV for each of {CPMV0, CPMV1, CPMV2}, {CPMV0, CPMV1, CPMV3}, {CPMV0, CPMV2, CPMV3}, {CPMV1, CPMV2, CPMV3}, {CPMV0, CPMV1} and {CPMV0, CPMV2}. Thus, the weight index information about the constructed affine merge candidate may be derived as shown in the following Table 16.

TABLE 16

```
bcwIdxConst = bcwIdxCorner0
```

According to another embodiment for deriving the weight index information about the constructed affine merge candidate, when CPMV for CP0 located at the top-left side of the current block is the same as CPMV for CP1 located at the top-right side of the current block, the weight index information about the constructed affine merge candidate may be derived based on the weight index information about CP0. The weight index information about CP0 may correspond to the weight index information of the block used to derive CPMV for CP0 among the neighboring blocks of CP0. Meanwhile, when CPMV for CP0 located at the top-left side of the current block is not the same as CPMV for CP1 located at the top-right side of the current block, the weight index information about the constructed affine merge candidate may be derived based on the default weight index information. The default weight index information may correspond to the weight index information imparting the same weight to each of the L0 prediction samples and the L1 prediction samples. Thus, the weight index information about the constructed affine merge candidate may be derived as shown in the following Table 17.

TABLE 17

```
if (bcwIdxCorner0 = = bcwIdxCorner1)
    bcwIdxConst = bcwIdxCorner0
else
    bcwIdxConst = Default value
```

According to a further embodiment for deriving the weight index information about the constructed affine merge candidate, the weight index information about the affine merge candidate may be derived as a weight index of a candidate having a high frequency of occurrence among the weight indexes of each candidate. For example, among the weight index of the candidate block determined by the motion vector at CP0 among CP0 candidate blocks, the weight index of the candidate block determined by the motion vector at CP1 among CP1 candidate blocks, the weight index of the candidate block determined by the motion vector at CP2 among CP2 candidate blocks, and/or the weight index of the candidate block determined by the motion vector at CP3 among CP3 candidate blocks, the most overlapping weight index may be derived as the weight index of the constructed affine merge candidate.

For example, CP0 and CP1 may be used as the control point, CP0, CP1 and CP2 may be used as the control point, and CP3 may not be used as the control point. However, for example, in order to utilize the CP3 candidate of the affine block (block coated in the affine prediction mode), the method of deriving the weight index at the temporal candidate block described in the above-described embodiments may be used.

Figure 13:
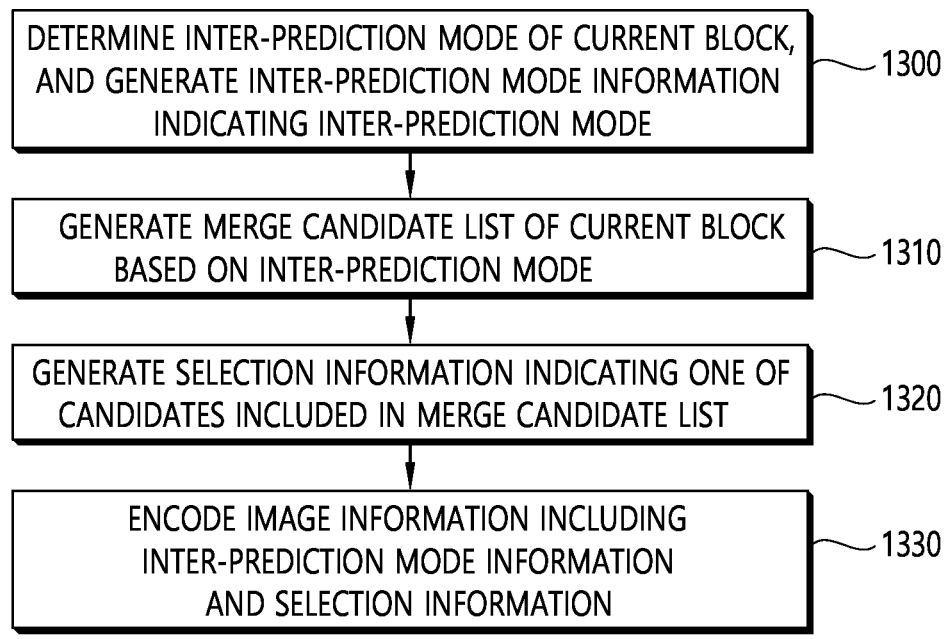
FIGS. 13 and 14 schematically show an example of a video/image encoding method and related components according to embodiment(s) of this document.
Figure 14:
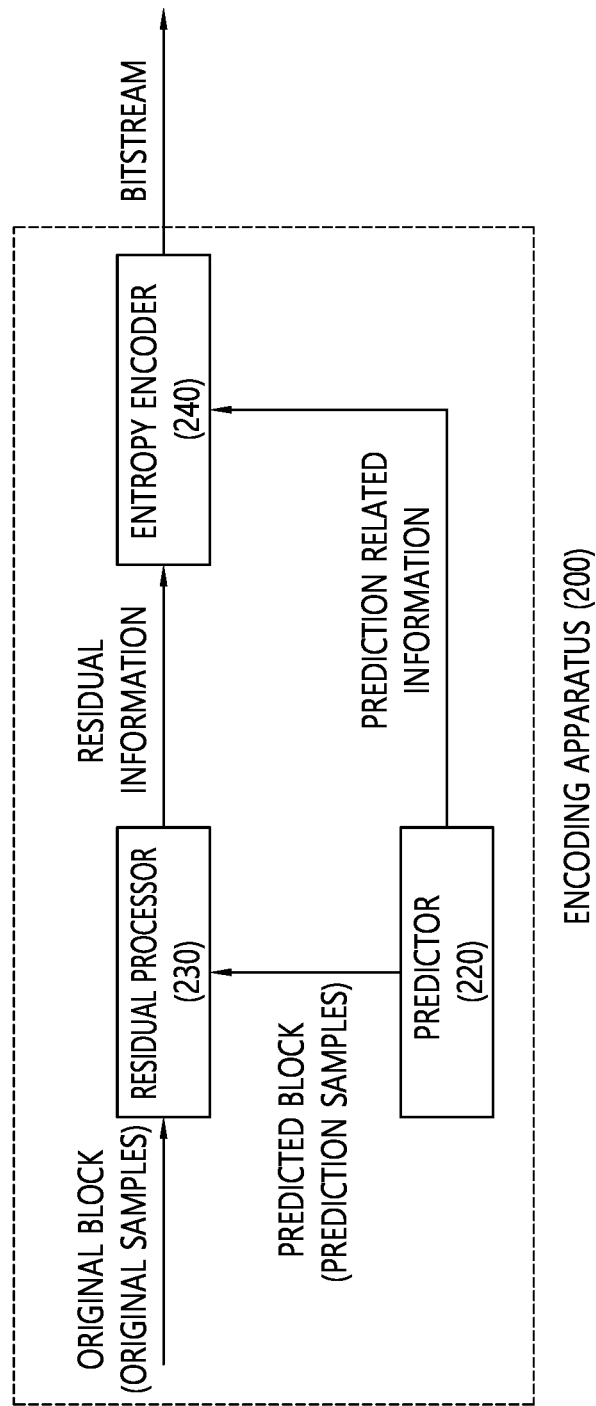

FIGS. 13 and 14 schematically show an example of a video/image encoding method and related components according to embodiment(s) of this document.

The method disclosed in FIG. 13 may be performed by the encoding apparatus disclosed in FIG. 2 or FIG. 14. To be more specific, for example, steps S1300 to S1320 of FIG. 13 may be performed by the predictor 220 of the encoding apparatus 200, and step S1330 of FIG. 13 may be performed by the entropy encoder 240 of the encoding apparatus 200 of FIG. 14. Further, although not shown in FIG. 13, the prediction samples or the prediction related information may be derived by the predictor 220 of the encoding apparatus 200 in FIG. 13, residual information may be derived from original samples or prediction samples by the residual processor 230 of the encoding apparatus 200, and the bitstream may be generated from the residual information or the prediction related information by the entropy encoder 240 of the encoding apparatus 200. The method disclosed in FIG. 13 may include embodiments described in this document.

Referring to FIG. 13, the encoding apparatus may determine the inter-prediction mode of the current block, and may generate the inter-prediction mode information indicating the inter-prediction mode (S1300). For example, the encoding apparatus may determine the merge mode, the affine (merge) mode or the sub-block merge block as the inter-prediction mode which is to be applied to the current block, and may generate the inter-prediction mode information indicating it.

The encoding apparatus may generate the merge candidate list of the current block based on the inter-prediction mode (S1310). For example, the encoding apparatus may generate the merge candidate list according to the determined inter-prediction mode. Here, when the determined inter-prediction mode is the affine merge mode or the sub-block merge mode, the merge candidate list may be referred to as the affine merge candidate list or the sub-block merge candidate list, but may be simply referred to as the merge candidate list.

For example, candidates may be inserted into the merge candidate list until the number of candidates in the merge candidate list becomes the maximum number of candidates. Here, the candidate may indicate a candidate or a candidate block for deriving motion information (or motion vector) of the current block. For example, the candidate block may be derived through a search for neighboring blocks of the current block. For example, a neighboring block may include a spatial neighboring block and/or a temporal neighboring block of the current block, a spatial neighboring block may be preferentially searched to derive a (spatial merge) candidate, and then a temporal neighboring block may be searched to derive a (temporal merge) candidate, and the derived candidates may be inserted into the merge candidate list. For example, when the number of candidates in the merge candidate list is less than the maximum number of candidates in the merge candidate list even after the candidates are inserted, additional candidates may be inserted. For example, additional candidates include at least one of history based merge candidate(s), pair-wise average merge candidate(s), ATMVP, and combined bi-predictive merge candidates (when the slice/tile group type of the current slice/tile group is type B) and/or a zero vector merge candidate.

Alternatively, for example, candidates may be inserted into the affine merge candidate list until the number of candidates in the affine merge candidate list becomes the maximum number of candidates. Here, the candidate may include a control point motion vector (CPMV) of the current block. Alternatively, the candidate may indicate a candidate or a candidate block for deriving the CPMV. The CPMV may indicate a motion vector at a control point (CP) of the current block. For example, the number of CPs may be 2, 3, or 4, the CP may be positioned at at least a part of top-left (or top-left corner), top-right (or top-right corner), bottom-left (or bottom-left corner), or bottom-right (or bottom-right corner) of the current block, and only one CP may exist at each position.

For example, a candidate may be derived through a search for a neighboring block (or a neighboring block of a CP of the current block) of the current block. For example, the affine merge candidate list may include at least one of an inherited affine merge candidate, a constructed affine merge candidate, and a zero motion vector candidate. For example, in the affine merge candidate list, the inherited affine merge candidate may be inserted first, and then the constructed affine merge candidate may be inserted. In addition, even though affine merge candidates constructed in the affine merge candidate list are inserted, when the number of candidates in the affine merge candidate list is smaller than the maximum number of candidates, the remainder may be filled with zero motion vector candidates. Here, the zero motion vector candidate may be referred to as a zero vector. For example, the affine merge candidate list may be a list according to an affine merge mode in which a motion vector is derived in units of samples, or may be a list according to an affine merge mode in which a motion vector is derived in units of subblocks. In this case, the affine merge candidate list may be referred to as a subblock merge candidate list, and the subblock merge candidate list may also include candidates (or SbTMVP candidates) derived from SbTMVP. For example, when the SbTMVP candidate is included in the subblock merge candidate list, it may be positioned before the inherited affine merge candidate and the constructed affine merge candidate in the subblock merge candidate list.

The encoding apparatus may generate selection information indicating one of the candidates included in the merge candidate list (S1320). For example, the merge candidate list may include at least some of the spatial merge candidate, the temporal merge candidate, the pair-wise candidate or the zero vector candidate, and may select one of these candidates for the inter-prediction of the current block. Alternatively, for example, the sub-block merge candidate list may include at least some of the inherited affine merge candidate, the constructed affine merge candidate, the SbTMVP candidate or the zero vector candidate, and may select one of the candidates for the inter-prediction of the current block.

For example, the selection information may include index information indicating a selected candidate in the merge candidate list. For example, the selection information may be referred to as merge index information or sub-block merge index information.

In addition, the encoding apparatus may generate inter prediction type information that indicates an inter prediction type of the current block as bi-prediction. For example, the inter prediction type of the current block may be determined as bi-prediction among L0 prediction, L1 prediction, or bi-prediction, and inter prediction type information indicating the determination may be generated. In this case, the L0 prediction may indicate prediction based on a reference picture list 0, the L1 prediction may indicate prediction based on a reference picture list 1, and the bi-prediction may indicate prediction based on the reference picture list 0 and the reference picture list 1. For example, the encoding apparatus may generate inter prediction type information based on an inter prediction type. For example, the inter prediction type information may include an inter_pred_idc syntax element.

The encoding apparatus may encode image information including the inter-prediction mode information and the selection information (S1330). For example, the image information may be referred to as the video information. The image information may include various pieces of information according to the above-described embodiment(s) of this document. For example, the image information may include at least some of the prediction related information or the residual related information. For example, the prediction related information may include at least some of the inter-prediction mode information, the selection information, and the inter-prediction type information. For example, the encoding apparatus may encode the image information including all or some of the above-described pieces of information (or syntax elements) to generate bitstream or encoded information. Alternatively, it may be output in the form of the bitstream. Further, the bitstream or encoded information may be transmitted to the decoding apparatus through the network or the storage medium.

Although not shown in FIG. 13, for example, the encoding apparatus may generate the prediction samples of the current block. Alternatively, for example, the encoding apparatus may generate the prediction samples of the current block based on the selected candidate. Alternatively, for example, the encoding apparatus may derive the motion information based on the selected candidate, and may generate the prediction samples of the current block based on the motion information. For example, the encoding apparatus may generate the L0 prediction samples and the L1 prediction samples according to the bi-prediction, and may generate the prediction samples of the current block based on the L0 prediction samples and the L1 prediction samples. In this case, the prediction samples of the current block may be generated from the L0 prediction samples and the L1 prediction samples using the weight index information (or the weight information) for the bi-prediction. Here, the weight information may be displayed based on the weight index information.

In other words, for example, the encoding apparatus may generate L0 prediction samples and L1 prediction samples of the current block based on the selected candidate. For example, when the inter-prediction type of the current block is determined to be bi-prediction, the reference picture list 0 and the reference picture list 1 may be used for prediction of the current block. For example, the L0 prediction samples may represent prediction samples of the current block derived based on the reference picture list 0, and the L1 prediction samples may represent prediction samples of the current block derived based on the reference picture list 1.

For example, the candidates may include a spatial merge candidate. For example, when the selected candidate is the spatial merge candidate, L0 motion information and L1 motion information may be derived based on the spatial merge candidate, and the L0 prediction samples and the L1 prediction samples are generated based thereon.

For example, the candidates may include a temporal merge candidate. For example, when the selected candidate is the temporal merge candidate, L0 motion information and L1 motion information may be derived based on the temporal merge candidate, and the L0 prediction samples and the L1 prediction samples are generated based thereon.

For example, the candidates may include a pair-wise candidate. For instance, when the selected candidate is the pair-wise candidate, the L0 motion information and the L1 motion information may be derived based on the pair-wise candidate. Based on the motion information, the L0 prediction samples and the L1 prediction samples may be generated. For example, the pair-wise candidate may be derived based on the first candidate and the second candidate in the merge candidate list.

Alternatively, for example, the merge candidate list may be a subblock merge candidate list, and an affine merge candidate, a subblock merge candidate, or an SbTMVP candidate may be selected. Here, the affine merge candidate in units of subblocks may be referred to as a subblock merge candidate.

For example, the candidates may include a subblock merge candidate. For example, when the selected candidate is the subblock merge candidate, L0 motion information and L1 motion information may be derived based on the subblock merge candidate, and the L0 prediction samples and the L1 prediction samples are generated based thereon. For example, the subblock merge candidate may include control point motion vectors (CPMVs), and the L0 prediction samples and the L1 prediction samples may be generated by performing prediction in units of subblock based on the CPMVs.

Here, the CPMV may be indicated based on one block among neighboring blocks of a control point (CP) of the current block. For example, the number of CPs may be 2, 3, or 4, the CP may be positioned at at least a part of top-left (or top-left corner), top-right (or top-right corner), bottom-left (or bottom-left corner), or bottom-right (or bottom-right corner) of the current block, and only one CP may exist at each position.

For example, the CP may be a CP0 positioned on the top-left side of the current block. In this case, the neighboring blocks may include a top-left corner neighboring block of the current block, a left neighboring block adjacent to the bottom side of the top-left corner neighboring block, and a top neighboring block adjacent to the right side of the top-left corner neighboring block. Or, the neighboring blocks may include a block A2, a block B2, or a block B3 in FIG. 10.

Or, for example, the CP may be a CP1 positioned on the right side of the current block. In this case, the neighboring blocks may include a top-right corner neighboring block of the current block, and a top neighboring block adjacent to the left side of the top-right corner neighboring block of the current block. Or, the neighboring blocks may include a block B0 or a block B1 in FIG. 10.

Or, for example, the CP may be a CP2 positioned on the bottom-left side of the current block. In this case, the neighboring blocks may include a bottom-left corner neighboring block of the current block, and a left neighboring block adjacent to the top side of the bottom-left corner neighboring block. Or, the neighboring blocks may include a block A0 or a block A1 in FIG. 10.

Or, for example, the CP may be a CP3 positioned on the bottom-right side of the current block. In this case, CP3 may also be referred to as an RB. In this case, the neighboring blocks may include a collocated block of the current block or a bottom-right corner neighboring block of the collocated block. In this case, the collocated block may include a block at the same position as the current block in a reference picture that is different from the current picture in which the current block is positioned. Or, the neighboring block may include a block T in FIG. 10.

Alternatively, for example, the candidates may include SbTMVP candidates. For example, when the selected candidate is the SbTMVP candidate, the L0 motion information and the L1 motion information may be derived based on the left neighboring block of the current block, and based on this, the L0 prediction samples and the L1 prediction samples may be generated. For example, the L0 prediction samples and the L1 prediction samples may be generated by performing prediction in units of subblocks.

For example, the L0 motion information may include an L0 reference picture index, an L0 motion vector, and the like, and the L1 motion information may include an L1 reference picture index, an L1 motion vector, and the like. The L0 reference picture index may include information indicating the reference picture in the reference picture list 0, and the L1 reference picture index may include information indicating the reference picture in the reference picture list 1.

For example, the encoding apparatus may generate prediction samples of the current block based on L0 prediction samples, L1 prediction samples, and weight information. For example, the weight information may be displayed based on the weight index information. The weight index information may indicate weight index information on bi-prediction. For example, the weight information may include information on a weighted average of L0 prediction samples or L1 prediction samples. That is, the weight index information may indicate index information on a weight used for the weighted average, and may generate weight index information in a procedure of generating prediction samples based on the weighted average. For example, the weight index information may include information indicating any one of three or five weights. For example, the weighted average may represent a weighted average in bi-prediction with CU-level weight (BCW) or bi-prediction with weighted average (BWA).

For example, the candidates may include a temporal merge candidate, and the weight index information on the temporal merge candidate may be represented by 0. That is, the weight index information on the temporal merge candidate may be represented by 0. Here, the weight index information of 0 may mean that the weights of each reference direction (ie, the L0 prediction direction and the L1 prediction direction in bi-prediction) are the same. Alternatively, for example, the candidates may include a temporal merge candidate, and the weight index information may be indicated based on weight index information on a col block. That is, the weight index information on the temporal merge candidate may be indicated based on the weight index information on the col block. Here, the collocated block may include a block at the same position as the current block in a reference picture different from the current picture in which the current block is positioned.

For example, the candidates may include the pair-wise candidate. The weight index information may be indicated based on the weight index information of the first candidate among the first candidate and the second candidate in the merge candidate list used to derive the pair-wise candidate.

For example, the candidates may include the pair-wise candidate. The pair-wise candidate may be displayed based on the first candidate and the second candidate in the merge candidate list. When the weight index information of the first candidate is the same as that of the second candidate, the weight index information about the pair-wise candidate may be indicated based on the weight index information of the first candidate. When the weight index information of the first candidate is not the same as that of the second candidate, the weight index information about the pair-wise candidate may be indicated based on the default weight index information. In this case, the default weight index information may correspond to the weight index information imparting the same weight to each of the L0 prediction samples and the L1 prediction samples.

For example, the candidates may include the pair-wise candidate. The pair-wise candidate may be displayed based on the first candidate and the second candidate in the merge candidate list. When the weight index information of the first candidate is the same as that of the second candidate, the weight index information about the pair-wise candidate may be indicated based on the weight index information of the first candidate. When the weight index information of the first candidate is not the same as that of the second candidate, the weight index information about the pair-wise candidate may be indicated based on the weight index information which is not the default weight index information, among the weight index information of each of the first and second candidates. The default weight index information may correspond to the weight index information imparting the same weight to each of the L0 prediction samples and the L1 prediction samples.

For example, the merge candidate list may be the sub-block merge candidate list, and the affine merge candidate, the sub-block merge candidate or the SbTMVP candidate may be selected. Here, the affine merge candidate of the sub-block unit may be referred to as the sub-block merge candidate.

For instance, the candidates may include the constructed affine merge candidate. The constructed affine merge candidate may be generated based on at least two of the control point CP0 located at the top-left side of the current block, the control point CP1 located at the top-right side of the current block, the control point CP2 located at the bottom-left side of the current block, and the control point CP3 located at the bottom-right side of the current block.

For example, when the constructed affine merge candidate is generated based on the combination of the control points including the CP0, the weight index information about the constructed affine merge candidate may be indicated based on the weight index information about the CP0. When the constructed affine merge candidate is generated based on the combination of the control points except the CP0, the weight index information about the constructed affine merge candidate may be indicated based on the weight index information about the CP1.

The weight index information about the CP0 may correspond to the weight index information of the block used to derive the CPMV (Control Point Motion Vector) for the CP0 among the neighboring blocks of the CP0, and the neighboring blocks of the CP0 may include the top-left corner neighboring block of the current block, the left neighboring block adjacent to the bottom side of the top-left corner neighboring block, and the top neighboring block adjacent to the right side of the top-left corner neighboring block.

The weight index information about the CP1 may correspond to the weight index information of the block used to derive the CPMV (Control Point Motion Vector) for the CP1 among the neighboring blocks of the CP1, and the neighboring blocks of the CP1 may include the top-right corner neighboring block of the current block and the top neighboring block adjacent to the left side of the top-right corner neighboring block.

Alternatively, for example, the candidates may include an SbTMVP candidate, and weight index information on the SbTMVP candidate may be indicated based on weight index information on a left neighboring block of the current block. That is, the weight index information on the SbTMVP candidate may be indicated based on the weight index information on the left neighboring block.

Alternatively, for example, the candidates may include the SbTMVP candidate, and weight index information on the SbTMVP candidate may be represented by 0. That is, the weight index information on the SbTMVP candidate may be represented by 0. Here, the weight index information of 0 may mean that the weights of each reference direction (ie, the L0 prediction direction and the L1 prediction direction in bi-prediction) are the same.

Alternatively, for example, the candidates may include the SbTMVP candidate. The weight index information may be indicated based on the weight index information of the center block in the col block. In other words, the weight index information for the SbTMVP candidate may be indicated based on the weight index information of the center block in the col block. Here, the col block may include a block which is located in a reference picture different from a current picture at which the current block is located and is derived based on the motion vector of the left neighboring block of the current block. Further, the center block may include the bottom-right sub-block among four sub-blocks located at the center of the col block.

Alternatively, for example, the candidates may include the SbTMVP candidate, and the weight index information may be indicated based on the weight index information of each of the sub-blocks of the col block. That is, the weight index information for the SbTMVP candidate may be indicated based on the weight index information of each of the sub-blocks of the col block.

Although not shown in FIG. 13, for example, the encoding apparatus may derive the residual samples based on the prediction samples and the original samples. In this case, the residual related information may be derived based on the residual samples. The residual samples may be derived based on the residual related information. The reconstruction samples may be generated based on the residual samples and the prediction samples. The reconstruction block and the reconstruction picture may be derived based on the reconstruction samples. Alternatively, for example, the encoding apparatus may encode the image information including the residual related information or the prediction related information.

For example, the encoding apparatus may encode the image information including all or some of the above-described pieces of information (or syntax elements) to generate bitstream or encoded information. Alternatively, it may be output in the form of the bitstream. Further, the bitstream or encoded information may be transmitted to the decoding apparatus through the network or the storage medium. Alternatively, the bitstream or encoded information may be stored in the computer-readable storage medium, and the bitstream or encoded information may be generated by the above-described image encoding method.

Figure 15:
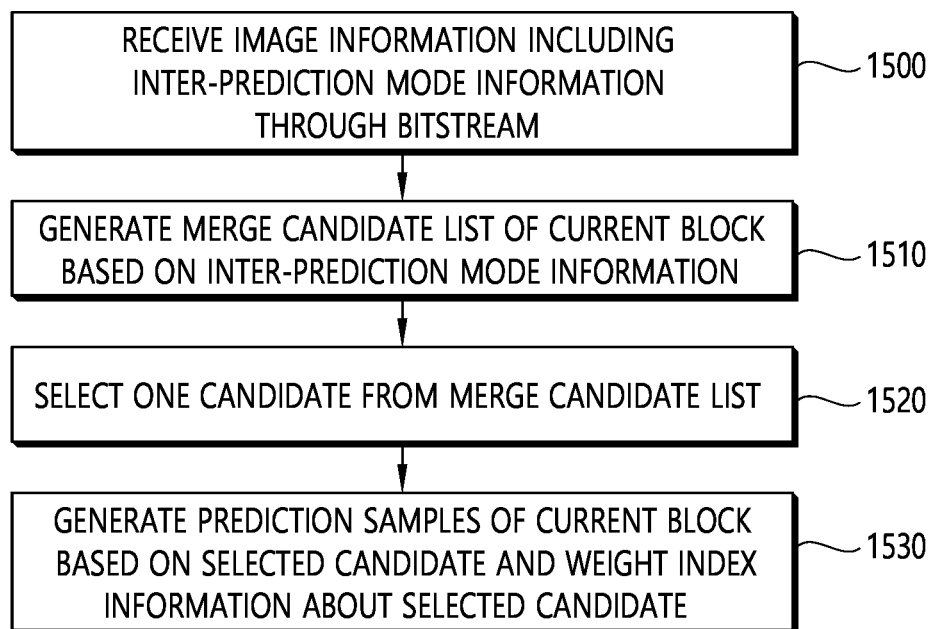
FIGS. 15 and 16 schematically show an example of an image/video decoding method and related components according to embodiment(s) of this document.
Figure 16:
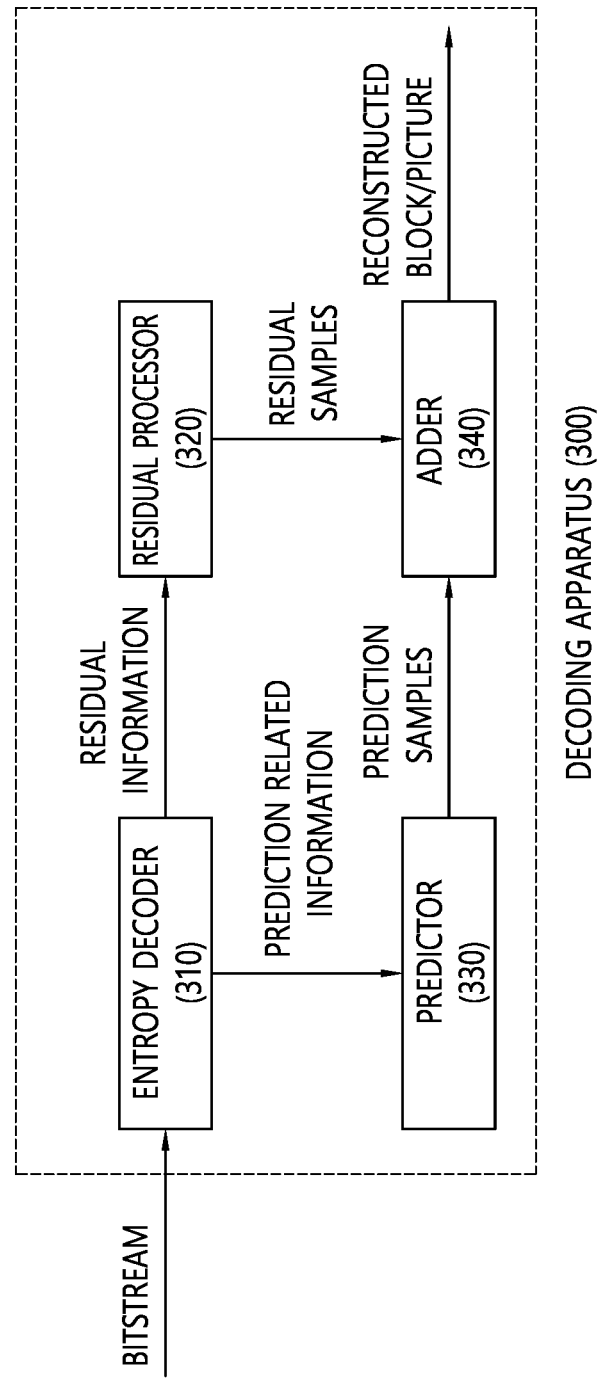

FIGS. 15 and 16 schematically show an example of a video/image decoding method and related components according to embodiment(s) of this document.

The method disclosed in FIG. 15 may be performed by the decoding apparatus disclosed in FIG. 3 or FIG. 16. To be more specific, for example, step S1500 of FIG. 15 may be performed by the entropy decoder 310 of the decoding apparatus 300 in FIG. 16, and steps S1510 to S1530 of FIG. 15 may be performed by the predictor 330 of the decoding apparatus 300 in FIG. 16. Further, although not shown in FIG. 15, the prediction related information or the residual information may be derived from the bitstream by the entropy decoder 310 of the decoding apparatus 300 in FIG. 16, the residual samples may be derived from the residual information by the residual processor 320 of the decoding apparatus 300, the prediction samples may be derived from the prediction related information by the predictor 330 of the decoding apparatus 300, and the reconstruction block or the reconstruction picture may be derived from the residual samples or the prediction samples by the adder 340 of the decoding apparatus 300. The method disclosed in FIG. 15 may embrace the embodiments described in this document.

Referring to FIG. 15, the decoding apparatus may receive the image information including the inter-prediction mode information through the bitstream (S1500). For example, the image information may be referred to as the video information. The image information may include various pieces of information according to the above-described embodiment(s) of this document. For example, the image information may include at least some of the prediction related information or the residual related information.

For example, the prediction related information may include the inter-prediction mode information or the inter-prediction type information. For example, the inter-prediction mode information may include information indicating at least some of various inter-prediction modes. For example, various modes, such as the merge mode, the skip mode, the MVP (motion vector prediction) mode, the affine mode, the sub-block merge mode or the MMVD (merge with MVD) mode, may be used. Further, the DMVR (Decoder side motion vector refinement) mode, the AMVR (adaptive motion vector resolution) mode, the BCW (Bi-prediction with CU-level weight) or BDOF (Bi-directional optical flow) may be additionally or alternatively used as a collateral mode. For example, the inter-prediction type information may include the inter_pred_idc syntax element. Further, the inter-prediction type information may include any one of L0 prediction, L1 prediction or bi-prediction.

The decoding apparatus may generate the merge candidate list of the current block based on the inter-prediction mode information (S1510). For example, the decoding apparatus may determine the inter-prediction mode of the current block as the merge mode, the affine (merge) mode or the sub-block merge mode based on the inter-prediction mode information, and may generate the merge candidate list according to the determined inter-prediction mode. Here, when the inter-prediction mode is determined as the affine merge mode or the sub-block merge mode, the merge candidate list may be referred as the affine merge candidate list or the sub-block merge candidate list, but may be simply referred to as the merge candidate list.

For example, candidates may be inserted into the merge candidate list until the number of candidates in the merge candidate list becomes the maximum number of candidates. Here, the candidate may indicate a candidate or a candidate block for deriving motion information (or motion vector) of the current block. For example, the candidate block may be derived through a search for neighboring blocks of the current block. For example, a neighboring block may include a spatial neighboring block and/or a temporal neighboring block of the current block, a spatial neighboring block may be preferentially searched to derive a (spatial merge) candidate, and then a temporal neighboring block may be searched to derive a (temporal merge) candidate, and the derived candidates may be inserted into the merge candidate list. For example, when the number of candidates in the merge candidate list is less than the maximum number of candidates in the merge candidate list even after the candidates are inserted, additional candidates may be inserted. For example, additional candidates include at least one of history based merge candidate(s), pair-wise average merge candidate(s), ATMVP, and combined bi-predictive merge candidates (when the slice/tile group type of the current slice/tile group is type B) and/or a zero vector merge candidate.

Alternatively, for example, candidates may be inserted into the affine merge candidate list until the number of candidates in the affine merge candidate list becomes the maximum number of candidates. Here, the candidate may include a control point motion vector (CPMV) of the current block. Alternatively, the candidate may indicate a candidate or a candidate block for deriving the CPMV. The CPMV may indicate a motion vector at a control point (CP) of the current block. For example, the number of CPs may be 2, 3, or 4, the CP may be positioned at at least a part of top-left (or top-left corner), top-right (or top-right corner), bottom-left (or bottom-left corner), or bottom-right (or bottom-right corner) of the current block, and only one CP may exist at each position.

For example, a candidate block may be derived through a search for a neighboring block (or a neighboring block of a CP of the current block) of the current block. For example, the affine merge candidate list may include at least one of an inherited affine merge candidate, a constructed affine merge candidate, and a zero motion vector candidate. For example, in the affine merge candidate list, the inherited affine merge candidate may be inserted first, and then the constructed affine merge candidate may be inserted. In addition, even though affine merge candidates constructed in the affine merge candidate list are inserted, when the number of candidates in the affine merge candidate list is smaller than the maximum number of candidates, the remainder may be filled with zero motion vector candidates. Here, the zero motion vector candidate may be referred to as a zero vector. For example, the affine merge candidate list may be a list according to an affine merge mode in which a motion vector is derived in units of samples, or may be a list according to an affine merge mode in which a motion vector is derived in units of subblocks. In this case, the affine merge candidate list may be referred to as a subblock merge candidate list, and the subblock merge candidate list may also include candidates (or SbTMVP candidates) derived from SbTMVP. For example, when the SbTMVP candidate is included in the subblock merge candidate list, it may be positioned before the inherited affine merge candidate and the constructed affine merge candidate in the subblock merge candidate list.

The decoding apparatus may select one of the candidates included in the merge candidate list (S1520). For example, the merge candidate list may include at least some of the spatial merge candidate, the temporal merge candidate, the pair-wise candidate or the zero vector candidate, and may select one of these candidates for the inter-prediction of the current block. Alternatively, for example, the sub-block merge candidate list may include at least some of the inherited affine merge candidate, the constructed affine merge candidate, the SbTMVP candidate or the zero vector candidate, and may select one of these candidates for the inter-prediction of the current block. For example, the selected candidate may be selected from the merge candidate list based on the selection information. For example, the selection information may include the index information indicating the selected candidate in the merge candidate list. For instance, the selection information may be referred to as the merge index information or the sub-block merge index information. For example, the selection information may be included in the image information. Further, the selection information may be included in the inter-prediction mode information.

The decoding apparatus may generate the prediction samples of the current block based on the selected candidate and the weight index information about the selected candidate (S1530). For example, when the inter-prediction type is derived as the bi-prediction, the decoding apparatus may derive the L0 motion information and the L1 motion information based on the selected candidate. The decoding apparatus may derive the inter-prediction type of the current block as the bi-prediction based on the inter-prediction type information. For example, the inter-prediction type of the current block may be derived as the bi-prediction among the L0 prediction, the L1 prediction or the bi-prediction based on the inter-prediction type information. Here, the L0 prediction may denote prediction based on the reference picture list 0, the L1 prediction may denote prediction based on the reference picture list 1, and the bi-prediction may denote the prediction based on the reference picture list 0 and the prediction based on the reference picture list 1. For example, the inter-prediction type information may include the inter_pred_idc syntax element.

For example, the L0 motion information may include an L0 reference picture index and an L0 motion vector, and the L1 motion information may include an L1 reference picture index and an L1 motion vector. The L0 reference picture index may include information indicating the reference picture in the reference picture list 0, and the L1 reference picture index may include information indicating the reference picture in the reference picture list 1.

For example, the candidates may include a spatial merge candidate. For example, when the selected candidate is the spatial merge candidate, L0 motion information and L1 motion information may be derived based on the spatial merge candidate, and the L0 prediction samples and the L1 prediction samples are generated based thereon.

For example, the candidates may include a temporal merge candidate. For example, when the selected candidate is the temporal merge candidate, L0 motion information and L1 motion information may be derived based on the temporal merge candidate, and the L0 prediction samples and the L1 prediction samples are generated based thereon.

For example, the candidates may include the pair-wise candidate. For example, when the selected candidate is the pair-wise candidate, the L0 motion information and the L1 motion information may be derived based on the pair-wise candidate. Based on this, the L0 prediction samples and the L1 prediction samples may be generated. For example, the pair-wise candidate may be derived based on the first candidate and the second candidate in the merge candidate list.

Alternatively, for example, the merge candidate list may be a subblock merge candidate list, and an affine merge candidate, a subblock merge candidate, or an SbTMVP candidate may be selected. Here, the affine merge candidate in units of subblocks may be referred to as a subblock merge candidate.

For example, the candidates may include an affine merge candidate. For example, when the selected candidate is the affine merge candidate, L0 motion information and L1 motion information may be derived based on the affine merge candidate, and the L0 prediction samples and the L1 prediction samples are generated based thereon. For example, the affine merge candidate may include control point motion vectors (CPMVs), and the L0 prediction samples and the L1 prediction samples may be generated by performing prediction in units of subblock based on the CPMVs.

Here, the CPMV may be derived based on one block among neighboring blocks of a control point (CP) of the current block. For example, the number of CPs may be 2, 3, or 4, the CP may be positioned at at least a part of top-left (or top-left corner), top-right (or top-right corner), bottom-left (or bottom-left corner), or bottom-right (or bottom-right corner) of the current block, and only one CP may exist at each position.

For example, the CP may be a CP0 positioned on the top-left side of the current block. In this case, the neighboring blocks may include a top-left corner neighboring block of the current block, a left neighboring block adjacent to the bottom side of the top-left corner neighboring block, and a top neighboring block adjacent to the right side of the top-left corner neighboring block. Or, the neighboring blocks may include a block A2, a block B2, or a block B3 in FIG. 10.

Or, for example, the CP may be a CP1 positioned on the right side of the current block. In this case, the neighboring blocks may include a top-right corner neighboring block of the current block, and a top neighboring block adjacent to the left side of the top-right corner neighboring block of the current block. Or, the neighboring blocks may include a block B0 or a block B1 in FIG. 10.

Or, for example, the CP may be a CP2 positioned on the bottom-left side of the current block. In this case, the neighboring blocks may include a bottom-left corner neighboring block of the current block, and a left neighboring block adjacent to the top side of the bottom-left corner neighboring block. Or, the neighboring blocks may include a block A0 or a block A1 in FIG. 10.

Or, for example, the CP may be a CP3 positioned on the bottom-right side of the current block. In this case, CP3 may also be referred to as RB. In this case, the neighboring blocks may include a collocated block of the current block or a bottom-right corner neighboring block of the collocated block. In this case, the collocated block may include a block at the same position as the current block in a reference picture that is different from the current picture in which the current block is positioned. Or, the neighboring block may include a block T in FIG. 10.

Or, for example, the candidates may include an SbTMVP candidate. For example, when the selected candidate is the SbTMVP candidate, L0 motion information and L1 motion information may be derived based on the left neighboring block of the current block, and the L0 prediction samples and the L1 prediction samples may be generated based on the L0 motion information and the L1 motion information. For example, the L0 prediction samples and the L1 prediction samples may be generated by performing prediction in a sub-block unit.

The decoding apparatus may generate the prediction samples of the current block based on the selected candidate and the weight index information about the selected candidate (S1530). For example, the weight information about the selected candidate may include information for a weighted average of the L0 prediction samples or the L1 prediction samples. In other words, the weight index information may indicate the index information about a weighted value used in the weighted average, and the weighted average may be performed based on the weight index information. For example, the weight index information may include information indicating the weighted value of any one of three or five weighted values. For instance, the weighted average may indicate the weighted average at the BCW (Bi-prediction with CU-level Weight) or BWA (Bi-prediction with Weighted Average).

For example, the candidates may include a temporal merge candidate, and the weight index information on the temporal merge candidate may be derived as 0. That is, the weight index information on the temporal merge candidate may be derived as 0. Here, the weight index information of 0 may mean that the weights of each reference direction (ie, the L0 prediction direction and the L1 prediction direction in bi-prediction) are the same.

For example, the candidates may include a temporal merge candidate, and the weight index information on the temporal merge candidate may be derived based on weight index information on a col block. That is, the weight index information on the temporal merge candidate may be derived based on the weight index information on the col block. Here, the collocated block may include a block at the same position as the current block in a reference picture different from the current picture in which the current block is positioned.

For example, the candidates may include the pair-wise candidate. The weight index information may be derived based on the weight index information of the first candidate among the first candidate and the second candidate in the merge candidate list used to derive the pair-wise candidate.

For example, the candidates may include the pair-wise candidate. The pair-wise candidate may be derived based on the first candidate and the second candidate in the merge candidate list. When the weight index information of the first candidate is the same as that of the second candidate, the weight index information about the pair-wise candidate may be derived based on the weight index information of the first candidate. When the weight index information of the first candidate is not the same as that of the second candidate, the weight index information about the pair-wise candidate may be derived based on the default weight index information. In this case, the default weight index information may correspond to the weight index information imparting the same weight to each of the L0 prediction samples and the L1 prediction samples.

For example, the candidates may include the pair-wise candidate. The pair-wise candidate may be derived based on the first candidate and the second candidate in the merge candidate list. When the weight index information of the first candidate is the same as that of the second candidate, the weight index information about the pair-wise candidate may be derived based on the weight index information of the first candidate. When the weight index information of the first candidate is not the same as that of the second candidate, the weight index information about the pair-wise candidate may be derived based on the weight index information which is not the default weight index information, among the weight index information of each of the first and second candidates. The default weight index information may correspond to the weight index information imparting the same weight to each of the L0 prediction samples and the L1 prediction samples.

For example, the merge candidate list may be the sub-block merge candidate list, and the affine merge candidate, the sub-block merge candidate or the SbTMVP candidate may be selected. Here, the affine merge candidate of the sub-block unit may be referred to as the sub-block merge candidate.

For instance, the candidates may include the constructed affine merge candidate. The constructed affine merge candidate may be generated based on at least two of the control point CP0 located at the top-left side of the current block, the control point CP1 located at the top-right side of the current block, the control point CP2 located at the bottom-left side of the current block, and the control point CP3 located at the bottom-right side of the current block.

For example, when the constructed affine merge candidate is generated based on the combination of the control points including the CP0, the weight index information about the constructed affine merge candidate may be derived based on the weight index information about the CP0. Meanwhile, when the constructed affine merge candidate is generated based on the combination of the control points except the CP0, the weight index information about the constructed affine merge candidate may be derived based on the weight index information about the CP1.

The weight index information about the CP0 may correspond to the weight index information of the block used to derive the CPMV (Control Point Motion Vector) for the CP0 among the neighboring blocks of the CP0, and the neighboring blocks of the CP0 may include the top-left corner neighboring block of the current block, the left neighboring block adjacent to the bottom side of the top-left corner neighboring block, and the top neighboring block adjacent to the right side of the top-left corner neighboring block.

The weight index information about the CP1 may correspond to the weight index information of the block used to derive the CPMV (Control Point Motion Vector) for the CP1 among the neighboring blocks of the CP1, and the neighboring blocks of the CP1 may include the top-right corner neighboring block of the current block and the top neighboring block adjacent to the left side of the top-right corner neighboring block.

Alternatively, for example, the candidates may include an SbTMVP candidate, and weight index information on the SbTMVP candidate may be derived based on weight index information on a left neighboring block of the current block. That is, the weight index information on the SbTMVP candidate may be derived based on weight index information on the left neighboring block.

Or, for example, the candidates may include an SbTMVP candidate, and weight index information on the SbTMVP candidate may be derived as 0. That is, the weight index information on the SbTMVP candidate may be derived as 0. Here, the weight index information equal to 0 may indicate that weights of respective reference directions (i.e., the L0 prediction direction and the L1 prediction direction in bi-prediction) are the same.

Alternatively, for example, the candidates may include the SbTMVP candidate. The weight index information may be derived based on the weight index information of the center block in the col block. In other words, the weight index information for the SbTMVP candidate may be derived based on the weight index information of the center block in the col block. Here, the col block may include a block which is located in a reference picture different from a current picture at which the current block is located and is derived based on the motion vector of the left neighboring block of the current block. Further, the center block may include the bottom-right sub-block among four sub-blocks located at the center of the col block.

Alternatively, for example, the candidates may include the SbTMVP candidate, and the weight index information may be derived based on the weight index information of each of the sub-blocks of the col block. That is, the weight index information for the SbTMVP candidate may be derived based on the weight index information of each of the sub-blocks of the col block.

Although not shown in FIG. 15, for example, the decoding apparatus may derive the residual samples based on the residual related information included in the image information. Further, the decoding apparatus may generate the reconstruction samples based on the prediction samples and the residual samples. The reconstruction block and the reconstruction picture may be derived based on the reconstruction samples.

For example, the decoding apparatus may obtain image information including all or parts of the above-described pieces of information (or syntax elements) by decoding the bitstream or the encoded information. Further, the bitstream or the encoded information may be stored in a computer readable storage medium, and may cause the above-described decoding method to be performed.

Although methods have been described on the basis of a flowchart in which steps or blocks are listed in sequence in the above-described embodiments, the steps of the present document are not limited to a certain order, and a certain step may be performed in a different step or in a different order or concurrently with respect to that described above. Further, it will be understood by those ordinary skilled in the art that the steps of the flowcharts are not exclusive, and another step may be included therein or one or more steps in the flowchart may be deleted without exerting an influence on the scope of the present disclosure.

The aforementioned method according to the present disclosure may be in the form of software, and the encoding apparatus and/or decoding apparatus according to the present disclosure may be included in a device for performing image processing, for example, a TV, a computer, a smart phone, a set-top box, a display device, or the like.

When the embodiments of the present disclosure are implemented by software, the aforementioned method may be implemented by a module (process or function) which performs the aforementioned function. The module may be stored in a memory and executed by a processor. The memory may be installed inside or outside the processor and may be connected to the processor via various well-known means. The processor may include Application-Specific Integrated Circuit (ASIC), other chipsets, a logical circuit, and/or a data processing device. The memory may include a Read-Only Memory (ROM), a Random Access Memory (RAM), a flash memory, a memory card, a storage medium, and/or other storage device. In other words, the embodiments according to the present disclosure may be implemented and executed on a processor, a micro-processor, a controller, or a chip. For example, functional units illustrated in the respective figures may be implemented and executed on a computer, a processor, a microprocessor, a controller, or a chip. In this case, information on implementation (for example, information on instructions) or algorithms may be stored in a digital storage medium.

In addition, the decoding apparatus and the encoding apparatus to which the embodiment(s) of the present document is applied may be included in a multimedia broadcasting transceiver, a mobile communication terminal, a home cinema video device, a digital cinema video device, a surveillance camera, a video chat device, and a real time communication device such as video communication, a mobile streaming device, a storage medium, a camcorder, a video on demand (VoD) service provider, an Over The Top (OTT) video device, an internet streaming service provider, a 3D video device, a Virtual Reality (VR) device, an Augment Reality (AR) device, an image telephone video device, a vehicle terminal (for example, a vehicle (including an autonomous vehicle) terminal, an airplane terminal, or a ship terminal), and a medical video device; and may be used to process an image signal or data. For example, the OTT video device may include a game console, a Bluray player, an Internet-connected TV, a home theater system, a smartphone, a tablet PC, and a Digital Video Recorder (DVR).

In addition, the processing method to which the embodiment(s) of the present document is applied may be produced in the form of a program executed by a computer and may be stored in a computer-readable recording medium. Multimedia data having a data structure according to the embodiment(s) of the present document may also be stored in the computer-readable recording medium. The computer readable recording medium includes all kinds of storage devices and distributed storage devices in which computer readable data is stored. The computer-readable recording medium may include, for example, a Bluray disc (BD), a universal serial bus (USB), a ROM, a PROM, an EPROM, an EEPROM, a RAM, a CD-ROM, a magnetic tape, a floppy disk, and an optical data storage device. The computer-readable recording medium also includes media embodied in the form of a carrier wave (for example, transmission over the Internet). In addition, a bitstream generated by the encoding method may be stored in the computer-readable recording medium or transmitted through a wired or wireless communication network.

In addition, the embodiment(s) of the present document may be embodied as a computer program product based on a program code, and the program code may be executed on a computer according to the embodiment(s) of the present document. The program code may be stored on a computer-readable carrier.

Figure 17:
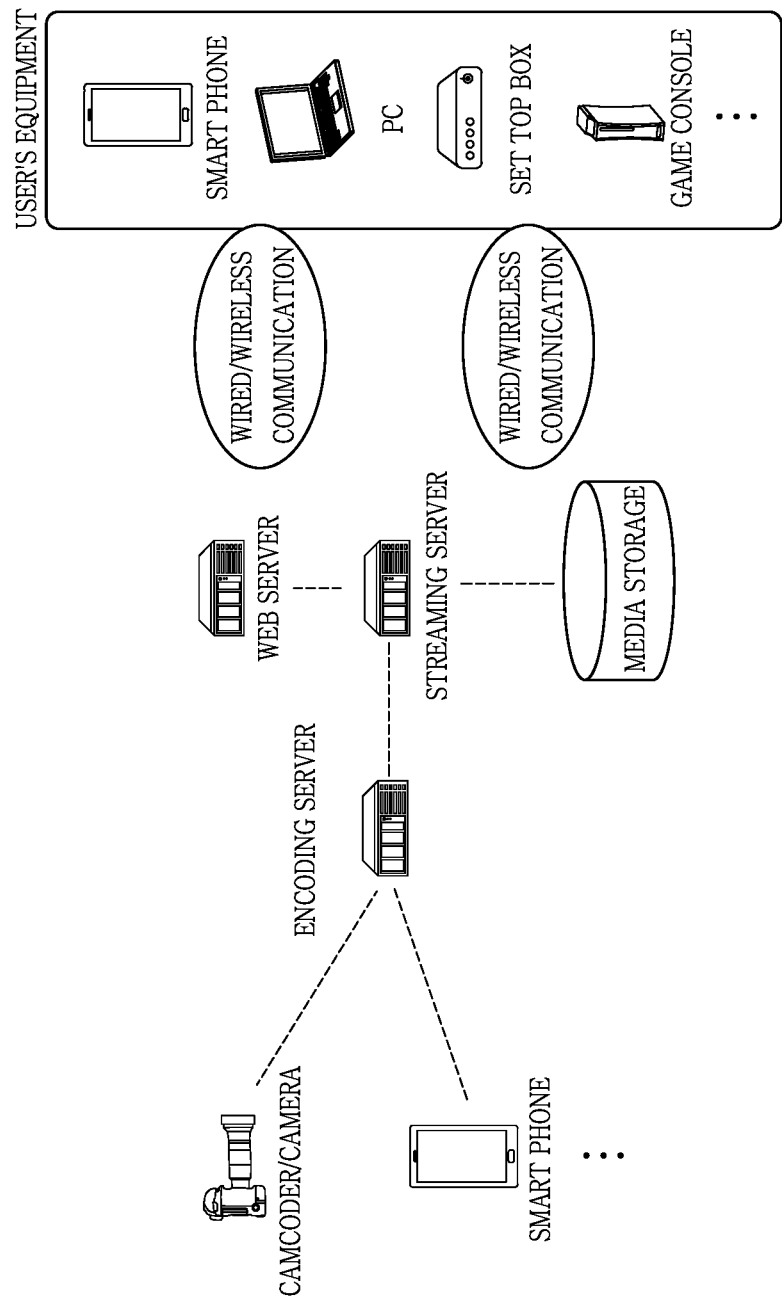
FIG. 17 represents an example of a contents streaming system to which embodiments disclosed in this document may be applied.

FIG. 17 represents an example of a contents streaming system to which the embodiment of the present document may be applied.

Referring to FIG. 17, the content streaming system to which the embodiments of the present document is applied may generally include an encoding server, a streaming server, a web server, a media storage, a user device, and a multimedia input device.

The encoding server functions to compress to digital data the contents input from the multimedia input devices, such as the smart phone, the camera, the camcorder and the like, to generate a bitstream, and to transmit it to the streaming server. As another example, in a case where the multimedia input device, such as, the smart phone, the camera, the camcorder or the like, directly generates a bitstream, the encoding server may be omitted.

The bitstream may be generated by an encoding method or a bitstream generation method to which the embodiments of the present document is applied. And the streaming server may temporarily store the bitstream in a process of transmitting or receiving the bitstream.

The streaming server transmits multimedia data to the user equipment on the basis of a user's request through the web server, which functions as an instrument that informs a user of what service there is. When the user requests a service which the user wants, the web server transfers the request to the streaming server, and the streaming server transmits multimedia data to the user. In this regard, the contents streaming system may include a separate control server, and in this case, the control server functions to control commands/responses between respective equipment in the content streaming system.

The streaming server may receive contents from the media storage and/or the encoding server. For example, in a case the contents are received from the encoding server, the contents may be received in real time. In this case, the streaming server may store the bitstream for a predetermined period of time to provide the streaming service smoothly.

For example, the user equipment may include a mobile phone, a smart phone, a laptop computer, a digital broadcasting terminal, a personal digital assistant (PDA), a portable multimedia player (PMP), a navigation, a slate PC, a tablet PC, an ultrabook, a wearable device (e.g., a watch-type terminal (smart watch), a glass-type terminal (smart glass), a head mounted display (HMD)), a digital TV, a desktop computer, a digital signage or the like.

Each of servers in the contents streaming system may be operated as a distributed server, and in this case, data received by each server may be processed in distributed manner.

Claims in the present description can be combined in a various way. For example, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A decoding apparatus for image decoding, the decoding apparatus comprising:
   a memory; and
   at least one processor connected to the memory, the at least one processor configured to:
   acquire image information including inter-prediction mode information through a bitstream;
   generate a subblock merge candidate list of a current block based on the inter-prediction mode information;
   select one candidate among candidates included in the subblock merge candidate list; and
   generate prediction samples of the current block based on motion information for the selected candidate and a weight index for the selected candidate,
   wherein the subblock merge candidate list comprises a constructed affine merge candidate and a subblock-based temporal merge candidate,
   wherein the constructed affine merge candidate is generated based on at least two of a control point CP0 related to a top-left corner of the current block, a control point CP1 related to a top-right corner of the current block, a control point CP2 related to a bottom-left corner of the current block, and a control point CP3 related to a bottom-right corner of the current block,
   wherein based on a case that the constructed affine merge candidate is generated based on {CP0, CP2, CP3}, a weight index for the constructed affine merge candidate is equal to a weight index for the CP0,
   wherein based on a case that the constructed affine merge candidate is generated based on {CP1, CP2, CP3}, the weight index for the constructed affine merge candidate is equal to a weight index for the CP1,
   wherein a value of a weight index for the subblock-based temporal merge candidate is derived as zero (0), and
   wherein the constructed affine merge candidate is inserted after the subblock-based temporal merge candidate in the subblock merge candidate list.

2. The decoding apparatus of claim 1, wherein the weight index for the CP0 is equal to a weight index of a block used to derive a CPMV (Control Point Motion Vector) for the CP0 among neighboring blocks of the CP0, and
   wherein the neighboring blocks of the CP0 comprise a top-left corner neighboring block of the current block, a left neighboring block adjacent to a bottom side of the top-left corner neighboring block, and a top neighboring block adjacent to a right side of the top-left corner neighboring block.

3. The decoding apparatus of claim 1, wherein the weight index for the CP1 is equal to a weight index of a block used to derive a CPMV (Control Point Motion Vector) for the CP1 among neighboring blocks of the CP1, and
   wherein the neighboring blocks of the CP1 comprise a top-right corner neighboring block of the current block, and a top neighboring block adjacent to a left side of the top-right corner neighboring block.

4. The decoding apparatus of claim 1, wherein based on a case that the constructed affine merge candidate is generated based on {CP0, CP2, CP3}, the weight index for the constructed affine merge candidate is set equal to the weight index for the CP0 regardless of a weight index for the CP2 and a weight index for the CP3.

5. The decoding apparatus of claim 1, wherein based on a case that the constructed affine merge candidate is generated based on {CP1, CP2, CP3}, the weight index for the constructed affine merge candidate is set equal to the weight index for the CP0 without comparing the weight index for the CP0 to a weight index for the CP2 or a weight index for the CP3.

6. An encoding apparatus for image encoding, the encoding apparatus comprising:
   a memory; and
   at least one processor connected to the memory, the at least one processor configured to:
   determine an inter-prediction mode of a current block and generate inter-prediction mode information indicating the inter-prediction mode;
   generate a subblock merge candidate list of the current block based on the inter-prediction mode;
   generate selection information which indicates one candidate among candidates included in the subblock merge candidate list; and
   encode image information which includes the inter-prediction mode information and the selection information,
   wherein the subblock merge candidate list comprises a constructed affine merge candidate and a subblock-based temporal merge candidate,
   wherein the constructed affine merge candidate is generated based on at least two of a control point CP0 related to a top-left corner of the current block, a control point CP1 related to a top-right corner of the current block, a control point CP2 related to a bottom-left corner of the current block, and a control point CP3 related to a bottom-right corner of the current block,
   wherein based on a case that the constructed affine merge candidate is generated based on {CP0, CP2, CP3}, a weight index for the constructed affine merge candidate is equal to a weight index for the CP0,
   wherein based on a case that the constructed affine merge candidate is generated based on {CP1, CP2, CP3}, the weight index for the constructed affine merge candidate is equal to a weight index for the CP1,
   wherein a value of a weight index for the subblock-based temporal merge candidate is derived as zero (0), and
   wherein the constructed affine merge candidate is inserted after the subblock-based temporal merge candidate in the subblock merge candidate list.

7. The encoding apparatus of claim 6, wherein the weight index for the CP0 is equal to a weight index of a block used to derive a CPMV (Control Point Motion Vector) for the CP0 among neighboring blocks of the CP0, and
   wherein the neighboring blocks of the CP0 comprise a top-left corner neighboring block of the current block, a left neighboring block adjacent to a bottom side of the top-left corner neighboring block, and a top neighboring block adjacent to a right side of the top-left corner neighboring block.

8. The encoding apparatus of claim 6, wherein the weight index for the CP1 is equal to a weight index of a block used to derive a CPMV (Control Point Motion Vector) for the CP1 among neighboring blocks of the CP1, and
   wherein the neighboring blocks of the CP1 comprise a top-right corner neighboring block of the current block, and a top neighboring block adjacent to a left side of the top-right corner neighboring block.

9. The encoding apparatus of claim 6, wherein based on a case that the constructed affine merge candidate is generated based on {CP0, CP2, CP3}, the weight index for the constructed affine merge candidate is set equal to the weight index for the CP0 regardless of a weight index for the CP2 and a weight index for the CP3.

10. The encoding apparatus of claim 6, wherein based on a case that the constructed affine merge candidate is generated based on {CP1, CP2, CP3}, the weight index for the constructed affine merge candidate is set equal to the weight index for the CP0 without comparing the weight index for the CP0 to a weight index for the CP2 or a weight index for the CP3.

11. A non-transitory computer-readable storage medium storing a bitstream of the encoded image information generated by the encoding apparatus of claim 6.

12. An apparatus for transmitting data for an image, the apparatus comprising:
    at least one processor configured to obtain a bitstream for the image, wherein the bitstream is generated based on determining an inter-prediction mode of a current block and generating inter-prediction mode information indicating the inter-prediction mode, generating a subblock merge candidate list of the current block based on the inter-prediction mode, generating selection information which indicates one candidate among candidates included in the subblock merge candidate list, and encoding image information to generate the bitstream, wherein the image information includes the inter-prediction mode information and the selection information; and
    a transmitter configured to transmit the data comprising the bitstream,
    wherein the subblock merge candidate list comprises a constructed affine merge candidate and a subblock-based temporal merge candidate,
    wherein the constructed affine merge candidate is generated based on at least two of a control point CP0 related to a top-left corner of the current block, a control point CP1 related to a top-right corner of the current block, a control point CP2 related to a bottom-left corner of the current block, and a control point CP3 related to a bottom-right corner of the current block,
    wherein based on a case that the constructed affine merge candidate is generated based on {CP0, CP2, CP3}, a weight index for the constructed affine merge candidate is equal to a weight index for the CP0,
    wherein based on a case that the constructed affine merge candidate is generated based on {CP1, CP2, CP3}, the weight index for the constructed affine merge candidate is equal to a weight index for the CP1,
    wherein a value of a weight index for the subblock-based temporal merge candidate is derived as zero (0), and
    wherein the constructed affine merge candidate is inserted after the subblock-based temporal merge candidate in the subblock merge candidate list.

* * * * *